(12) United States Patent
Campbell et al.

(10) Patent No.: US 12,194,357 B1
(45) Date of Patent: Jan. 14, 2025

(54) BASKETBALL TRAINING SYSTEM WITH COMPUTER VISION FUNCTIONALITY

(71) Applicant: Airborne Athletics, Inc., Bloomington, MN (US)

(72) Inventors: Douglas Brad Campbell, Loretto, MN (US); Adam T. Pan, Elko New Market, MN (US); Justin Royer, Eden Prairie, MN (US); Jason Grey, Edina, MN (US)

(73) Assignee: Airborne Athletics, Inc., Bloomington, MN (US)

( * ) Notice: Subject to any disclaimer, the term of this patent is extended or adjusted under 35 U.S.C. 154(b) by 0 days.

(21) Appl. No.: 18/778,656

(22) Filed: Jul. 19, 2024

Related U.S. Application Data

(63) Continuation of application No. 18/100,814, filed on Jan. 24, 2023.

(60) Provisional application No. 63/302,196, filed on Jan. 24, 2022.

(51) Int. Cl.
*A63B 69/00* (2006.01)
*G06V 20/40* (2022.01)
*G06V 40/20* (2022.01)

(52) U.S. Cl.
CPC .......... *A63B 69/0071* (2013.01); *G06V 20/42* (2022.01); *G06V 40/23* (2022.01)

(58) Field of Classification Search
CPC ..... A63B 69/0071; G06V 20/42; G06V 40/23
See application file for complete search history.

(56) References Cited

U.S. PATENT DOCUMENTS

| | | |
|---|---|---|
| 1,223,386 A | 4/1917 | Handelan |
| 2,908,266 A | 10/1959 | Cooper |
| 3,776,550 A | 12/1973 | McNabb |
| 3,802,703 A | 4/1974 | Van Tassel |
| 3,878,828 A | 4/1975 | Francesco |
| 4,168,695 A | 9/1979 | Haller et al. |
| 4,262,648 A | 4/1981 | Wegener et al. |
| 4,471,746 A | 9/1984 | Ando |
| 4,517,953 A | 5/1985 | Osaka et al. |
| 4,579,340 A | 4/1986 | Jenkins et al. |

(Continued)

FOREIGN PATENT DOCUMENTS

WO WO 1995/032033 11/1995
WO WO-2022140484 A1 * 6/2022 ......... A63B 24/0003

OTHER PUBLICATIONS

[No Author Listed] [online], "Dr. Dish Basketball Shooting Machine and Team Trainer," Apr. 19, 2010, <https://www.youtube.com/watch?v=-0c000cRVZU>, p. 1 (time 0:00-1:19) [Video Submission].

(Continued)

*Primary Examiner* — Jeffrey S Vanderveen
(74) *Attorney, Agent, or Firm* — Fish & Richardson P.C.

(57) ABSTRACT

A basketball training system that includes one or more of a basketball delivery machine, a computer vision sensor, one or more processors, and a computer-readable storage medium coupled to the one or more processors having instructions stored thereon which, when executed by the one or more processors, cause the one or more processors to perform operations. The operations can include detecting a made or missed shot, identifying indexed video and/or pose information for the shot, tagging video and/or pose information with make or miss.

24 Claims, 25 Drawing Sheets

(56) References Cited

U.S. PATENT DOCUMENTS

| | | |
|---|---|---|
| 4,667,957 A | 5/1987 | Joseph |
| 4,678,189 A | 7/1987 | Koss |
| 4,714,248 A | 12/1987 | Koss |
| 4,882,676 A | 11/1989 | Van De Kop et al. |
| 4,913,431 A | 4/1990 | Jakobs |
| 4,915,384 A | 4/1990 | Bear |
| 4,915,387 A | 4/1990 | Baxstrom |
| 4,936,577 A | 6/1990 | Kington et al. |
| 4,940,231 A | 7/1990 | Ehler |
| 4,955,605 A | 9/1990 | Goldfarb |
| 5,016,875 A | 5/1991 | Joseph |
| 5,125,651 A | 6/1992 | Keeling et al. |
| 5,183,253 A | 2/1993 | Grimaldi et al. |
| 5,312,099 A | 5/1994 | Oliver, Sr. |
| 5,365,427 A | 11/1994 | Soignet et al. |
| 5,393,049 A | 2/1995 | Nelson |
| 5,409,211 A | 4/1995 | Adamek |
| 5,417,196 A | 5/1995 | Morrison et al. |
| 5,464,208 A | 11/1995 | Pierce |
| 5,540,428 A | 7/1996 | Joseph |
| 5,601,284 A | 2/1997 | Blackwell et al. |
| 5,676,120 A | 10/1997 | Joseph |
| 5,681,230 A | 10/1997 | Krings |
| 5,692,978 A | 12/1997 | Hummel |
| 5,746,668 A | 5/1998 | Ochs |
| 5,771,018 A | 6/1998 | Kennedy |
| 5,776,018 A | 7/1998 | Simpson et al. |
| 5,813,926 A | 9/1998 | Vance |
| 5,816,953 A | 10/1998 | Cleveland |
| 5,842,699 A | 12/1998 | Mirando et al. |
| 5,929,851 A | 7/1999 | Donnelly |
| 5,937,143 A | 8/1999 | Watanabe et al. |
| 5,980,399 A | 11/1999 | Campbell et al. |
| 6,167,328 A | 12/2000 | Takaoka et al. |
| 6,224,503 B1 | 5/2001 | Joseph |
| 6,241,628 B1 | 6/2001 | Jenkins |
| 6,280,352 B1 | 8/2001 | Coffeen et al. |
| 6,302,811 B1 | 10/2001 | Topham |
| 6,389,368 B1 | 5/2002 | Hampton |
| 6,390,940 B1 | 5/2002 | Naulls et al. |
| 6,458,049 B2 | 10/2002 | Bush |
| 6,546,924 B2 | 4/2003 | Battersby et al. |
| 6,659,893 B1 | 12/2003 | Campbell et al. |
| 6,707,487 B1 | 3/2004 | Aman et al. |
| 6,918,591 B2 | 7/2005 | D'Amico et al. |
| 7,056,237 B2 | 6/2006 | Slavey et al. |
| 7,066,845 B2 | 6/2006 | Joseph |
| 7,082,938 B2 | 8/2006 | Wilmot |
| 7,094,164 B2 | 8/2006 | Marty et al. |
| 7,288,034 B2 | 10/2007 | Woodard et al. |
| 7,620,466 B2 | 11/2009 | Neale et al. |
| 7,641,574 B2 | 1/2010 | Steen |
| 7,766,770 B2 | 8/2010 | Cucjen et al. |
| 7,927,237 B2 | 4/2011 | Jenkins et al. |
| 7,942,784 B1 | 5/2011 | Hyde |
| 7,945,349 B2 | 5/2011 | Svensson et al. |
| 7,970,492 B2 | 6/2011 | Matsushima et al. |
| 8,012,046 B2 | 9/2011 | Campbell et al. |
| 8,123,634 B1 | 2/2012 | Lovett et al. |
| 8,147,356 B2 | 4/2012 | Campbell et al. |
| 8,206,246 B2 | 6/2012 | Joseph |
| 8,301,277 B2 | 10/2012 | Jones |
| 8,617,008 B2 | 12/2013 | Marty et al. |
| 8,727,784 B1 | 5/2014 | Wolf |
| 8,845,460 B1 | 9/2014 | Feldstein |
| 8,852,030 B2 | 10/2014 | Campbell et al. |
| 8,911,308 B2 | 12/2014 | Daniels |
| 9,017,188 B2 | 4/2015 | Joseph et al. |
| D739,488 S | 9/2015 | Campbell et al. |
| 9,199,150 B2 | 12/2015 | Wackerly |
| 9,275,470 B1 | 3/2016 | Forkosh et al. |
| 9,444,306 B2 | 9/2016 | Bradfield |
| 9,452,339 B1 | 9/2016 | Shah et al. |
| 9,569,005 B2 | 2/2017 | Ahmed et al. |
| 9,600,716 B2 | 3/2017 | Skjaerseth et al. |
| 9,656,140 B2 | 5/2017 | Thurman et al. |
| 9,724,584 B1 | 8/2017 | Campbell et al. |
| 9,808,696 B2 | 11/2017 | Campbell et al. |
| 9,852,333 B2 | 12/2017 | Lochmann |
| 9,855,481 B2 | 1/2018 | Tuxen et al. |
| 9,901,801 B2 | 2/2018 | Thurman et al. |
| 9,914,035 B2 | 3/2018 | Campbell et al. |
| 9,975,026 B2 | 5/2018 | Campbell et al. |
| 10,004,949 B2 * | 6/2018 | Brothers ................ G06V 40/28 |
| 10,010,778 B2 | 7/2018 | Marty et al. |
| 10,109,061 B2 | 10/2018 | Bose et al. |
| 10,151,831 B2 | 12/2018 | Johnson |
| 10,192,360 B2 | 1/2019 | Osawa et al. |
| 10,252,133 B2 | 4/2019 | Campbell et al. |
| 10,315,093 B2 | 6/2019 | Tuxen et al. |
| 10,338,209 B2 | 7/2019 | Johnson |
| 10,338,212 B2 | 7/2019 | Kim et al. |
| 10,343,015 B2 | 7/2019 | Marty et al. |
| 10,360,685 B2 | 7/2019 | Marty et al. |
| 10,379,214 B2 | 8/2019 | Tuxen |
| 10,421,003 B2 | 9/2019 | Leech |
| 10,471,325 B2 | 11/2019 | Marty et al. |
| 10,471,328 B2 | 11/2019 | Tuxen et al. |
| 10,473,778 B2 | 11/2019 | Tuxen |
| 10,489,656 B2 | 11/2019 | Lee et al. |
| 10,503,965 B2 | 12/2019 | Smith |
| 10,507,369 B2 | 12/2019 | Gordon et al. |
| 10,561,916 B1 | 2/2020 | Campbell et al. |
| 10,596,416 B2 | 3/2020 | Forsgren |
| 10,596,436 B1 | 3/2020 | Campbell et al. |
| 10,600,334 B1 | 3/2020 | Zhang et al. |
| 10,605,910 B2 | 3/2020 | Du Toit et al. |
| 10,639,531 B1 | 5/2020 | McCarter |
| 10,643,492 B2 * | 5/2020 | Lee ........................ G06V 20/42 |
| 10,653,337 B2 | 5/2020 | Markison et al. |
| 10,670,706 B2 | 6/2020 | Schwager et al. |
| 10,688,362 B1 | 6/2020 | Sangalang |
| 10,746,512 B2 | 8/2020 | Howe |
| 10,772,511 B2 | 9/2020 | Sahin et al. |
| 10,775,492 B2 | 9/2020 | Johnson |
| 10,796,448 B2 | 10/2020 | Lee et al. |
| 10,799,759 B2 | 10/2020 | Hixenbaugh et al. |
| 10,850,179 B2 | 12/2020 | Tuxen et al. |
| 10,861,200 B1 | 12/2020 | Graham |
| 10,885,637 B2 | 1/2021 | Casamona et al. |
| 10,898,757 B1 | 1/2021 | Johansson et al. |
| 10,930,172 B2 | 2/2021 | Zhang et al. |
| 10,940,382 B2 | 3/2021 | Leech |
| 10,962,635 B2 | 3/2021 | Tuxen |
| 10,987,567 B2 | 4/2021 | Cherryhomes et al. |
| 10,989,791 B2 | 4/2021 | Tuxen et al. |
| 10,994,182 B1 | 5/2021 | Campbell et al. |
| 11,016,188 B2 | 5/2021 | Johnson |
| 11,045,705 B2 | 6/2021 | Zhang |
| 11,083,953 B2 | 8/2021 | Hermandorfer |
| 11,086,005 B2 | 8/2021 | Tuxen |
| 11,086,008 B2 | 8/2021 | Du Toit et al. |
| 11,097,176 B1 | 8/2021 | Campbell et al. |
| 11,103,763 B2 | 8/2021 | Anton et al. |
| 11,130,019 B2 | 9/2021 | Yerli |
| 11,135,495 B2 | 10/2021 | Tuxen et al. |
| 11,141,645 B2 | 10/2021 | Anton |
| 11,143,754 B2 | 10/2021 | Tuxen |
| 11,247,108 B2 | 2/2022 | Vollbrecht et al. |
| 11,247,109 B1 | 2/2022 | Campbell et al. |
| 11,285,367 B2 | 3/2022 | Tuxen |
| 11,291,902 B2 | 4/2022 | Tuxen et al. |
| 11,305,174 B2 | 4/2022 | Spivak et al. |
| 11,311,789 B2 | 4/2022 | Deleon et al. |
| 11,351,436 B2 | 6/2022 | Hendrix et al. |
| 11,364,428 B2 | 6/2022 | Oh et al. |
| 11,380,100 B2 | 7/2022 | Lee et al. |
| 11,400,355 B1 | 8/2022 | Joseph |
| 11,400,356 B2 | 8/2022 | Leech |
| 11,413,514 B2 | 8/2022 | Marty et al. |
| 11,446,546 B2 | 9/2022 | Tuxen et al. |
| 11,452,911 B2 | 9/2022 | Tuxen et al. |
| 11,484,760 B2 | 11/2022 | Anton et al. |
| 11,491,383 B1 | 11/2022 | Campbell et al. |

(56) References Cited

U.S. PATENT DOCUMENTS

| | | | |
|---|---|---|---|
| 11,497,963 B2 | 11/2022 | Hixenbaugh et al. |
| 11,504,581 B2 | 11/2022 | Beach et al. |
| 11,504,582 B2 | 11/2022 | Johansson et al. |
| 11,577,139 B1 | 2/2023 | Campbell et al. |
| 11,577,146 B1 | 2/2023 | Joseph |
| 11,583,729 B2 | 2/2023 | Beach et al. |
| 11,594,029 B2 | 2/2023 | Lee et al. |
| 11,615,540 B2 | 3/2023 | Jayaram et al. |
| 11,619,708 B2 | 4/2023 | Søndergaard et al. |
| 11,638,854 B2 | 5/2023 | Zhang et al. |
| 11,642,047 B2 | 5/2023 | Zhang et al. |
| 11,673,029 B2 | 6/2023 | Tuxen et al. |
| 11,697,046 B2 | 7/2023 | Forsgren |
| 11,712,610 B1 | 8/2023 | Joseph et al. |
| 11,745,225 B1 | 9/2023 | Amarant et al. |
| 11,747,461 B2 | 9/2023 | Asghar et al. |
| 11,752,417 B2 | 9/2023 | Leech |
| 11,771,954 B2 | 10/2023 | Lee et al. |
| 11,779,809 B1 | 10/2023 | Stroud |
| 11,813,510 B1 | 11/2023 | Campbell et al. |
| 11,828,867 B2 | 11/2023 | Tuxen et al. |
| 11,839,805 B2 | 12/2023 | Young et al. |
| 11,844,990 B2 | 12/2023 | Deleon et al. |
| 11,850,498 B2 | 12/2023 | Okur et al. |
| 11,857,862 B1 | 1/2024 | Lombardi et al. |
| 11,883,716 B2 | 1/2024 | Johansson et al. |
| 11,892,537 B1 | 2/2024 | Fazzini et al. |
| 11,896,884 B2 | 2/2024 | Marty et al. |
| 11,921,190 B2 | 3/2024 | Tuxen |
| 11,931,636 B2 | 3/2024 | Tabuchi et al. |
| 11,938,375 B2 | 3/2024 | Tuxen et al. |
| 11,946,997 B2 | 4/2024 | Tuxen et al. |
| 11,947,002 B2 | 4/2024 | Wang et al. |
| 11,951,373 B2 | 4/2024 | Spivak et al. |
| 11,986,698 B2 | 5/2024 | Tuxen et al. |
| 11,986,699 B1 | 5/2024 | Walker et al. |
| 11,992,728 B2 | 5/2024 | Hixenbaugh et al. |
| 11,998,800 B1 | 6/2024 | Stroud |
| 11,998,829 B2 | 6/2024 | Lovell et al. |
| 2001/0052472 A1 | 12/2001 | Ikeda et al. |
| 2002/0016236 A1 | 2/2002 | Stearns et al. |
| 2002/0072681 A1 | 6/2002 | Schnali |
| 2002/0147404 A1 | 10/2002 | Kato et al. |
| 2003/0073518 A1 | 4/2003 | Marty et al. |
| 2003/0224337 A1 | 12/2003 | Shum et al. |
| 2004/0092840 A1 | 5/2004 | Nakada |
| 2005/0085320 A1 | 4/2005 | Joseph et al. |
| 2005/0172943 A1 | 8/2005 | Cucjen et al. |
| 2005/0187036 A1 | 8/2005 | Ziola et al. |
| 2005/0209051 A1 | 9/2005 | Santomassimo |
| 2005/0215870 A1 | 9/2005 | Rademaker |
| 2006/0057549 A1 | 3/2006 | Prinzel et al. |
| 2006/0118096 A1 | 6/2006 | Cucjen et al. |
| 2006/0138809 A1 | 6/2006 | Joseph |
| 2006/0160639 A1 | 7/2006 | Klein |
| 2006/0236993 A1 | 10/2006 | Cucjen et al. |
| 2007/0026974 A1 | 2/2007 | Marty et al. |
| 2007/0208544 A1 | 9/2007 | Kulach |
| 2007/0225120 A1 | 9/2007 | Schenk |
| 2007/0265138 A1 | 11/2007 | Ashby |
| 2008/0015061 A1 | 1/2008 | Klein |
| 2008/0171620 A1 | 7/2008 | Feldmeier |
| 2008/0254866 A1 | 10/2008 | Young et al. |
| 2008/0261726 A1 | 10/2008 | Chipperfield |
| 2009/0047645 A1 | 2/2009 | Dibenedetto et al. |
| 2009/0137347 A1 | 5/2009 | Jenkins et al. |
| 2009/0191988 A1 | 7/2009 | Klein |
| 2009/0270743 A1 | 10/2009 | Dugan et al. |
| 2009/0325739 A1 | 12/2009 | Gold |
| 2010/0259412 A1 | 10/2010 | Pagonakis |
| 2010/0261557 A1 | 10/2010 | Joseph et al. |
| 2010/0292033 A1 | 11/2010 | Sarver |
| 2011/0084925 A1 | 4/2011 | Baik et al. |
| 2011/0205111 A1 | 8/2011 | Balardeta et al. |
| 2011/0250939 A1 | 10/2011 | Hobler |
| 2012/0015778 A1 | 1/2012 | Lee |
| 2012/0142454 A1 | 6/2012 | Campbell et al. |
| 2012/0309551 A1 | 12/2012 | Holzhacker |
| 2012/0322587 A1 | 12/2012 | Duke |
| 2013/0005512 A1 | 1/2013 | Joseph et al. |
| 2013/0104869 A1 | 5/2013 | Lewis |
| 2013/0104870 A1 | 5/2013 | Rizzo |
| 2013/0157786 A1 | 6/2013 | Joseph et al. |
| 2013/0272393 A1 | 10/2013 | Kirenko et al. |
| 2014/0031703 A1 | 1/2014 | Rayner et al. |
| 2014/0045166 A1 | 2/2014 | Coleman |
| 2014/0081436 A1 | 3/2014 | Crowley et al. |
| 2014/0195019 A1 | 7/2014 | Thurman et al. |
| 2014/0222177 A1 | 8/2014 | Thurman et al. |
| 2014/0244012 A1 | 8/2014 | Doherty et al. |
| 2014/0305420 A1 | 10/2014 | Deese |
| 2014/0336796 A1 | 11/2014 | Agnew |
| 2014/0340329 A1 | 11/2014 | Chen |
| 2014/0371885 A1 | 12/2014 | Ianni et al. |
| 2015/0114377 A1 | 4/2015 | Yoo |
| 2015/0131845 A1 | 5/2015 | Forouhar et al. |
| 2015/0201134 A1 | 7/2015 | Carr et al. |
| 2015/0238819 A1 | 8/2015 | Volkerink et al. |
| 2015/0306455 A1 | 10/2015 | DeCarlo |
| 2015/0352425 A1 | 12/2015 | Lewis et al. |
| 2016/0001136 A1 | 1/2016 | King et al. |
| 2016/0098941 A1 | 4/2016 | Kerluke |
| 2016/0250540 A1 | 9/2016 | Joseph et al. |
| 2016/0310814 A1 | 10/2016 | Joseph et al. |
| 2016/0325166 A1 | 11/2016 | Wallace |
| 2016/0325168 A1 | 11/2016 | Campbell et al. |
| 2016/0332054 A1 | 11/2016 | Smith |
| 2017/0232298 A1 | 8/2017 | Joseph et al. |
| 2017/0252625 A1 | 9/2017 | Campbell et al. |
| 2017/0252626 A1 | 9/2017 | Campbell et al. |
| 2017/0340943 A1 | 11/2017 | Pierotti et al. |
| 2017/0354845 A1 | 12/2017 | Williams et al. |
| 2018/0139425 A1 | 5/2018 | Mutter et al. |
| 2018/0154212 A1 | 6/2018 | Park et al. |
| 2018/0236338 A1 | 8/2018 | Campbell et al. |
| 2018/0290019 A1 | 10/2018 | Rahimi et al. |
| 2020/0009443 A1 | 1/2020 | Moravchik et al. |
| 2020/0047049 A1 | 2/2020 | Ahmed |
| 2020/0114243 A1 | 4/2020 | Janssen |
| 2020/0179755 A1 | 6/2020 | Ristas |
| 2020/0193863 A1 | 6/2020 | Smith |
| 2020/0346095 A1 | 11/2020 | Kubota et al. |
| 2021/0008433 A1 | 1/2021 | Bush |
| 2021/0052961 A1 | 2/2021 | Brody |
| 2021/0064880 A1 | 3/2021 | Zhang et al. |
| 2021/0128977 A1 | 5/2021 | Picker |
| 2021/0146220 A1* | 5/2021 | Hall ................... A63B 63/004 |
| 2021/0286423 A1 | 9/2021 | Correia |
| 2021/0370152 A1 | 12/2021 | Gordon |
| 2023/0031488 A1* | 2/2023 | Gordon ............. A63B 71/0605 |
| 2023/0119793 A1 | 4/2023 | Joseph |
| 2023/0191221 A1 | 6/2023 | Anton et al. |
| 2023/0196770 A1 | 6/2023 | Anton et al. |

OTHER PUBLICATIONS

[No Author Listed] [online], "Incredible 8000 Series Gun Basketball Shooting Machine," Sep. 27, 2010, <https://www.youtube.com/watch?v=eOUTA_k8eW4>, 1 page [Video Submission].

[No Author Listed], "Airborne Athletics, Inc.," Brochure for iMake and Dr. Dish, Airborne Athletics, Inc., Created before 2012, 1 page.

[No Author Listed], "Dr. Dish Owner's Manual," Owner's Manual, Airborne Athletics, Inc., Oct. 2005, 31 pages.

[No Author Listed], "Sniper Program Instructions Help with F1," Program instructions, Sniper, Created Feb. 10, 1995, 18 pages.

[No Author Listed], "Sniper . . . The Ultimate Basketball Trainer," Brochure, Sniper, Created before Oct. 1995, 4 pages.

[No Author Listed], "The All New 8000 Series Gun," Brochure, Shoot-A-Way, Created before Oct. 12, 2011, 12 pages.

[Not Author Listed], "The Shoot Away: The Perfect Shooting Aid," Brochure, Airborne Athletics, Created before Dec. 2, 2011, 1 page.

(56) References Cited

OTHER PUBLICATIONS

Reich et al., "A spatial analysis of basketball shot chart data," The American Statistician, Feb. 2006, 60(1):3-12.

* cited by examiner

BASKETBALL TRAINING SYSTEM WITH COMPUTER VISION FUNCTIONALITY

CLAIM OF PRIORITY

This application is a continuation of U.S. application Ser. No. 18/100,814, filed Jan. 24, 2023, which claims priority under 35 USC § 119 (e) to U.S. Patent Application Ser. No. 63/302,196, filed on Jan. 24, 2022, the entire contents of each are hereby incorporated by reference.

BACKGROUND

This disclosure relates generally to sports training, and in particular to basketball return systems with a user interface.

Training in sports involves the development of skills as well as physical conditioning. The game of basketball requires physical strength and conditioning, and also requires special skills. Successful development of those skills requires repetition during practice.

Although it is a team sport, basketball presents opportunities for an individual player to practice and improve his or her game without the need for other players to be present. A player can develop ball handling skills and shooting skills through individual practice.

Basketball players develop their shooting skills by shooting the basketball from various locations on the court. If a second player is not present to rebound, the shooter must rebound his or her own shots. The rebounding process can waste time that could otherwise be used in taking more shots. Over the past several decades, a number of ball collecting devices have been developed to collect basketballs shot at the basketball goal (i.e. the backboard and the attached hoop). The ball collecting devices generally include netting and a frame for supporting the netting around the basketball goal. The ball collecting devices are often used with a ball delivery device, which directs the ball back to the player.

Motorized ball delivery devices can return basketballs to a shooter at various locations on a basketball court. The ball delivery device can have programs that determine which direction to return balls to the player, how many times to return the ball, etc.

Successful shooting of a basketball can be affected by a number of factors, including a player's form or technique in shooting. In some cases, poor form or technique may have less effect when the player is taking uncontested shots from similar distances, but may limit the player's ability to score in game conditions when the player is guarded by another player and often must attempt shots from varying positions on the court having varying distances from the basketball goal.

As players advance in skill and experience, they are often confronted with the realization that the speed of the game gets "faster," and that he or she will need to consistently score under increasing pressure and from various positions on the court. Continuing to practice under conditions that do not effectively simulate the level of movement required of the shooter and the variety of shot locations frequently encountered in game conditions can result in some improvement in the player's shooting, but may ultimately limit the player's success as the player rises through the levels of play from, e.g., junior varsity to varsity, from high school varsity to college, and from college to professional basketball.

SUMMARY

In one example, a basketball training system includes a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. An aspect includes a basketball training system that includes a basketball delivery machine; a computer vision sensor; one or more processors; and a computer-readable storage medium coupled to the one or more processors having instructions stored thereon which, when executed by the one or more processors, cause the one or more processors to perform operations. The operations may include: detecting a made or missed shot; identifying indexed video and/or pose information for the shot; and tagging video and/or pose information with make or miss. Other embodiments of this aspect include corresponding computer systems, apparatus, and computer programs recorded on one or more computer storage devices, each configured to perform the actions of the methods.

Implementations may include one or more of the following features. The basketball training system where the operations may include outputting the tagged video and pose information on a display. The operations may include controlling the basketball delivery machine as a function of the tagged video and pose information. Implementations of the described techniques may include hardware, a method or process, or computer software on a computer-accessible medium.

Another aspect includes a basketball training system that includes a basketball delivery machine; a computer vision sensor; one or more processors; and a computer-readable storage medium coupled to the one or more processors having instructions stored thereon which, when executed by the one or more processors, cause the one or more processors to perform operations that may include: aggregating pose information for each shot in a training session; determining form information for each shot; determining a variance for each shot; and determining a form may include score. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting the pose information, the form information, the variance, and the form may include score on a display. The operations may include: controlling the basketball delivery machine as a function of the pose information, the form information, the variance, and the form may include score. Implementations of the described techniques may include hardware, a method or process, or computer software on a computer-accessible medium.

Another aspect includes a basketball training system that includes a basketball delivery machine; a computer vision sensor; one or more processors; and a computer-readable storage medium coupled to the one or more processors having instructions stored thereon which, when executed by the one or more processors, cause the one or more processors to perform operations. The operations may include: detecting a made or a missed shot; accessing a target form for the made or missed shot; determining an actual form for the made or missed shot; and providing real-time feedback that includes the actual form. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting the target form and the actual form on a display. The operations further may include: controlling the basketball delivery machine as a function of the target form and the actual form. Implementations of the described techniques may include hardware, a method or process, or computer software on a computer-accessible medium.

Another general aspect includes a basketball training system that includes a basketball delivery machine; a computer vision sensor; one or more processors; and a computer-readable storage medium coupled to the one or more processors having instructions stored thereon which, when executed by the one or more processors, cause the one or more processors to perform operations. The operations may include: accessing a pose for each shot in a training session; accessing target forms for each shot; determining an actual form for each shot; and providing real-time feedback that includes the actual form for each shot. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting the actual form on a display. The operations further may include: controlling the basketball delivery machine as a function of the actual form. Implementations of the described techniques may include hardware, a method or process, or computer software on a computer-accessible medium.

Another aspect includes a basketball training system that includes a computer vision sensor; one or more processors; and a computer-readable storage medium coupled to the one or more processors having instructions stored thereon which, when executed by the one or more processors, cause the one or more processors to perform operations. The operations may include: accessing a heartrate data; accessing a pose data; determining a relationship between the heartrate data and the pose data; and recommending a drill based on the relationship. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting the drill on a display. The operations may include: controlling a basketball delivery machine as a function of the drill. Implementations of the described techniques may include hardware, a method or process, or computer software on a computer-accessible medium.

Another aspect includes a basketball training system that includes a computer vision sensor; one or more processors; and a computer-readable storage medium coupled to the one or more processors having instructions stored thereon which, when executed by the one or more processors, cause the one or more processors to perform operations. The operations may include: accessing a pose data for a shot; determining a hand placement relative to a ball; comparing the hand placement to a target hand placement; and providing a real time hand placement feedback. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting the real time hand placement feedback. The operations further may include: controlling a basketball delivery machine as a function of the real time hand placement feedback. Implementations of the described techniques may include hardware, a method or process, or computer software on a computer-accessible medium.

Another aspect includes a basketball training system that includes a basketball delivery machine; a computer vision sensor; one or more processors; and a computer-readable storage medium coupled to the one or more processors having instructions stored thereon which, when executed by the one or more processors, cause the one or more processors to perform operations. The operations may include: collecting ballistic sensor data; determining a flight information for a ball; combining the flight information with a form information; and recommending a drill based on the flight information and form information. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting the drill on a display. The operations further may include: controlling the basketball delivery machine as a function of the drill. Implementations of the described techniques may include hardware, a method or process, or computer software on a computer-accessible medium.

Another aspect includes a basketball training system that includes a computer vision sensor; one or more processors; and a computer-readable storage medium coupled to the one or more processors having instructions stored thereon which, when executed by the one or more processors, cause the one or more processors to perform operations. The operations may include: accessing a video that includes game data; analyzing the video and the game data for form information; and combine the form information with other form information for a user. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting the form information on a display. The operations may include: controlling a basketball delivery machine as a function of the form information. Implementations of the described techniques may include hardware, a method or process, or computer software on a computer-accessible medium.

Another aspect includes a basketball training system that includes a basketball delivery machine; a computer vision sensor; one or more processors; and a computer-readable storage medium coupled to the one or more processors having instructions stored thereon which, when executed by the one or more processors, cause the one or more processors to perform operations may include: identifying a ball handling segment of a user's form; analyzing the ball handling segment; recommending a ball handling drill based on the analyzed ball handling segment; analyzing a shot form; and recommending a shooting drill based on the analyzed shot form. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting the recommended ball handing drill and the recommended shooting drill on a display. The operations may include: controlling the basketball delivery machine as a function of the recommended ball handing drill and the recommended shooting drill. Implementations of the described techniques may include hardware, a method or process, or computer software on a computer-accessible medium.

Another aspect includes a basketball training system that includes a computer vision sensor; one or more processors; and a computer-readable storage medium coupled to the one or more processors having instructions stored thereon which, when executed by the one or more processors, cause the one or more processors to perform operations. The operations may include: identifying a performance of an agility drill; logging the performance of the agility drill; and reporting agility drill activity. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting the agility drill activity on a display. The operations may include: controlling a basketball delivery machine as a function of the agility drill activity. Implementations of the described techniques may include hardware, a method or process, or computer software on a computer-accessible medium.

Another aspect includes a basketball training system that includes a basketball delivery machine; a computer vision sensor; one or more processors; and a computer-readable storage medium coupled to the one or more processors having instructions stored thereon which, when executed by the one or more processors, cause the one or more processors to perform operations. The operations may include: identifying a command gesture from pose data; excluding the command gesture from performance data; and controlling the basketball delivery machine based on the command gesture. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting the command gesture on a display. Implementations of the described techniques may include hardware, a method or process, or computer software on a computer-accessible medium.

Another aspect includes a basketball training system that includes a computer vision sensor; one or more processors; and a computer-readable storage medium coupled to the one or more processors having instructions stored thereon which, when executed by the one or more processors, cause the one or more processors to perform operations. The operations may include: identifying a visual biometric; identifying one or more players; and logging each identified player's activity separately. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting each identified player's activity on a display. The operations further may include: controlling a basketball delivery machine as a function of each identified player's activity. Implementations of the described techniques may include hardware, a method or process, or computer software on a computer-accessible medium.

Another aspect includes a basketball training system that includes a basketball delivery machine; a computer vision sensor; one or more processors; and a computer-readable storage medium coupled to the one or more processors having instructions stored thereon which, when executed by the one or more processors, cause the one or more processors to perform operations. The operations may include: identifying a player orientation relative to the basketball delivery machine; determining if a player is unready to receive a ball; delaying a delivery of the ball until the player orientation signifies readiness to receive the ball; and delivering the ball to the player. Other embodiments of this aspect include corresponding computer systems, apparatus, and computer programs recorded on one or more computer storage devices, each configured to perform the actions of the methods.

Implementations may include one or more of the following features. The basketball training system where the operations may include: outputting the player orientation on a display. The operations may include: controlling the basketball delivery machine as a function of the player orientation. Implementations of the described techniques may include hardware, a method or process, or computer software on a computer-accessible medium.

Implementations can include all, some, or none of the following advantages. First, the basketball training system can allow a user to practice their basketball skills in an efficient and effective manner. For example, the basketball training system can provide basketball players the ability improve their basketball skills with an increased amount of practice reps in each practice session. Further, the basketball training system provides feedback regarding the performance of the basketball player to ensure that the player is practicing properly to ensure their practice time is spent curating habits and skills that are correct and will facilitate the player's improvement. Second, the basketball training system incorporates computer vision via an image sensor that can be connected or otherwise mounted to a basketball training machine. The image sensor can decrease setup time at a practice by removing the need to set up and move other image sensors and hardware such as tripods or other image sensor mounts in the practice facility. Third, the basketball training system provides real-time performance feedback to a user that allows a user to learn why a shot was made and/or why a shot was missed based on the basketball training system's ability to analyze the performance of the user and provide feedback regarding the user's form for made and missed shots, for example.

DETAILED DESCRIPTION

Figure 1:
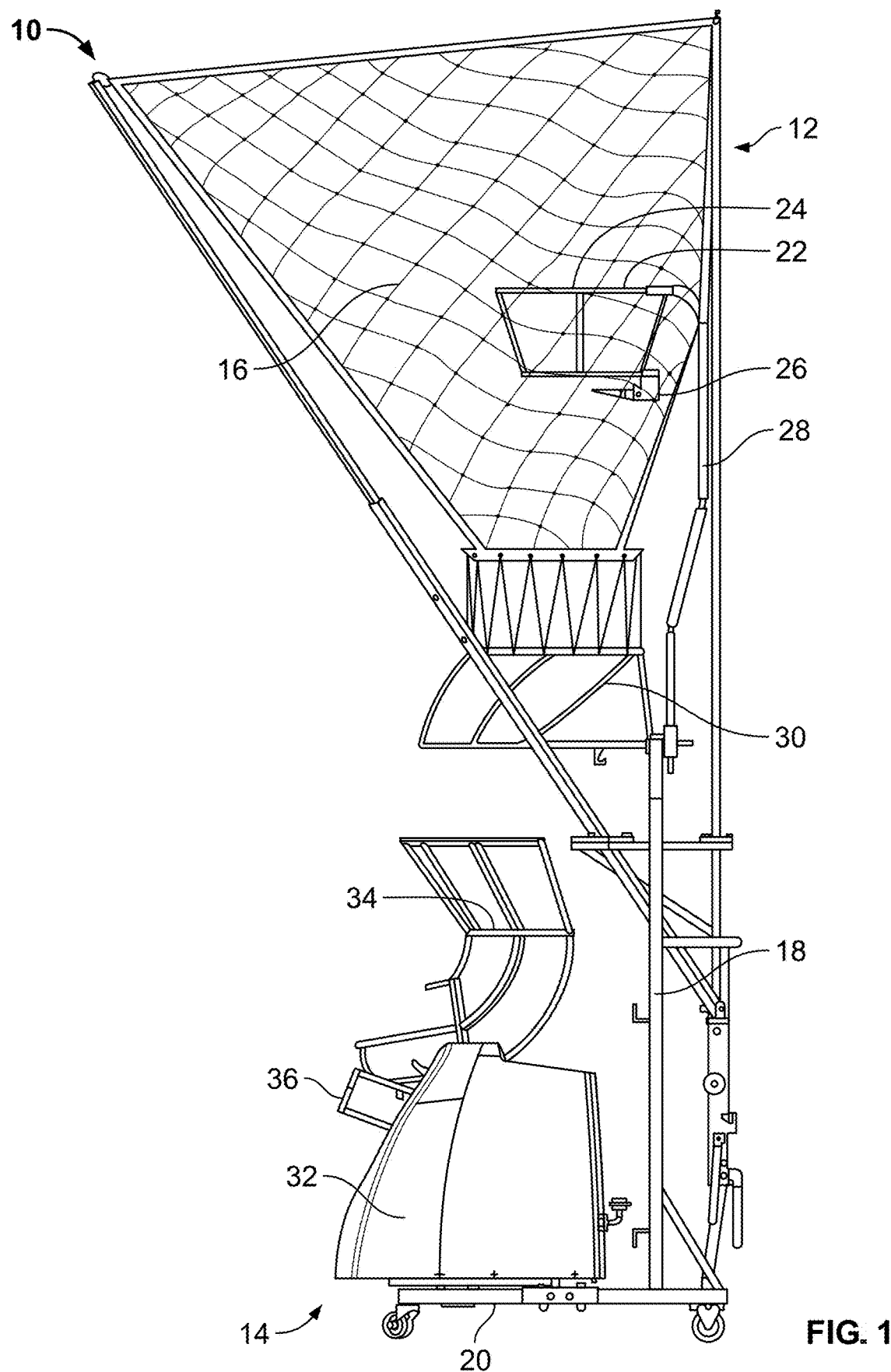
FIG. 1 is a side view of a basketball training machine that includes a ball collection system and a ball delivery system that delivers basketballs to selected ball delivery locations included in a workout program defined via a graphical user interface.

A basketball training system uses computer vision to determine poses of players that are practicing using the system. With this pose information, the system is able to identify player activity, correlate this activity with drills and standards, and provide feedback to the player. This can allow for real-time feedback to the player, summary and statistical information about the practice session, accurate form tracking, and other advantages compared to environments without this technology. The basketball training system can capture video via a camera on or attached to a basketball training machine, or from a camera that is separate from a basketball training machine. For example, the basketball training system can use computer vision on a picture or video captured by a user's camera. The video from the user's camera (e.g. a user's mobile device) can be uploaded to, sent to, or otherwise made available to the basketball training system for computer vision to identify player activity, correlate this activity with drills and standards, and provide feedback to the player. The user can also provide inputs with the video such as tagging each shot as a make or a miss that will allow the user to view a playback of their makes and misses.

In some cases, the computer vision system is integral to a ball passing machine. In such a case, the system can collect, analyze, and share data with the ball passing machine. This sharing can take the form of providing data messages to other devices (e.g., a user's phone or computer, a networked server in the cloud), and in addition or in the alternative can include user output in the form of audio information (e.g., beeps, synthesized or recorded voice), visual information (e.g., showing an image or video on a screen, illuminating a light), and other forms.

In some cases, the computer vision system can include a mobile computing device of a user (e.g., a cellular phone or tablet with a camera). An application on the device can record or transmit video, or data from the video, to the ball passing machine or another computing device, or the application on the device itself may perform one or more types of computer-vision analysis.

With this pose information, the basketball training system is able to operate based on how the user performed, and is able to analyze the user's performance for the purposes of providing real-time feedback or feedback later such as after a training session. This can advantageously allow for more accurate, dynamic, and proactive basketball training than otherwise possible with other basketball training systems that lack these features. For example, a basketball training system that does not have this type of computer vision analysis would be unable to observe user's form when they make or miss a shot, meaning less useful feedback could be provided-only that the player missed a shot, and not an analysis of why or automated recommendations for drills specific to the particular form of a given player when missing a shot. For example, two players may both have identical free throw percentages (e.g., 66%). With pose information from the computer vision, the basketball training system may determine that one player has a tendency to flair their elbows when they miss, and the other play tends to release the ball too low when they miss. With this information, the two players can be provided with recommendations for different drills-one to focus on elbow placement and the other on ball-release point.

FIG. 1 shows a side view of basketball training machine 10. Basketball training machine 10 includes two main systems, ball collection system 12 and ball delivery system 14. Further description of basketball training machine 10 can be found in currently-pending patent application Ser. No. 15/148,596, filed on May 6, 2016 and entitled BASKETBALL TRAINING SYSTEM.

Ball collection system 12 includes net 16, net frame 18, base 20, shots made counter 22 (which, in this embodiment, includes made shots funnel 24, shots made sensor 26, and counter support frame 28), and upper ball feeder 30. When machine 10 is used for shooting practice, net 16 is positioned in front of a basketball backboard (not shown) so that the basketball hoop and net (not shown) are immediately above shots made counter 22. The size of net 16 is large enough so that missed shots (which do not go through the basketball hoop and net and through shots made counter 22) will still be collected by net 16 and funneled down to upper ball feeder 30.

Ball delivery system 14 includes ball delivery machine 32, main ball feeder 34, and ball ready holder 36. The inlet of main ball feeder 34 is positioned immediately below the outlet of upper ball feeder 30. Ball delivery machine 32 is pivotally mounted on base 20. Ball delivery machine 32 is pivotable about an axis that is aligned with the inlet of main ball feeder 34 and the outlet of upper ball feeder 30. Balls drop out of upper ball feeder 30 into main ball feeder 34. Balls are delivered one at a time from main ball feeder 34 into ball ready holder 36 at the front of ball delivery machine 32. Launch arm 38 (shown in FIG. 2) launches the basketball out of holder 36 to a location on the floor where the player catches the ball and shoots. The location on the floor where the ball is delivered can be changed by pivoting machine 32 with respect to base 20.

As is further described below, ball delivery system 14 is responsive to a graphical user interface that receives user input to define a workout program that includes selected ball delivery locations desired by a user. The graphical user interface presents graphical control elements that enable user interaction to define the workout program. The graphical user interface can be managed by a server device, communicatively coupled with ball delivery system 14 or a separate computing device, to receive the workout program including machine workout instructions executed by ball delivery system 14 and player workout instructions presented to the user. In some examples, the graphical user interface presents a visual representation of at least a portion of a basketball court that is free of indicia representing predetermined ball delivery locations on the basketball court, such as visual markings, buttons, lights, or other physical or graphically-rendered indications of predetermined ball delivery (or shot) locations. In such examples, the graphical user interface enables a greater range of ball delivery locations and player movement that can help to simulate game-like scenarios and increase an effectiveness of training.

The graphical user interface is configured to receive inputs (e.g., gesture input at a touch-sensitive and/or presence-sensitive device, input from a mouse, keyboard, voice command, or other input) relative to the visual representation of the basketball court that identify the selected ball delivery locations. A control system (shown in FIG. 4) of ball delivery system 14 provides control commands to ball delivery machine 32 to cause ball delivery machine 32 to launch basketballs in directions based upon the selected ball delivery locations. In certain examples, the control system provides control commands to ball delivery machine 32 to cause ball delivery machine 32 to launch basketballs at a ball delivery speed that is determined (e.g., automatically determined by the control system) based on a distance between ball delivery machine 32 and the selected ball delivery location. The control system, in some examples, provides control commands to ball delivery machine 32 to cause ball delivery machine 32 to adjust a trajectory of the delivered balls as they exit ball delivery machine 32 to enable effective ball delivery to locations at both shorter and longer distances from ball delivery machine 32, to enable varying types of passes (e.g., bounce passes, chest passes, lob passes, or other types of passes), and/or to accommodate for player height. As such, ball delivery system 14, responsive to the graphical user interface, enables a user (e.g., a player, coach, administrator, training expert, or other user) to define a workout program via the graphical user interface that is communicated to ball delivery machine 32 for execution and, in certain examples, enables selection of desired ball delivery locations that are not limited by indications of predetermined ball delivery locations. In this way, ball delivery system 14 enables the generation of workout programs by differing users via one or more computing devices that are communicatively coupled with a server device that manages operation of the graphical user interface. While described herein with respect to basketball training machine 10, it should be understood that aspects of basketball training machine 10 can be applied to other ball sports as well. For instance, basketball training machine 10 can deliver volleyballs, soccer balls, or other types of balls for training purposes for such other sports. As such, basketball training machine 10 can be considered, in some examples, as a ball sports training machine.

Figure 2:
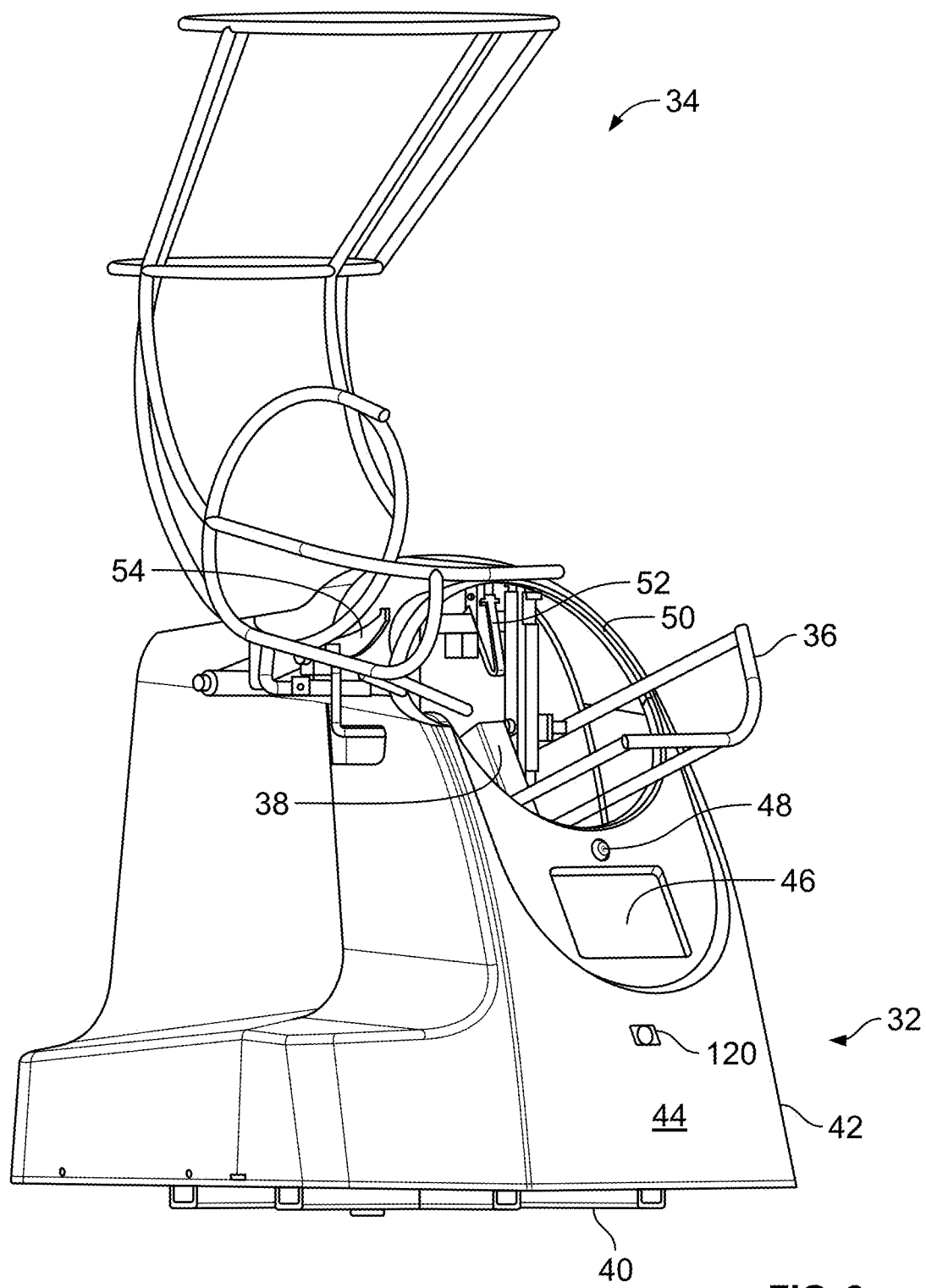
FIG. 2 is a front perspective view of the ball delivery system of FIG. 1.

FIG. 2 is a perspective view of ball delivery system 14 from the front and left of ball delivery machine 32. In this view, ball collection system 12 is not shown. Ball delivery system 14 includes ball delivery machine 32, to which main ball feeder 34 and ball ready holder 36 are mounted. Ball delivery machine 32 includes launch arm 38, bottom platform 40 (which is pivotally mounted to base 20 of ball collection system 12), and outer shell 42 (which encloses the ball launching mechanism and controls that operate machine 32). Front face 44 of outer shell 42 includes electronic front display 46, pre-launch warning light 48, front opening 50 and vision sensor 120. Also shown in FIG. 2 are ball ready lever 52 and toggle arm 54.

Balls that are collected by ball collection system 12 enter the upper end of main ball feeder 34 and are directed downward and forward to toggle arm 54, which stops further ball movement. When toggle arm 54 is actuated, it pivots to release a single ball to travel further downward and forward into ball ready holder 36. As shown in FIG. 2, ball ready holder 36 slopes downward and rearward through opening 50 into ball delivery machine 32. As the ball rolls down ball ready holder 36 toward launch arm 38, it contacts ball ready lever 52. When ball ready lever 52 is depressed by a ball in ball ready holder 36, it provides a ball ready input signal to the control system of ball delivery machine 32. The ball ready input signal received by the control system causes the control system to initiate a motor driven cycle in which launch arm 38 is engaged and pulled backward while a tension spring is extended. As the cycle continues, launch arm 38 is released and the spring force drives launch arm 38 forward to hit the ball and launch it forward out of ball delivery machine 32 and ball ready holder 36.

Rotation of ball delivery machine 32 relative to base 20 is driven by a gear motor responsive to commands from the control system of ball delivery machine 32 that causes bottom platform 40 to rotate relative to base 20 to cause ball delivery machine 32 to deliver balls, in sequence, to selected ball delivery locations. A direction of rotational movement of bottom platform 40 relative to base 20 is determined and managed by the control system based on an angular distance between sequentially-consecutive ball delivery locations.

In certain examples, one or more portions of ball delivery machine 32 can rotate along a vertical axis of ball delivery machine 32 (i.e., tilt) to adjust a vertical trajectory (i.e., exit angle) of balls delivered out of ball delivery machine 32 and ball ready holder 36. For instance, launching mechanisms of ball delivery machine 32 (e.g., including launch arm 38 and ball ready holder 36) can be pivotally mounted to tilt within ball delivery machine 32 relative to the vertical axis of ball delivery machine 32. Trajectories of delivered balls can be controlled (e.g., via tilt commands from a control system) to account for a distance between ball delivery machine 32 and a selected ball delivery location. For instance, a higher trajectory having a larger arc (e.g., a larger vertical angle of exit trajectory with respect to a horizontal axis extending along base 40) can be determined (and ball delivery machine 32 vertically rotated to provide such trajectory) for longer distances between ball delivery machine 32 and a selected ball delivery location. Similarly, a lower trajectory having a smaller arc (e.g., a smaller vertical angle of exit trajectory with respect to the horizontal axis extending along base 40) can be determined for shorter distances between ball delivery machine 32 and a selected ball delivery location. The trajectory can be determined based on both the ball delivery speed and a selected ball delivery height. As such, ball delivery machine 32 can control ball delivery speed in conjunction with the trajectory of ball delivery to deliver balls to account for varying distances between different selected ball delivery locations and a position of ball delivery machine 32.

In certain examples, a trajectory (i.e., exit angle) of balls launched from ball delivery machine 32 can be determined (or user selected) to account for user height. For instance, a higher trajectory having a larger exit angle with respect to the horizontal axis extending along base 40 (or the ground) can be selected to deliver balls to, e.g., taller users to enable such users to catch the ball at an elevation that is between the user's waist and the user's head. Similarly, a lower trajectory having a smaller exit angle with respect to the horizontal axis can be selected to delivery balls to, e.g., shorter users to enable such users to catch the ball at an elevation that is between the shorter user's waist and head. In certain examples, the trajectory of balls launched from ball delivery machine 32 can be determined (or user selected) to provide a type of pass, such as a bounce pass configured to bounce the ball prior to reaching the ball delivery location, a lob pass configured to have a large arcing trajectory toward the ball delivery location, or other types of passes. Indications of user selected height and/or type of pass can be received at a user interface operatively connected to the controller, as is further described below.

Accordingly, ball delivery machine 32 can be controlled (e.g., by a control system) to pivot both horizontally to deliver balls to a plurality of selected ball delivery locations and vertically (i.e., tilt) to adjust the trajectory of the delivered balls. As such, ball delivery machine 32 can be automatically controlled to enable training of game-like scenarios where a user may receive passes at varying locations and distances on the court as well as varying types of passes (e.g., chest passes, bounce passes, lob passes, or other types of passes) and passes having varying delivery speeds and delivery elevations. Ball delivery machine 32, therefore, can help to better simulate such game-like scenarios than a ball delivery machine that is limited to, e.g., fixed trajectories and ball delivery speeds at predetermined ball delivery locations, such as at locations spaced around the three-point line.

The image sensor 120 includes one or more hardware devices capable of receiving input from the environment and converting that input into data accessible by computing elements. In this example, the image sensor 120 is capable of capturing visual images generated when photons of visible light strike an element, other types of sensors such as sensors that can sense light outside of the visual spectrum, distance sensors such as a light detection and ranging (LIDAR) sensor, a time of flight sensor, etc. The image sensor 120 can be mounted such that the field of view of the image sensor 120 is capable of capturing images of a player when the player receives a ball and takes a shot. In some cases, this can involve two or more sensors integrated into the ball delivery system 14, and/or one or more sensors physically separate from the rest of the ball delivery system 14 (e.g. in addition to or in the alternative to an integrated sensor). For example, instead of or in addition to using an integrated image sensor 120 as shown here, a cellular phone with a camera and in data communication with the ball delivery system 14 can be used. In some embodiments, the image sensor 120 is configured to operate with vibration of ball delivery system 14. The image sensor 120 may include a gimbal or another stabilization mechanism that stabilizes the image sensor during movement of or vibration of the ball delivery system 14 and ball delivery machine 32. In some embodiments, the ball delivery system 14 may include physical vibration dampeners that reduce or eliminate the movement and/or vibration occurring at the image sensor 120. The data, images, and/or video captured by the image sensor may also be processed to reduce the noise and/or vibration in the signal using.

Figure 3:
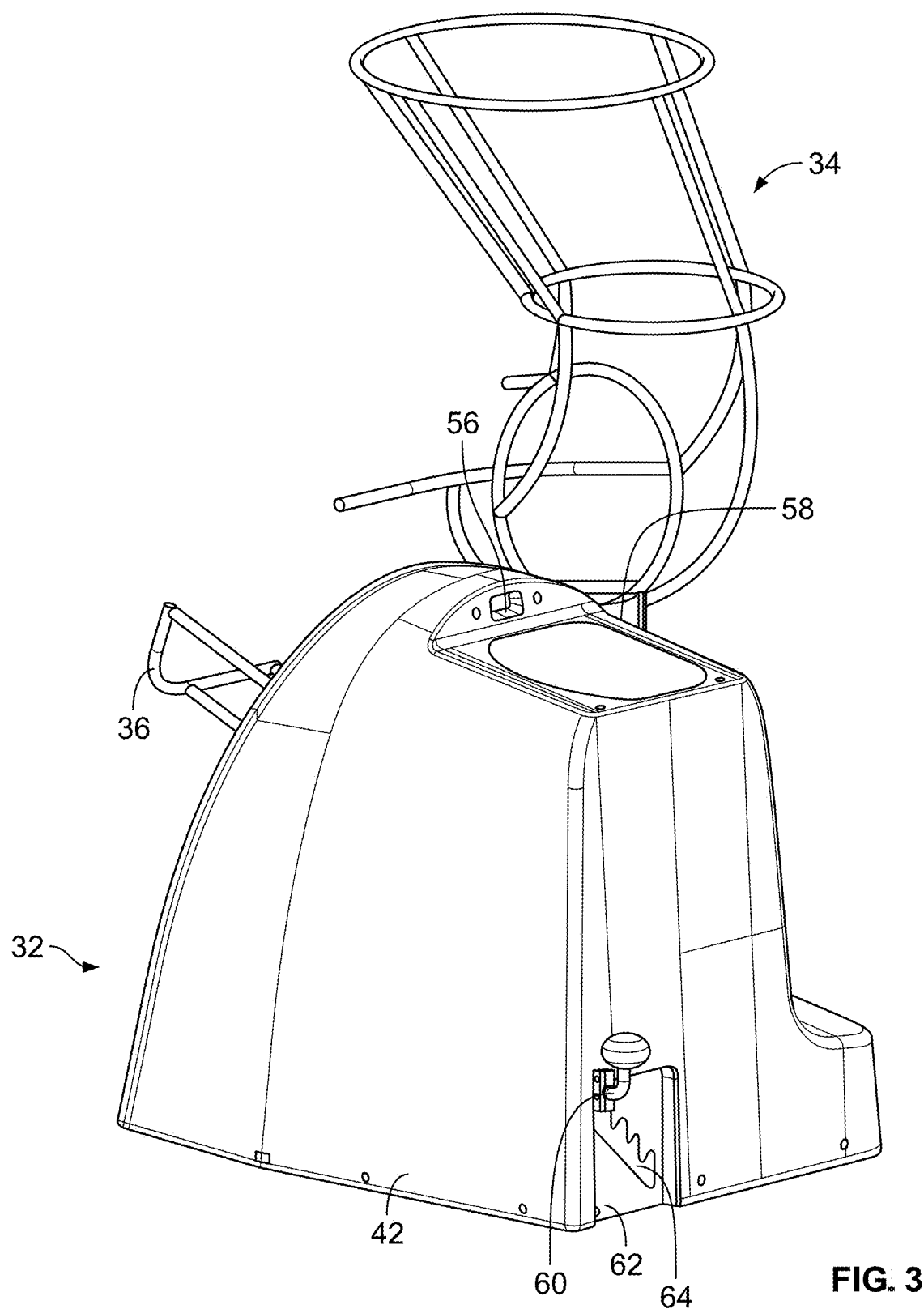
FIG. 3 is a rear perspective view of the ball delivery system of FIG. 1.

FIG. 3 is a perspective view of ball delivery system 14 from the rear and right of ball delivery machine 32. At the top of shell 42 are Universal Serial Bus (USB) port 56 and console 58, which allow a user to input information and select operating modes of ball delivery machine 32, and to receive outputs including data collected by machine as well as menus, instructions, and prompts. In some examples, ball delivery machine 32 may not include console 58 and/or USB port 56. Rather, in such examples, ball delivery machine 32 may receive and output information via a communication device (e.g., one or more wired and/or wireless transceivers) operatively coupled to one or more remote computing devices, such as mobile phones (including smartphones), personal digital assistants (PDAs), tablet computers, laptop computers, desktop computers, server systems, mainframes, or other remote computing devices.

As illustrated in FIG. 3, at the rear of ball delivery machine 32 are ball distance adjustment knob 60 and ball distance pre-select plate 62. Knob 60 and plate 62 are used, in some examples, to change the spring tension or preload on the spring that drives launch arm 38. The greater the preload, the further the distance the ball will be driven by launch arm 38 when it is released. In the embodiment shown in FIG. 3, plate 62 contains notched track 64, which includes five notches at which the tension rod connected to adjustment knob 60 can be positioned. The notched track 64 can be vertical or diagonal. The lower the position of knob 60, the greater the preload and the farther the ball will be launched.

In some examples, a delivery speed of balls driven by launch arm 38 (i.e., a speed at which launch arm 38 propels balls out of ball delivery machine 32) is set by a ball delivery speed adjustment actuator (shown in FIG. 4) controlled by the control system of ball delivery machine 32. For example, the ball delivery speed adjustment actuator can adjust a tension of the spring (or other tensioning element) that drives launch arm 38 forward to hit the ball and launch it forward out of ball delivery machine 32. In certain examples, the ball delivery speed adjustment actuator adjusts a drawback distance by which launch arm 38 is pulled backward to modify the spring tension utilized to propel launch arm 38 forward to hit the ball. In other examples, launch arm 38 is not propelled forward by a tensioning element, but rather is motor driven to propel launch arm 38 forward at a speed corresponding to a determined ball delivery speed.

The ball delivery speed can be determined by the control system based on a distance between ball delivery machine 32 and a ball delivery location. For example, the control system can determine a physical distance between ball delivery machine 32 and one or more selected ball delivery locations based on a relative distance between graphically-rendered locations of ball delivery machine 32 and the one or more selected ball delivery locations on a visual representation of at least a portion of a basketball court, as is further described below. The control system can determine the ball delivery speed based on (e.g., proportional to) the determined physical distances.

In some examples, the control system can modify the ball delivery speed for each selected ball delivery location. In other examples, the control system can determine the ball delivery speed for groups of selected ball delivery locations within threshold distances from ball delivery machine 32. In yet other examples, the control system can determine a single ball delivery speed based on an average of the distances between ball delivery machine 32 and each of the ball delivery locations, a maximum of the distances, a minimum of the distances, or other aggregations of the distances between ball delivery machine 32 and the selected ball delivery locations. In some examples, the control system may not modify the ball delivery speed. Rather, in such examples, the ball delivery speed may be manually adjusted via ball distance adjustment knob 60 (and ball distance pre-select plate 62).

Figure 4:
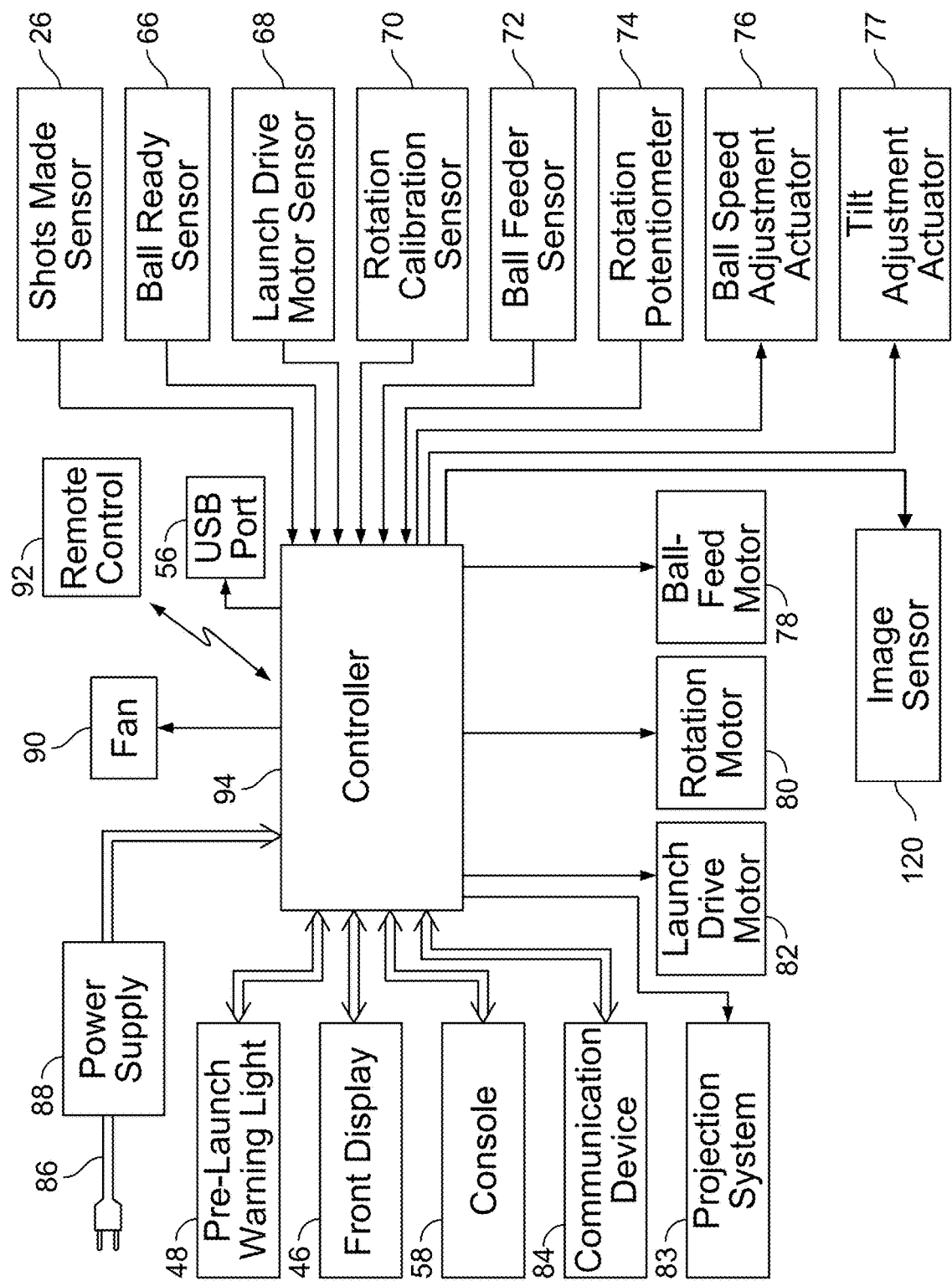
FIG. 4 is a block diagram of the control system of the ball delivery system.

FIG. 4 is a block diagram of the control system of the ball delivery system 14. Shown in FIG. 4 are shots made sensor 26, front display 46, pre-launch warning light 48, USB port 56, console 58, ball ready sensor 66, launch drive motor sensor 68, rotation calibration sensor 70, ball feed sensor 72, rotation potentiometer 74, ball speed adjustment actuator 76, tilt adjustment actuator 77, ball feeder toggle motor 78, rotation motor 80, launch drive motor 82, projection system 83, communication device 84, AC cable 86, power supply 88, fan 90, remote control 92, and controller 94.

Controller 94 is a processor-based controller that coordinates the operation of components of the control system. Controller 94 includes one or more processors and computer-readable memory encoded with instructions that, when executed by the one or more processors, cause controller 94 to operate in accordance with techniques described herein. Examples of one or more processors of controller 94 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory of controller 94 can be configured to store information within controller 94 during operation. Computer-readable memory of controller 94, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the computer-readable memory is a temporary memory, meaning that a primary purpose of the computer-readable memory is not long-term storage. Computer-readable memory, in some examples, includes volatile memory that does not maintain stored contents when electrical power to controller 94 is removed. Examples of volatile memories can include random access memories (RAM), dynamic random access memories (DRAM), static random access memories (SRAM), and other forms of volatile memories. In some examples, computer-readable memory of controller 94 is used to store program instructions for execution by the one or more processors of controller 94. For instance, computer-readable memory of controller 94, in some examples, is used by software or applications running on controller 94 to temporarily store information during program execution.

Computer-readable memory of controller 94, in some examples, also includes one or more computer-readable storage media that can be configured to store larger amounts of information than volatile memory. In some examples, computer-readable memory of controller 94 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Sensors 26, 66, 68, 72, and 120 are used by controller 94 in coordinating and controller the operation of motors 78, 80, 82, as well as ball speed adjustment actuator 76 and tilt adjustment actuator 77. Calibration sensors 70 are used by controller 94 during setup to provide calibration of the signal from potentiometer 74, which is used to determine the rotational position of ball delivery machine 32. The image sensor 120 can include a charge-coupled device (CCD), active-pixel sensor, complementary metal oxide sensor (CMOS), extrinsic semiconductor, or other element capable of capturing a view of the environment.

Controller 94 utilizes communication device(s) 84 to communicate with external devices via one or more wired or wireless communication networks, or both. Communication device(s) 84 can include any one or more communication devices, such as network interface cards (e.g., Ethernet cards), optical transceivers, radio frequency transceivers, Bluetooth transceivers, 3G or 4G transceivers, and WiFi radio computing devices.

In operation, controller 94 communicates with, e.g., a remote computing device to receive a workout program including indications of positions of selected ball delivery locations, ball delivery timing (e.g., tempo) information, a number of balls delivered per location, a type of pass (e.g., chest pass, bounce pass, lob pass, or other type of pass), a selected ball delivery height, and position information of ball delivery machine 32 relative to a visual representation of at least a portion of a basketball court presented by a graphical user interface executed by, e.g., a remote server device. As is further described below, controller 94 controls operation of components of the control system, such as ball speed adjustment actuator 76, tilt adjustment actuator 77, ball feeder toggle motor 78, rotation motor 80, and launch drive motor 82 to deliver balls to the selected ball delivery locations according to the received information. In certain examples, controller 94 controls operation of projection system 83 to project optical indications on the basketball court. For example, projection system 83 can include one or more light sources (e.g., LEDs, halogen or incandescent light bulbs, or other light sources) configured to be angularly controlled to emit visible light at locations and/or patterns on the basketball court. The one or more light sources can be colored light sources (or controllable to emit a determined light color). Controller 94 can control operation of projection system 83 to project optical indications, such as colored or uncolored light spots on the basketball court to visually indicate, e.g., one or more of a next selected ball delivery location, a next user shot location, or other indications, as is further described below.

As such, controller 94 controls operation of components of the control system of ball delivery machine 32 to deliver balls to selected ball delivery locations according to, e.g., user instructions received via a graphical user interface that presents a visual representation of at least a portion of a basketball court.

Figure 5:
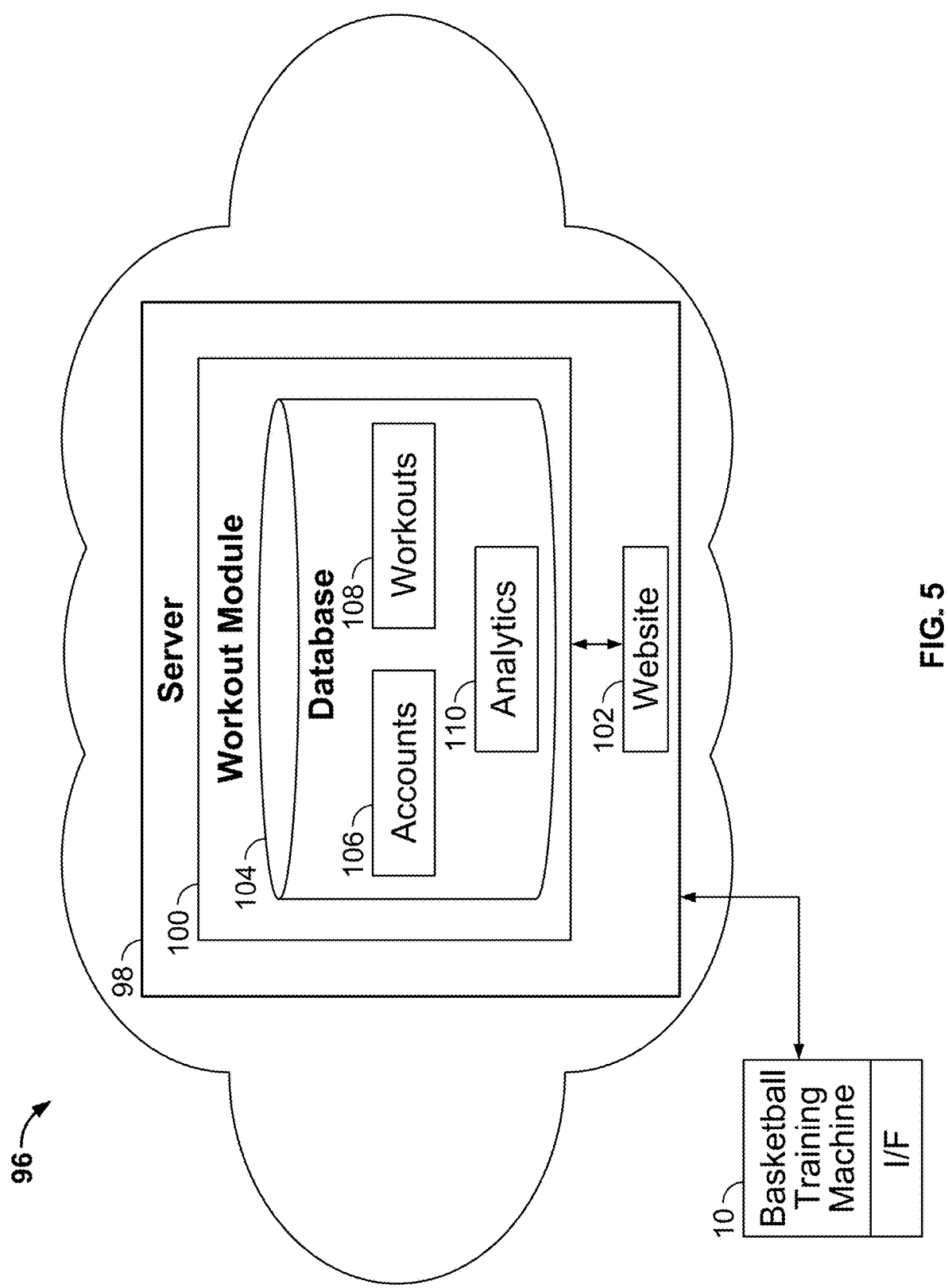
FIG. 5 is a block diagram of a basketball training system that includes a basketball training machine communicatively coupled with a server that executes a workout module to generate a workout program executed by the basketball training machine.

FIG. 5 is a block diagram of basketball training system 96 that includes basketball training machine 10 communicatively coupled with server 98 that executes workout module 100 to generate a workout program executed by basketball training machine 10. As illustrated in FIG. 5, server 98 includes workout module 100 and website 102. Workout module 100 includes database 104, which includes accounts 106, workouts 108, and analytics 110.

Server 98, as illustrated in FIG. 5, can be a cloud-based or otherwise remote server computer including one or more processors and computer-readable memory encoded with instructions that, when executed by the one or more processors, cause server 98 to execute workout module 100 and website 102 according to techniques described herein. Examples of server 98 include, but are not limited to, mainframe computers, desktop computers, laptop computers, or other computing devices capable of implementing workout module 100 and managing operation of (e.g., serving of) website 102. In some examples, rather than a single server device, server 98 may be implemented as a server system including a plurality of interconnected server computers that distribute functionality attributed herein to server 98 among the multiple server computers. For instance, in certain examples, server 98 can be implemented as a server system including a first server computer that executes workout module 100 and a second server computer that executes (e.g., serves) website 102. Similarly, while database 104 is illustrated as included in workout module 100 of server 98, database 104 can include any one or more databases that may be local to server 98 or distributed among any one or more server devices operatively connected to server 98.

Database 104 can be a relational database, hierarchical database, multidimensional database, or other type of database capable of storing information in an organized manner for later retrieval by, e.g., workout module 100 and/or website 102. Database 104, as illustrated in FIG. 5, includes accounts 106. Accounts 106 represents account information stored within database 104 and associated with one or more user accounts managed by, e.g., an administrative entity of server 98 (e.g., a manufacturer of basketball training machine 10, a workout programs supplier, or other administrative entity). Accounts 106 includes identity information associated with each of a plurality of user accounts. Identity information includes a unique identifier of the user account (e.g., a user name, user identification number, or other unique identifier), a user passcode (e.g., password, numerical passcode, or alphanumeric passcode including both textual and numerical characters), or other information uniquely associating a user with a corresponding account stored in accounts 106. Accounts 106, in certain examples, includes account parameters for each of the plurality of accounts. Examples of such account parameters include a user skill level, such as middle school player skill level, high school player skill level, collegiate player skill level, professional player skill level, or other skill levels.

In certain examples, accounts 106 associates any one or more of the plurality of accounts with one or more account groups. Account groups are groupings of individual accounts that may be commonly associated via e.g., a team, a school, a peer group, or other common association. For instance, account groups can include team accounts, school accounts, trainer group accounts, coach group accounts, or other group accounts. Accounts 106 can associate individual user accounts with any one or more account groups. For instance, accounts 106 can simultaneously associate a particular user account with one of a plurality of school account groups, one of a plurality of team account groups, and one of a plurality of skill level account groups. Account groups of accounts 106 can be hierarchical in nature, such that account groups can be associated with one or more higher level parent (or other ancestral) account groups and/or one or more child (or other descendant) accounts (or account groups). For instance, each team account group can be hierarchically related as a child account group of a school account group that represents the parent account group to the team account group. Similarly, member accounts (or account groups) of the team account group can be considered child accounts (or account groups) of the team account, and therefore hierarchically related to each of the ancestral team account group and school account groups. As such, user accounts and account groups can be affiliated via ancestral and descendant relationships to provide a hierarchical relationship of user accounts and/or account groups.

Workouts 108 store workout programs that include machine workout instructions that are executed by basketball training machine 10 to deliver basketballs to selected ball delivery locations as well as player workout instructions that represent player activity (e.g., player movement, skill development activities such as dribbling or other ball handling maneuvers, exercise activities such as pushups or sit-ups, or other player activity). Workouts 108 are associated with attributes, such as a workout skill level, workout intensity level, workout time, workout type (e.g., offensive skills development, long range shooting development, short range shooting development, free throw shooting development, agility development, strength development, ball handling development, physical conditioning development, or other workout type), or other attributes. Attributes of workout programs included in workouts 108 can indicate whether a particular workout program (or grouping of workout programs included in, e.g., a workout library) is user-modifiable. For instance, a workout program can be specified (e.g., during creation) as non-modifiable. Non-modifiable workout programs can be executed by players at basketball training machine 10 but not modified by the player prior to execution, thereby providing a common workout program that can be executed (without modification) by multiple players associated with multiple user accounts to enable benchmarking or other comparisons of player skill and/or conditioning, as is further described below.

Workout programs stored at workouts 108 can be associated with any one or more accounts and/or account groups stored in database 104 at accounts 106. For instance, a particular workout program can be associated with (e.g., assigned to) an account group corresponding to a team, and therefore also associated with each individual user account that is a member of the team account group through the hierarchical relationship between the parent team account group and the child user accounts. Workout programs stored at workouts 108 can be associated with a single account of accounts 106 or multiple accounts of accounts 106. As such, workout programs can be generated and stored at workouts 108 of database 104 and utilized by a single user account or shared between multiple user accounts or account groups.

Analytics 110 of database 104 store analytics data (e.g., statistics) associated with any one or more accounts stored at accounts 106 and/or workout programs stored at workouts 108. Examples of analytics data include shooting percentage data, a number of attempted shots, a usage time of basketball training machine 10, user heart rate data during any one or more workout programs (e.g., sensed by a heart rate monitor or other physical monitoring device worn by a player during a workout program), shooting percentage relative to heart rate, movement, position on the basketball court, or other analytics data. Analytics data stored at analytics 110 of database 104 can be associated with a workout program, such that each user account that executes a particular workout program contributes to shared analytics corresponding to the executed workout program. In general, analytics 110 can store any statistical or other analytical data that corresponds to user accounts, user account groups (e.g., team account groups), and workout programs to enable comparison of performance between user accounts, between user accounts and benchmark performance criteria, between time-separated performances of a single user account (or account group), or other comparisons. As such, analytics data stored at analytics 110 can enable a coach, player, or other user to track performance of a single player or group of players over time, to compare performances between players or groups of players, and to track progress of skill development and conditioning of players or groups of players.

As illustrated in FIG. 5, server 98 executes website 102, though in other examples website 102 can be executed by a separate computing device, such as a dedicated web server device. Website 102 is communicatively coupled with workout module 100 to provide a user interface that enables user interaction with workout module 100 to create and select workout programs and view analytics data stored at database 104, as is further described below.

Basketball training machine 10 is communicatively coupled with server 98 to access website 102 via any one or more wired or wireless communication networks, such as a cellular communication network, local area network (LAN), wide area network (WAN) such as the Internet, wireless LAN (WLAN), or other type of communication network. Basketball training machine 10, as illustrated in FIG. 5, includes an interface (illustrated as I/F), such as console 58, a touchscreen interface, a keyboard and/or mouse interface, or other type of interface to enable user interaction with website 102 to create a workout program and/or select a workout program stored at workouts 108 for execution by basketball training machine 10.

In operation, a user accesses website 102 via the interface of basketball training machine 10 to select a workout program stored at workouts 108 and/or create a new workout program via the interface provided by website 102 and managed by workout module 100. Server 98 transmits the selected or created workout program to basketball training machine 10. The workout program includes both machine workout instructions for execution by basketball training machine 10 and player workout instructions representing player activity during workout program. Basketball training machine 10 executes the machine workout instructions by delivering basketballs to identified ball delivery locations at a selected tempo (i.e., relative timing) and tracking made and missed shots via shots made sensor 26. Basketball training machine 10 presents the player instructions for review prior to execution of the workout program and, in certain examples, presents the player instructions during execution of the workout program via a display, speakers, or other output device. Results of the workout program corresponding to made and missed shots, duration of one or more portions of the workout program, or other analytics data can be transmitted by basketball training machine 10 to workout module 100 of server 98 via website 102 (e.g., automatically transmitted or transmitted in response to user input to upload the results to server 98). Accordingly, system 96 enables a user to select one or more workout programs stored at workouts 108 of database 104, create a new workout program that can optionally be stored in workouts 108, and execute the workout program to enable effective training for the player.

Figure 6:
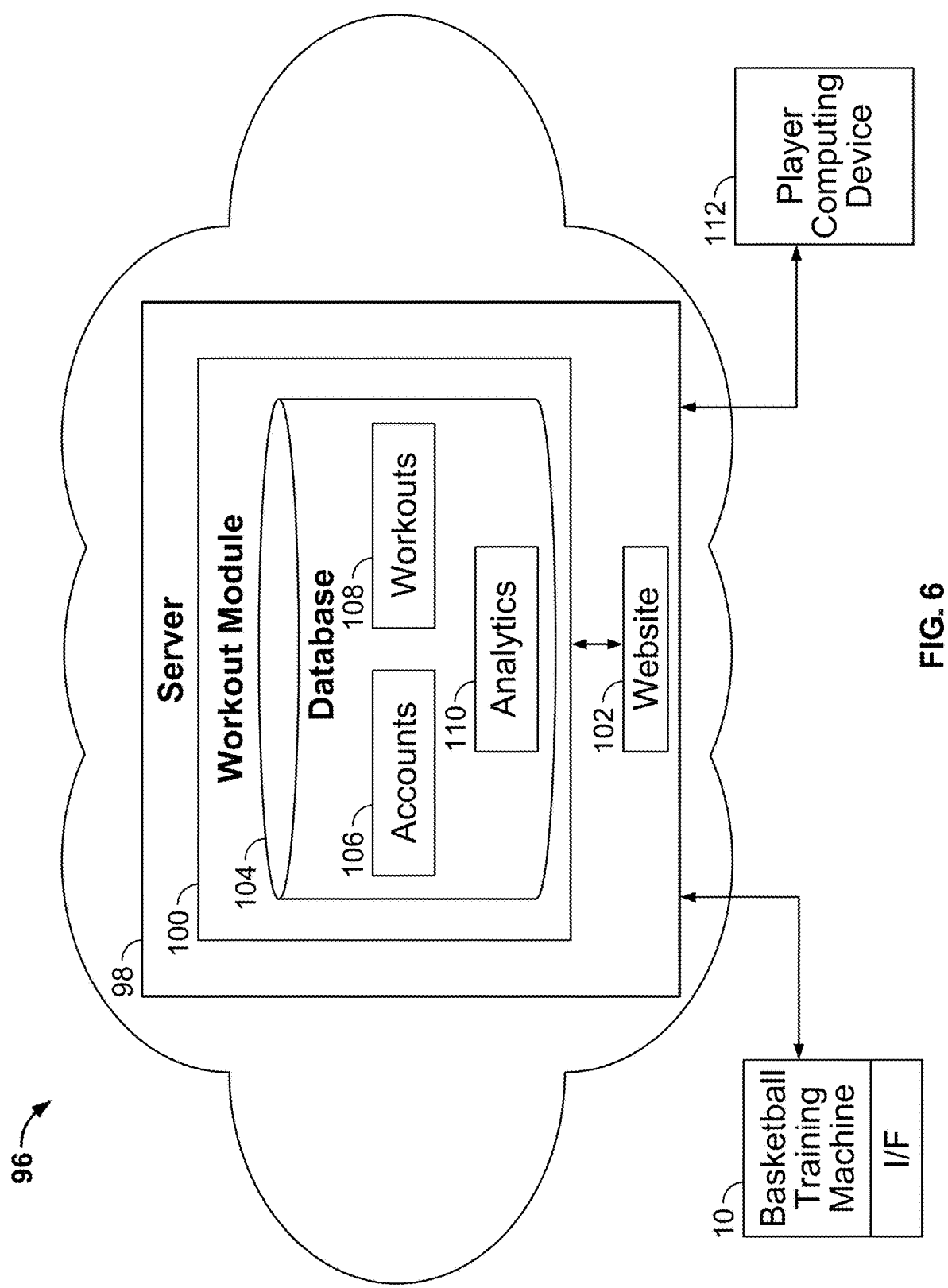
FIG. 6 is a block diagram of another embodiment of the basketball training system including the basketball training machine and a player computing device, each communicatively coupled with the server.

FIG. 6 is a block diagram of another embodiment of basketball training system 96 including basketball training machine 10 and player computing device 112, each communicatively coupled with server 98. That is, in the example of FIG. 6, basketball training system 96 also includes player computing device 112 that is communicatively coupled with server 98 via one or more wired or wireless communication networks, or both. Examples of player computing device 112 include tablet computers, mobile phones (including smartphones), laptop computers, wearable devices such as smartwatches, or other computing devices that can communicate with server 98 to interface with workout module 100. For instance, player computing device 112 can interface with workout module 100 by accessing website 102 via, e.g., the Internet. In some examples, player computing device 112 executes a software application (often referred to as an app) that establishes a communicative connection with server 98 via website 102 or other separate communicative connection and presents a graphical user interface to enable user interaction with workout module 100 to select a workout program stored at workouts 108 of database 104 and/or create a workout program for execution by basketball training machine 10. Though basketball training machine 10 is illustrated in the example of FIG. 6 as including an interface (I/F), basketball training machine 10 need not include a user interface in all examples. For instance, as in the example of FIG. 6, player computing device 112 can serve as the user interface enabling interaction of the player with server 98 and basketball training machine 10. Further, the player computing device 112 can provide one or more image sensors for use in tracking the player visually. For example, a trainer may hold the player computing device 112 or the player computing device 112 can be mounted to a stationary fixture such as a tripod or to the basketball training machine 10.

In operation, a player utilizes player computing device 112 (e.g., a smartphone) to execute an application (e.g., an app) that interfaces with workout module 100 or to access website 102 via a web browser that presents a graphical user interface managed by workout module 100. The graphical user interface presents a login screen that enables the player to provide account login information, such as username and passcode. Workout module 100 accesses the account stored in accounts 106 associated with the login information (or enables the player to create a new account) and presents the user with graphical control elements to either select a workout program stored at workouts 108 of database 104 or create a new workout program, as is further described below.

In response to receiving a selection via player computing device 112 of a stored workout program or creation of a new workout program, server 98 transmits the selected or created workout program including the machine workout instructions and the player workout instructions to basketball training machine 10 via, e.g., website 102 or a separate communicative connection between server 98 and basketball training machine 10. Basketball training machine 10 executes the workout program and generates analytics data in the form of workout results (e.g., made and missed shots, workout timing, or other results) and transmits the results to server 98. Server 98 transmits the results to player computing device 112 which presents the results to the player via a display or other output device of player computing device 112. In some examples, workout module 100 can automatically store the workout results at analytics 110 of database 104 and associate the results with the corresponding user account in accounts 106. In other examples, workout module 100 can store the workout results only in response to received user input via the graphical user interface provided at player computing device 112 to store (e.g., upload) the results to server 98. Accordingly, player computing device 112 can provide a graphical user interface and communication connection that enables user interaction with basketball training machine 10 via server 98. In addition, player computing device 112 can enable player interaction with server 98 to upload results, view and/or create workout programs, or otherwise interact with server 98 whenever player computing device 112 has a communicative connection with server 98 (e.g., via an Internet connection), thereby enabling player interaction from locations that may be remote from basketball training machine 10.

Figure 7:
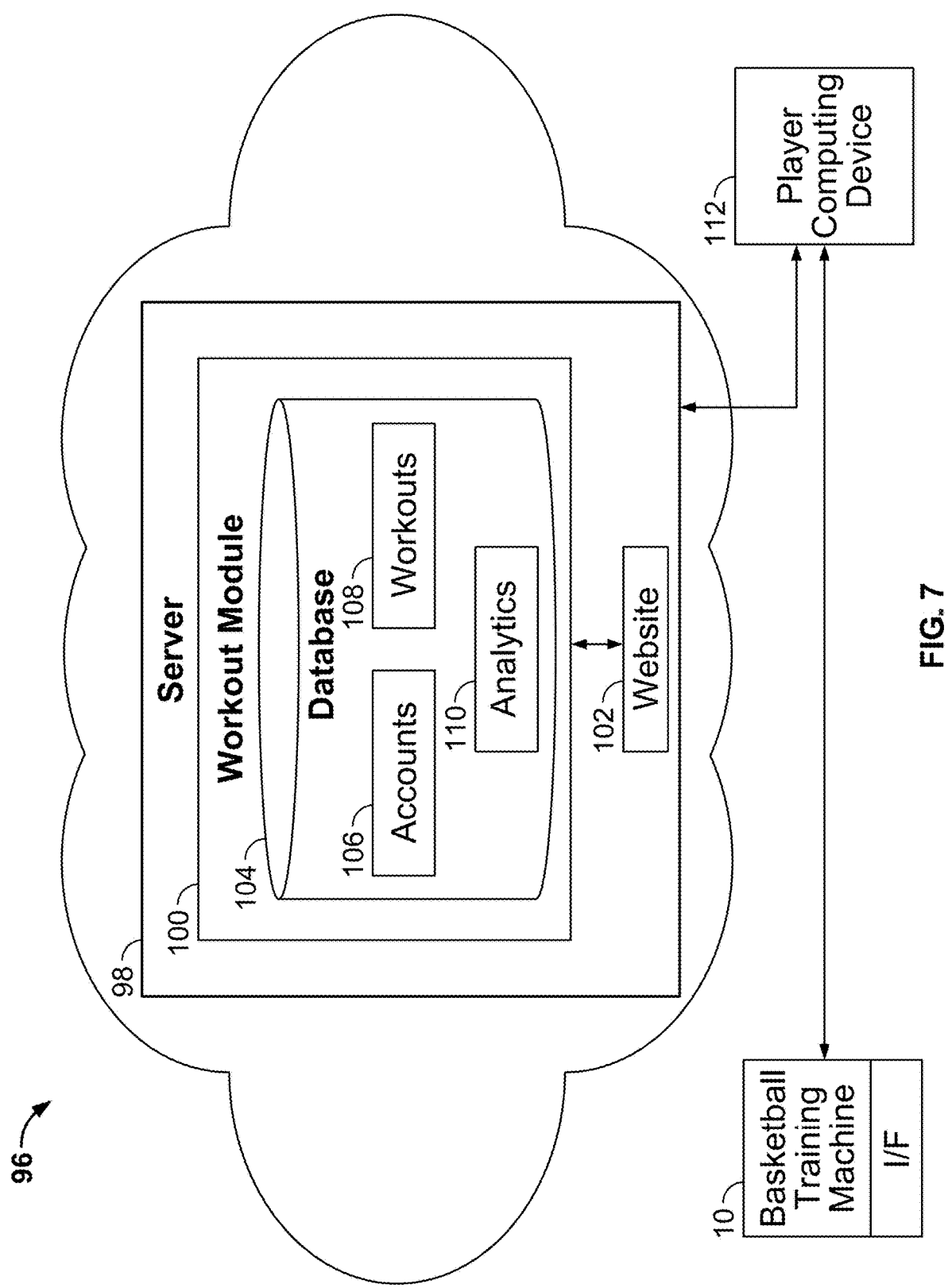
FIG. 7 is a block diagram of another embodiment of the basketball training system including the player computing device communicatively coupled with the server and the basketball training machine communicatively coupled with the player computing device.

FIG. 7 is a block diagram of another embodiment of basketball training system 96 including player computing device 112 communicatively coupled with server 98 and basketball training machine 10 communicatively coupled with player computing device 112. That is, in the example of FIG. 7, basketball training machine 10 is not directly connected to server 98, but rather is directly connected to player computing device 112 via a wired and/or wireless network connection. For instance, player computing device 112 can connect with basketball training machine 10 via a wireless Bluetooth connection, LAN connection, WLAN connection, or other communicative connection.

In the example of FIG. 7, player computing device 112 enables user interaction with server 98 to select a workout program and/or create a new workout program via, e.g., website 102 that is managed by and interfaces with workout module 100. In operation, server 98 transmits the selected or created workout program including the machine workout instructions and player workout instructions to player computing device 112. Player computing device 112 transmits the workout program to basketball training machine 10 via the communicative connection between player computing device 112 and basketball training machine 10. Basketball training machine 10 executes the workout program and transmits results to player computing device 112. Player computing device 112, in this example, transmits the results (automatically or in response to user input to upload the results) to server 98, which stores the results at database 104. As such, player computing device 112 can provide both a user interface and communicative connection to enable user interaction with basketball training machine 10 as well as a communicative connection between basketball training machine 10 and server 98. In this way, basketball training machine 10 need not have a communicative connection with server 98 to receive and execute workout programs stored at or created via workout module 100. As such, player computing device 112 can provide the communicative connection enabling interaction between basketball training machine 10 and server 98 in examples where basketball training machine 10 is either not Internet enabled or does not have access to a wireless network capable of interfacing with server 98.

Figure 8:
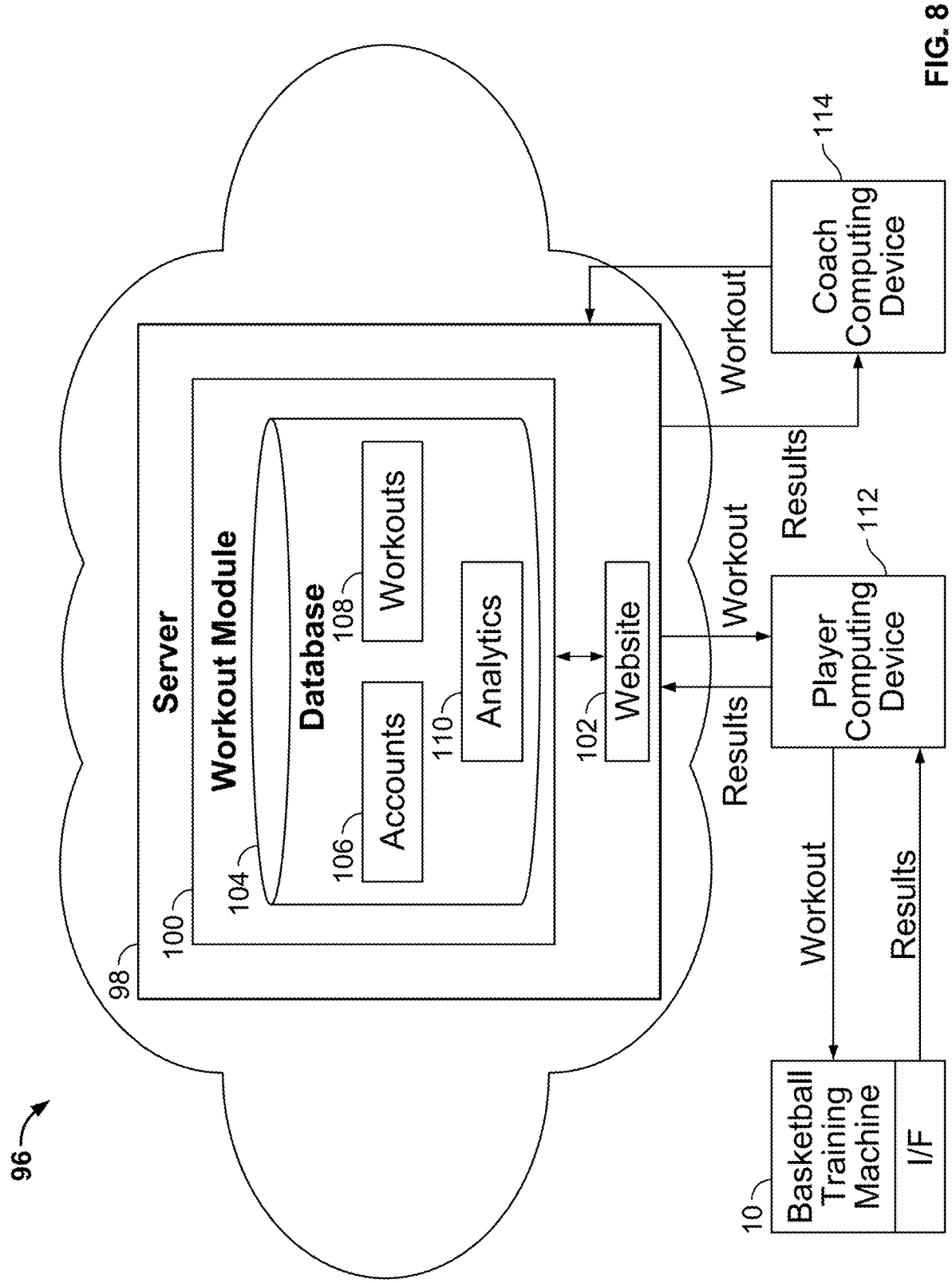
FIG. 8 is a block diagram of another embodiment of the basketball training system including the player computing device and a coach computing device each communicatively coupled with the server, and the basketball training machine communicatively coupled with the player computing device.

FIG. 8 is a block diagram of another embodiment of basketball training system 96 including player computing device 112 and coach computing device 114 each communicatively coupled with server 98, and basketball training machine 10 communicatively coupled with player computing device 112. That is, in the example of FIG. 8, basketball training system 96 also includes coach computing device 114 that is communicatively coupled with server 98 via one or more wired or wireless communication networks. Examples of coach computing device 114 include laptop computers, desktop computers, tablet computers, mobile phones (e.g., smartphones), or other computing devices that can communicate with server 98 to interface with workout module 100. In general, coach computing device 114 provides an additional interface with server 98 to create, select, and/or modify workout programs via workout module 100.

In operation, a coach (or other user) accesses website 102 via coach computing device 114, which may be located remotely from basketball training machine 10 (e.g., in a coach's office or other remote location) to create a workout program via the user interface presented by website 102 and managed by workout module 100. In some examples, coach computing device 114 can assign a created or stored workout program to one or more accounts and/or account groups stored at accounts 106 of database 104. In certain examples, coach computing device 114 can modify a stored workout program prior to assigning the workout program to one or more accounts within database 104.

As illustrated in FIG. 8, coach computing device 114 accesses server 98 via website 102 managed by workout module 100 to create a new workout program, access (and, in some examples, modify) a workout program stored at workouts 108, and assign the workout program to one or more accounts. Player computing device 112, accessing server 98 via, e.g., an app or website 102, receives a notification that a workout program has been created for (or assigned to) an account to which a player is logged in via player computing device 112. In response, player computing device 112 downloads the workout program from server 98 (e.g., via the app or website 102) automatically or in response to player input via received via player computing device 112 to download the workout program. Player computing device 112 transmits the workout program to basketball training machine 10, including both machine workout instructions and player workout instructions, via a wired or wireless connection between player computing device 112 and basketball training machine 10. In other examples, such as when basketball training machine 10 is communicatively coupled with server 98 (e.g., via Internet connection), basketball training machine 10 can receive the workout program via the communicative connection with server 98. Basketball training machine 10 executes the workout program, and transmits the workout results (e.g., made shots, missed shots, workout timing information, or other analytics data) to player computing device 112, which uploads the results to server 98 (e.g., automatically or in response to user input to upload the results). Server 98 stores the workout results at analytics 110 of database 104 and associates the workout results with the user account in accounts 106 to which the player logged in via player computing device 112. Server 98 further transmits the workout results to coach computing device 114 (e.g., automatically or in response to user input to retrieve the results from coach computing device 114, such as via website 102).

Coach computing device 114 can access and/or modify goals and practice plans, managed by workout module 100 and stored at database 104 and associated with one or more of accounts 106. For example, workout module 100 can present graphical control elements via, e.g., website 102 to enable a coach or other user to create and assign goals to one or more of accounts 106. Examples of goals include number of attempted shots goals, number of made shots goals, total training time goals, shooting percentage goals, or other goals. Practice plans can include one or more workout programs assigned to the one or more of accounts 106 that can be designed to help a player achieve a desired level of performance, such as one or more goals associated with a player account.

In some examples, coach computing device 114 can access and modify scheduling corresponding to a time schedule of the use of basketball training machine 10 associated with one or more of accounts 106. For instance, workout module 100 can present graphical control elements, such as graphical calendaring control elements, via website 102 to enable a coach or other user to schedule workout times during which a corresponding account is designated for use of basketball training machine 10. Accordingly, scheduling controls managed by workout module 100 can enable the coach or other user (e.g., player) to assign workout times to one or more accounts (or account groups) to enable effective scheduling and use of basketball training machine 10 which may be utilized by multiple players associated with multiple accounts. In some examples, the coach or other user can assign a workout time to an account within accounts 106. In response, workout module 100 can transmit a notification to the corresponding account (e.g., via a notification on an app executing on player computing device 112) indicating the scheduled workout time. In certain examples, a player or other user can reserve a workout time via, e.g., player computing device 112. In response, calendaring controls managed by workout module 100 can associate the reserved time with the corresponding account and can indicate to other accessing accounts that the time is reserved.

Accordingly, basketball training system 96 including coach computing device 114 that interfaces with workout module 100 via, e.g., website 102, enables coach (or other third party) interaction with workout module 100 to create new workout programs, access and/or modify stored workout programs, assign workout programs, goals, and/or workout programs to individual and/or group accounts, schedule use of basketball training machine 10 among multiple accounts, and track progress of the corresponding players via coach computing device 114. Such remote access via coach computing device 114 can enable the coach or other user to, e.g., setup workout routines for a team or tailored to individual players at times and locations that may be more convenient than during a practice session at a basketball facility where basketball training machine 10 is located. Moreover, the coach or other user can access and review training results corresponding to the workout programs at any time or location that the coach or other user can access server 98 via a communicative connection between coach computing device 114 and server 98, such as during non-practice hours. As such, basketball training system 96 that enables remote access to server 98 via coach computing device 114 provides greater flexibility for coaches or other users to generate workout programs and review workout results than other systems that may require colocation of the coach or other user with basketball training machine 10 to access such workout program generation and review operations.

Figure 9:
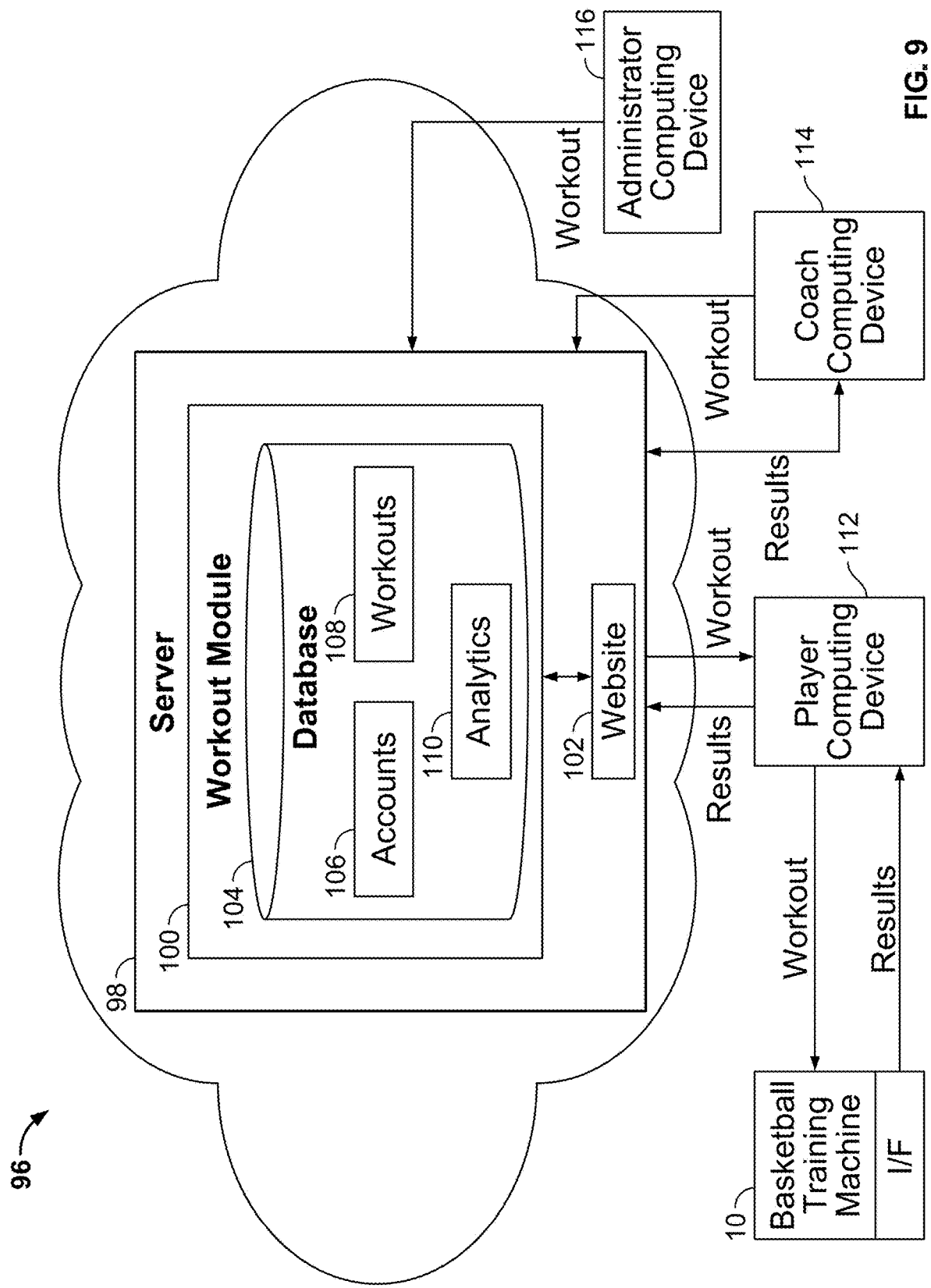
FIG. 9 is a block diagram of another embodiment of the basketball training system including the player computing device, the coach computing device, and an administrator computing device each communicatively coupled with the server, and the basketball training machine communicatively coupled with the player computing device.

FIG. 9 is a block diagram of another embodiment of basketball training system 96 including player computing device 112, coach computing device 114, and administrator computing device 116 each communicatively coupled with server 98, and basketball training machine 10 communicatively coupled with player computing device 112. That is, in the example of FIG. 9, basketball training system 96 also includes administrator computing device 116 that is communicatively coupled with server 98 via one or more wired or wireless communication networks. Examples of administrator computing device 116 include desktop computers, laptop computers, tablet computers, mobile phones (including smartphones), or other computing devices that can communicate with server 98 to interface with workout module 100. Administrator computing device 116 can be, e.g., a device that is located at or otherwise managed by an administrative entity of server 98, such as a manufacturer of basketball training machine 10 or other administrative entity.

As illustrated in FIG. 9, administrator computing device 116 accesses server 98 via, e.g., website 102, to create, store, and/or modify workout programs stored at workouts 108 of database 104. For instance, administrator computing device 116 can be utilized by an administrative entity to create workout programs that are stored at workouts 108 and assigned to any one or more accounts or account groups stored at accounts 106 of database 104. For example, administrator computing device 116 can access website 102 to create a library (or libraries) of workout programs that can be accessed by coach computing device 114 to select workout programs and assign the selected workout programs to user accounts that are downloaded by player computing device 112 for execution by basketball training machine 10.

In some examples, administrator computing device 116 can designate any one or more workout programs as non-modifiable. Non-modifiable workout programs can be selected by coach computing device 114 and/or player computing device 112 for execution by basketball training machine 10, but are not modifiable via non-administrator accounts. Administrator accounts are those accounts that are associated with an administrative entity that accesses server 98 via, e.g., administrator computing device 116. Such non-modifiable workout programs can be executed by multiple players and/or coaches to compare workout performance among the multiple players. Accordingly, an administrator or other entity accessing server 98 via an administrator account (e.g., via administrator computing device 116) can provide common workout programs that can be selected (e.g., by coaches) and performed by multiple players, the results of which serve as an objective measure of the players' abilities to perform the workout programs. In this way, the common workout programs can help a coach in selecting players for game-time performance and in helping coaches to guide players to improve performance.

In certain examples, the non-modifiable workout programs can include benchmark criteria, such as benchmark shot performance criteria (e.g., a number of made shots, a number of shots taken in a given time duration, a percentage of made shots, or other benchmark shot performance criteria). In some examples, the benchmark criteria can correspond to performance of the non-modifiable workout program by a particular player, such as a particular professional player. In such examples, players (e.g., high school players) executing the workout program can compare their workout results to those of the benchmark player (e.g., professional player), thereby providing a reference for comparison and a performance goal to achieve.

As described above, those workout programs not designated as non-modifiable can be modified via, e.g., coach computing device 114 and/or player computing device 112. For instance, database 104 can store a library of modifiable workout programs at workouts 108. A coach or other user accessing workouts 108 via coach computing device 114 or a player accessing workouts 108 via player computing device 112 can select one of the workout programs and modify any one or more aspects of the workout program prior to transmitting the workout program to basketball training machine 10 for execution.

Accordingly, basketball training system 96 can enable an administrator or other entity to provide workout programs that can be selected by coaches and/or players for execution by basketball training machine 10. The workout programs can be modifiable or non-modifiable to enable both modifiable templates of workout programs as well as non-modifiable workout programs that can be used for benchmarking or other comparisons of player performance.

Figure 10:
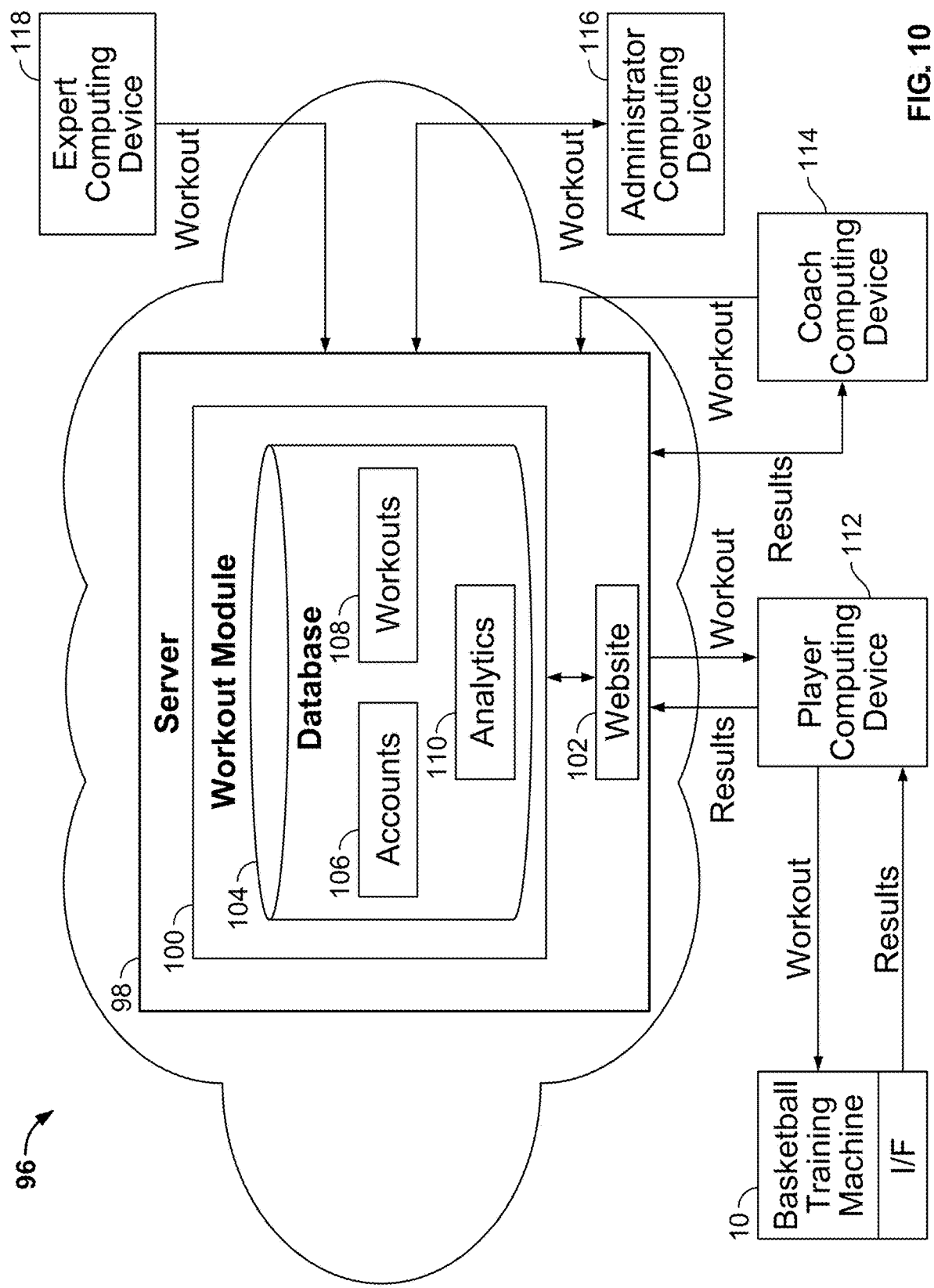
FIG. 10 is a block diagram of another embodiment of the basketball training system including the player computing device, the coach computing device, the administrator computing device, and an expert computing device each communicatively coupled with the server, and the basketball training machine communicatively coupled with the player computing device.

FIG. 10 is a block diagram of another embodiment of basketball training system 96 including player computing device 112, coach computing device 114, administrator computing device 116, and expert computing device 118 each communicatively coupled with server 98, and basketball training machine 10 communicatively coupled with player computing device 112. That is, in the example of FIG. 10, basketball training system 96 also includes expert computing device 118 that is communicatively coupled with server 98 via one or more wired or wireless communication networks. Examples of expert computing device 118 include desktop computers, laptop computers, tablet computers, mobile phones such as smartphones, or other computing devices that can communicate with server 98 to interface with workout module 100.

In the example of FIG. 10, expert computing device 118 can be utilized by a sports training entity (e.g., trainer) or other basketball training expert to provide workout programs that are stored at workouts 108 of database 104. As an example, a training expert, such as a professional or collegiate level basketball coach, a sports trainer, or other expert can access server 98 via website 102 managed by workout module 100 to generate workout programs (e.g., a workout library) corresponding to, e.g., various workout regimens specifically targeted to increase a player's performance in one or more aspects of the game of basketball. Workout programs generated by the expert (e.g., via expert computing device 118) can be accessed and reviewed by an administrator via administrator computing device 116. The administrator can assign any one or more of the workout programs (and, in some examples, rejecting certain workout programs) to any one or more accounts, account groups, or workout libraries stored at database 104. Coach computing device 114, in one example, accesses a library of expert workout programs and assigns one or more of the expert workout programs to corresponding accounts stored at accounts 106 of database 104. A player associated with one of the accounts receives a notification from workout module 100 that a new workout program (i.e., the expert workout program in this example) has been assigned to that player and downloads the workout program via player computing device 112. Player computing device 112 transmits the workout program to basketball training machine 10 (or, in some examples, basketball training machine 10 downloads the workout program direction from server 98). Basketball training machine 10 executes the expert workout program and transmits results to player computing device 112. Player computing device 112 transmits the results, automatically or in response to user input to upload the results, to server 98. A coach or other user can access the results stored at analytics 110 of database 104 via website 102 accessed from, e.g., coach computing device 114. Accordingly, system 96 can enable basketball training experts to provide workout programs that can be vetted by an administrator and selected for use by a coach and/or player with basketball training machine 10. Results of the executed workout program can be stored at database 104 and viewed (and analyzed) by the player and/or coach. As such, system 96 enables coaches and/or players to access workout programs designed for execution on basketball training machine 10 by basketball training experts that may not be directly affiliated with the player, coach, or team, but rather may provide such workout programs as a service (e.g., paid or otherwise) to individuals and groups associated with (e.g., having access to) server 98.

A basketball training system implementing techniques described herein can therefore enable players, coaches, teams, or other entities to generate workout programs for execution by basketball training machine 10 using a graphical user interface managed by workout module 100 and presented via website 102 or other graphical interface. The workout programs can be stored at server 98 (or other computing device accessible by server 98) to enable later retrieval and possible sharing of workout programs among multiple user accounts. The user accounts can be associated with any one or more user groups, thereby facilitating such sharing of workout programs among affiliated users. Workout results, stored by database 104 as analytics 110 and associated with any one or more accounts 106 and/or workouts 108, can be retrieved by any computing device communicatively coupled with server 98 and having access to a corresponding one of accounts 106. In this way, analytics data corresponding to workout results can be reviewed, shared, and analyzed by coaches, players, or other users to facilitate the efficient and effective training of players. The ability of workout module 100 to automatically modify workout programs in response to graphical control elements that select a corresponding skill level or duration of the workout program enables users (e.g., players, coaches, or other users) to efficiently utilize training time for active training with basketball training machine 10, rather than spending such time modifying workout programs to fit the timing constraints or skill level of the player. Moreover, libraries of workout programs generated by an administrator or training expert can enable the coach and/or player to select stored workout programs designed by training experts to draw from their expertise without having direct affiliation (e.g., time spent with) the particular training expert. Accordingly, system 96 implementing workout module 100 to generate workout programs for execution by basketball training machine 10 can significantly enhance the effectiveness and efficiency of the training experience using basketball training machine 10.

Figure 11:
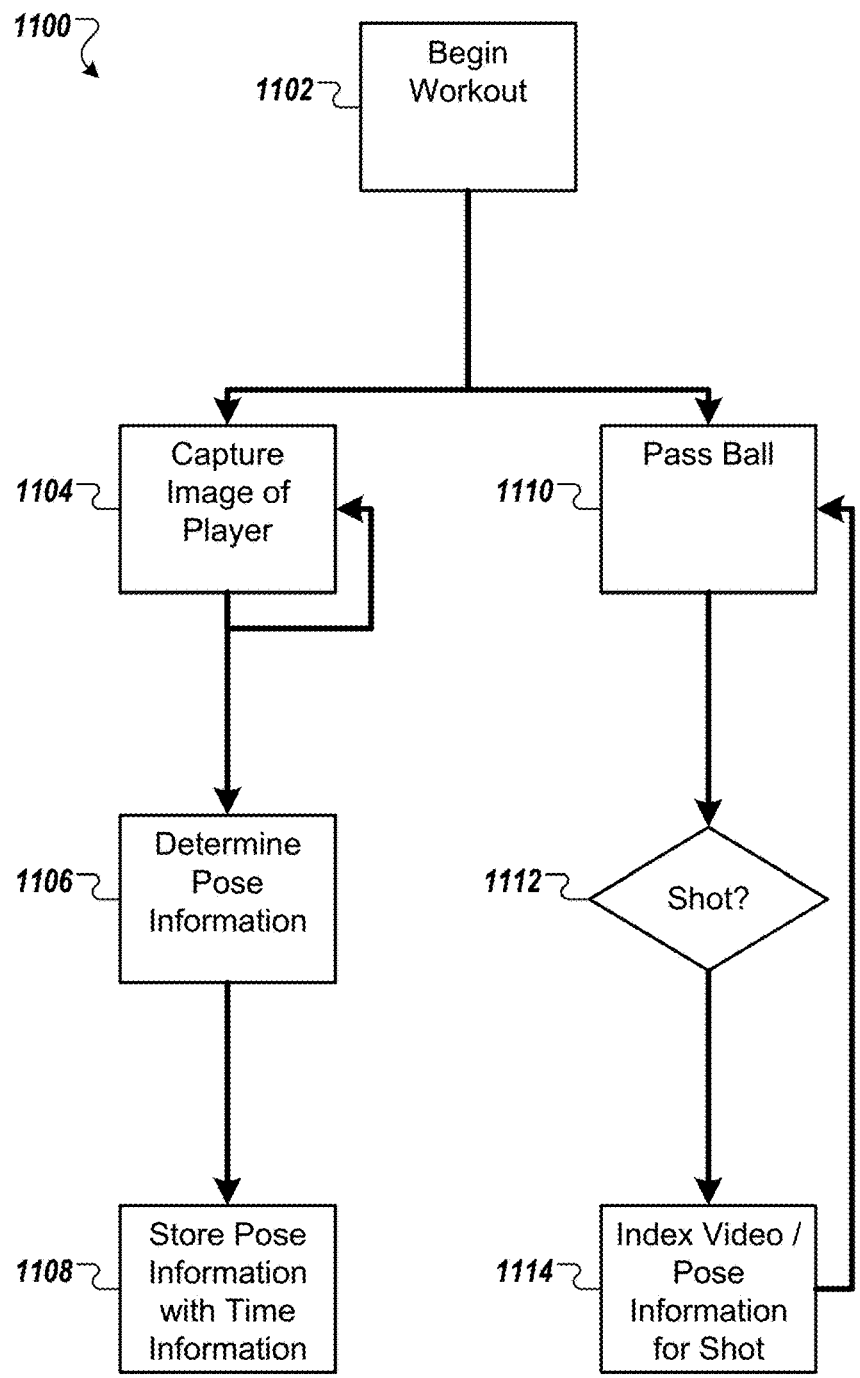
FIG. 11 is a flowchart of an example process for collecting and indexing pose information for a player using a basketball training system.

FIG. 11 is a flowchart of an example process 1100 for collecting and indexing pose information for a player using a basketball training system. In the process 1100, a basketball training system is being used by a player in a training session. A computer vision system is arranged to be able to record video of the player as the player is executing drills in the workout.

The workout is begun 1102. For example, the player or their trainer can select a workout, either of their own selection or one suggested by the basketball training system as described elsewhere in this document. A ball passing machine can load computer instruction such as instructions specifying pass locations, number of passes, etc. User output can be provided to the user from the ball passing machine, from their mobile phone, or from another source to inform the user that the drill is about to begin.

Concurrently, pose information is captured and associated with player performance.

Images or video of the player is captured 1104 as player executes the workout. For example, the basketball passing device can pass the ball to the player, the player can take shots, etc. As this occurs, the computer vision system can collect video of the player.

Pose information is determined 1106 from the video. For example, a computing device with access to the frames (i.e. images) of the video can identify pose information for the player and possibly other players involved in the workout. This can include resolving the most likely arrangement of a pose rig comprising a data structure to represent joints and rigid elements of the human body. A solver can find, for example, the angle values for each joint most likely (e.g., with the lowest error value) to produce an outline of a human matching an outline found of the player. It will be appreciated that other processes for determining pose information can be used, including the use of machine-learning trained classifiers.

Pose information is stored with time information 1108. For example, at each frame, a data object to represent the pose can be stored in a datastore and indexed based on a time value. The time value may be a 24 hour clock representing time of day, may be a time value measuring time elapsed since the start of the workout, or may be a frame number.

At the same time, the work out is being performed by the player. A ball passing machine can pass 1110 a ball to the player and determine 1112 makes, misses, etc. for each shot, or other drill metrics can be observed using the computer vision (e.g., was the shot taken with sufficient elevation) or other sensors (e.g., as a ball detected passing through the hoop).

For each shot (or for each activity of the workout, if additional or different activities are to be performed) video and pose information collected from the user is indexed with the shot. For example, each shot can be assigned a sequential identifier (e.g., 1, 2, 3, 4). Then, video and pose information can be assigned to each shot (e.g., video and pose from time 0:00:00 to 0:00:12, 0:00:12 to 0:00:17, 0:00:17 to 0:00:29, 0:00:30 to 0:00:41).

This information can be stored to disk, used as the basis for real time feedback, used as the basis for later feedback, etc. For example, the pose information for makes and misses may be accessed to analyze what the players shot form was in each kind of shot. With this information, a number of use cases are possible, some of which are described below.

Figure 12:
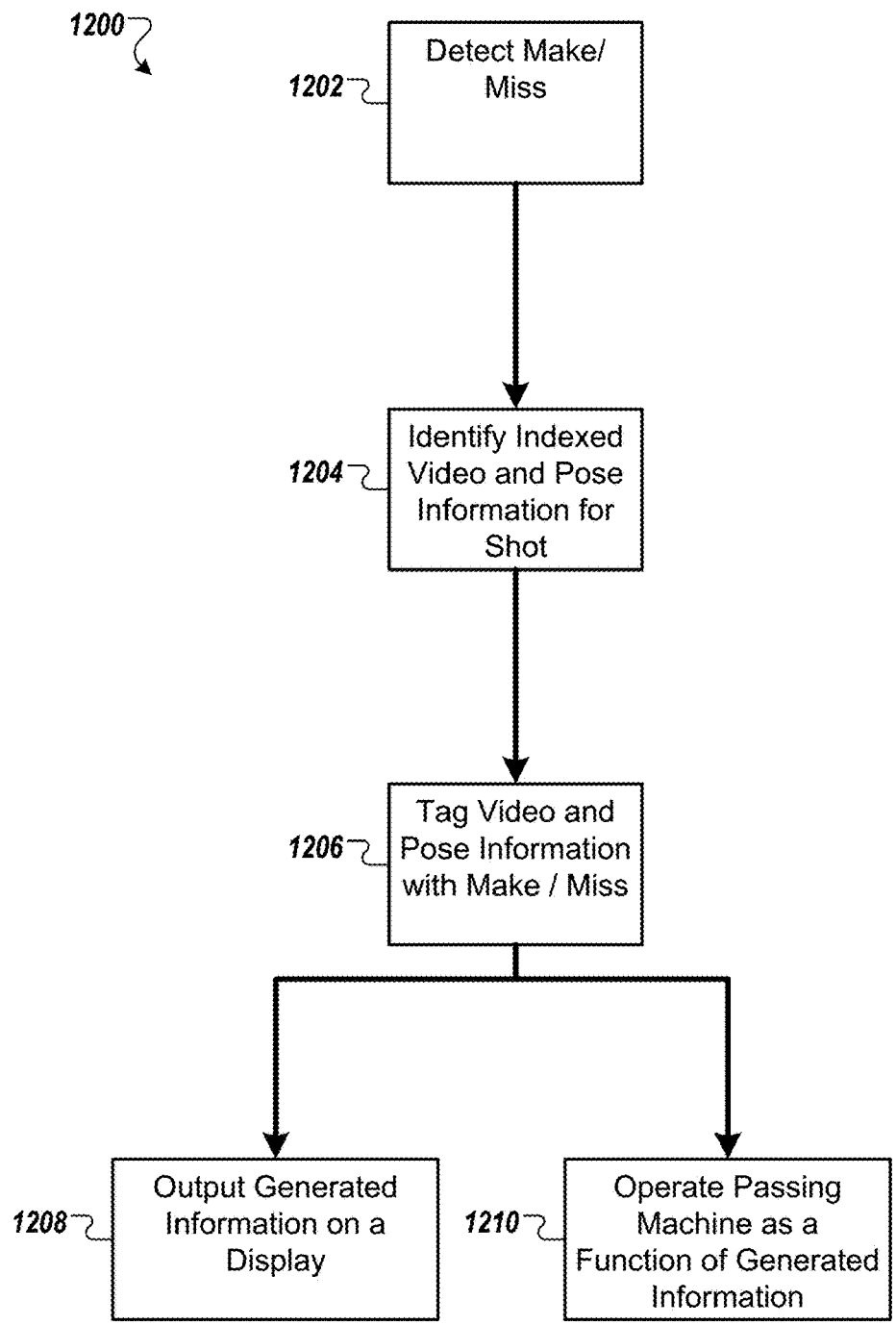
FIG. 12 is a flowchart of an example process for tagging video and pose information with make and miss information.

FIG. 12 is a flowchart of an example process 1200 for tagging video and pose information with make and miss information. For example, the process 1200 can be performed after, or concurrently with, process 1100 to generate information about a workout or multiple workouts or a single drill in a workout, etc.

Makes and misses are detected 1202. For example, the basketball training system may use one or more sensors to identify when a shot results in the ball passing through the hoop or missing the hoop. These sensors can include, but are not limited to, contacting sensors such as vibration sensors or pressure switches attached to or positioned within the hoop. These sensors can include, but are not limited to, non-contacting sensors such as vision sensors or time of flight sensors. Depending on the type of sensor and the type of data it provides, the basketball training system can determine (e.g., with a classifier using heuristic or machine learning logic) if the ball passed through the hoop (make) or did not pass through the hoop (miss). In some cases, more detail than just this binary determination can be provided such as location of the ball as it passes through the hoop (e.g., did it bounce off the backboard? Did it pass through the center of the hoop or off to a side?).

The index of video and pose information for the shot is identified 1204. For example, timing information for the shot within the workout can be compared against video and pose information to find which portions of the video and pose information apply to a given shot. With this information identified, the video and pose information can be tagged 1206 with an identifier for the shot. With this identifier in place, a query can be performed for a given shot to find its video and/or pose and likewise a query can be performed to find a given shot determination given video or pose reference.

Generated information is output on a display 1208. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 1210. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 13:
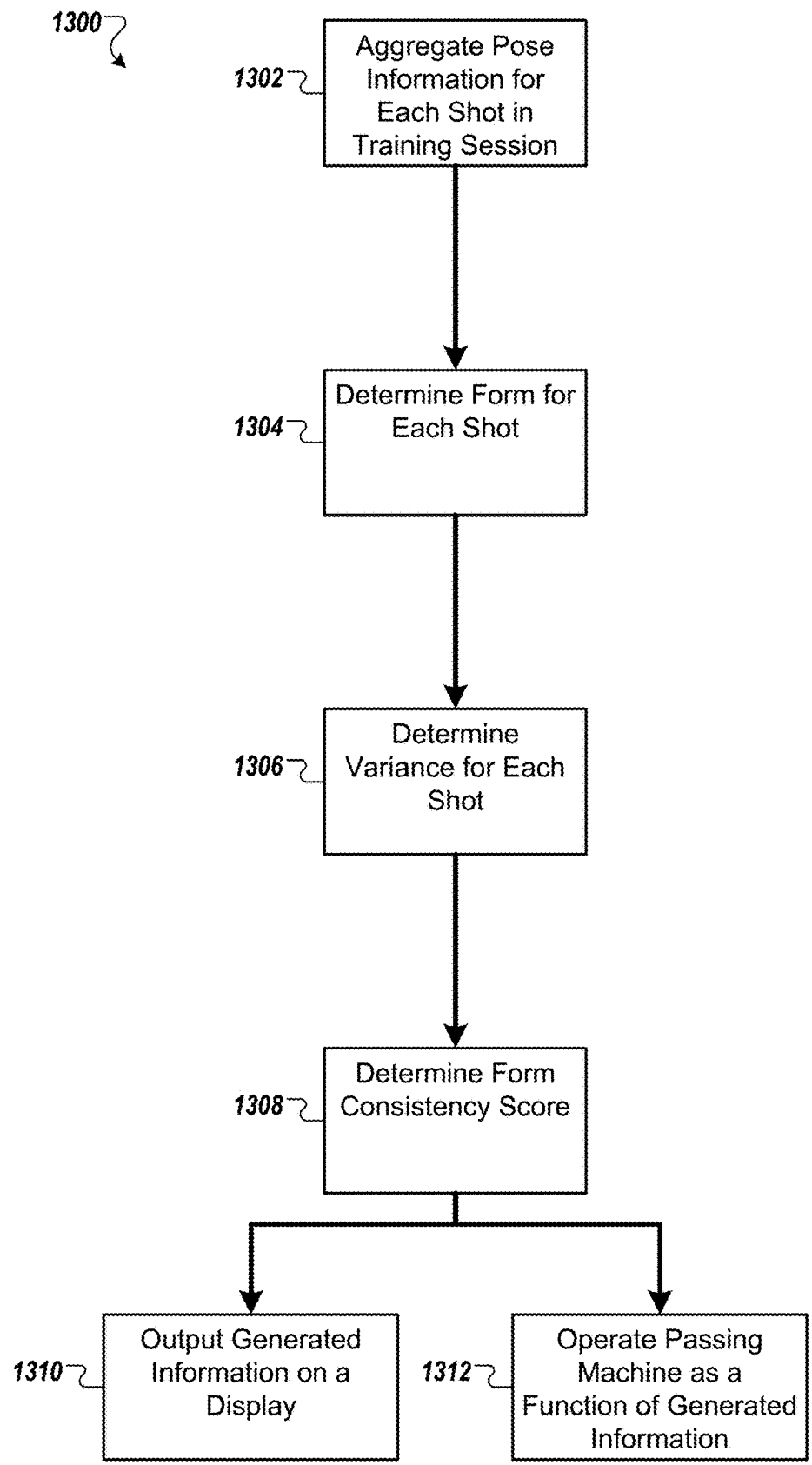
FIG. 13 is a flowchart of an example process for determining a form consistency score.

FIG. 13 is a flowchart of an example process 1300 for determining a form consistency score. For example, the form information may apply basketball-specific analysis to pose information produce actionable information that can apply sports-performance logic. Where the pose information provide raw information about joint angles, limb placement, etc., the form information can provide qualitative analysis to this quantitative data. For example, pose data may include "shoulder angle" and "elbow angle" and "wrist angle" values, while the form information may include "good arm placement" that is derived from these angles. In many cases, the pose information is objective and universal, assuming the player has typical physiology. On the other hand, the form information is subjective and relative. Different trainers operating in different schools of thought may have different opinions on form, and as such the form analysis may be performed using one trainer's or one school-of-thought's understanding of form. In many cases, this understanding is data driven—it can be the result of heuristic or machine learning analysis of pose and shot outcomes, it can be the result of human wisdom and experience codified into data stored on disk, and it may be the result of a hybrid of both types of data.

To analyze form for a single player for a single workout, the pose for each shot is combined with the pose for every other shot. Then that combination is analyzed to represent an overall average performance for the workout. As will be understood, subsets of shots (e.g., all makes, all misses) may be similarly analyzed. However, for the sake of explanation, this example will be described when analyzing every shot of a single workout.

Aggregate pose information for each shot in a training session is created 1302. For example, using the indexed data, each shot identifier is searched within a workout session, and a collection of data objects is made with each data object recording pose for one shot.

Shot form for each shot is found 1304. For example, a form classifier can be created that takes, as input, a pose, and provides, as output, a value indicating the quality of the shot form. This quality metric may be binary (e.g., good/bad) or continuous (e.g., a value from 0 to 1, with 1 matching an ideal form). Additionally or alternatively, the form classifier may provide classifications on various aspects of form. In one example, form is defined as a collection of the following metrics: torso angle, dominant-hand placement, secondary hand placement, shot-launch elevation, and head-angle. Each of those metrics may be assigned a value based on how close or far the given shot's pose was from an idea or if it was within a range of acceptable values.

Variance for each shot is found 1306. For example, for each metric, a statistical measure that reports on variance or consistence can be found. This measure can include one value (e.g., a simple standard deviation) or multiple different types of values (e.g., average number of good shots between bad shots).

A unified form consistency score is determined 1308. In addition to the various variances described, as single unified consistency score may be determined. This can be, for example, on a scale of 0 to 1 or 1 to 100 and directly reported to the player, with the various variances available upon request to help understand what contributed to the consistency score.

Generated information is output on a display 1310. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 1312. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 14:
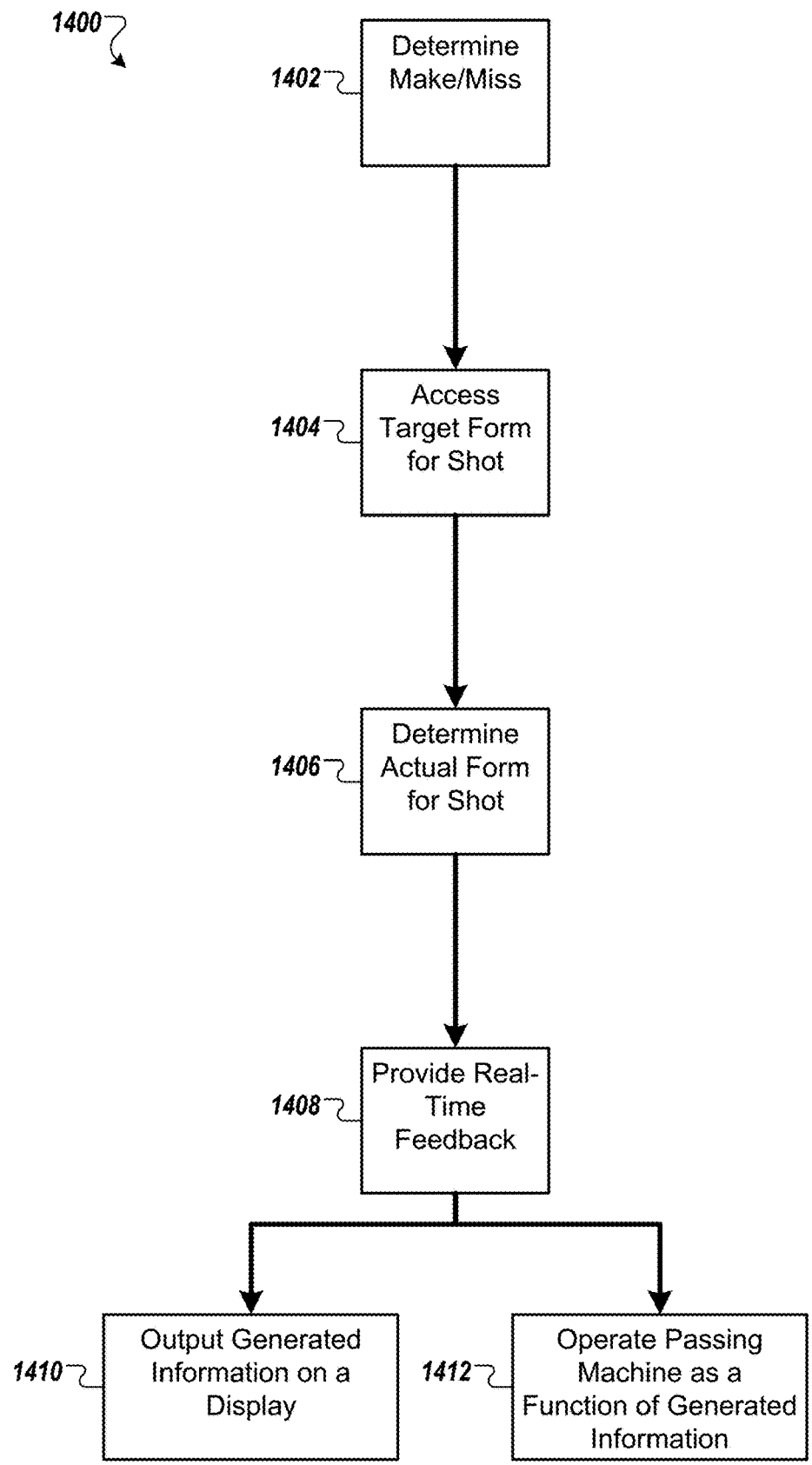
FIG. 14 is a flowchart of an example process for providing real-time feedback to the user of a basketball training system.

FIG. 14 is a flowchart of an example process 1400 for providing real-time feedback to the user of a basketball training system. For example, the process 1400 can be used by a basketball training system as the player is executing a single drill or exercise. This feedback can be in the form of auditory, visual, or haptic feedback such as speaker activation, screen activation, or vibration activation in a wearable device.

Makes and misses in a workout are determined 1402. For example, as the player is performing a workout, shots prescribed by the workout are compared with sensor data to determine if the shot is made (e.g., passes through the hoop) or missed (e.g., not passing through the hoop). In addition, each shot can be tagged with the type of shot it is (e.g., location in the court, layup or not, free-throw or not).

Target form data for the shots is accessed 1404. For example, a library of "ideal" or "exemplary" form data can be stored in computer memory. For each shot, a corresponding target form would specify the best form possible for that given shot. This can be defined in terms of form as described above, but also or instead in terms of pose, depending on how the library is constructed and maintained.

Actual form for each shot is determined 1406 and compared against the target for that shot. With this comparison, a measure of the quality of the shot can be determined in addition to the make or miss of the shot. For example, a player may make a number of shots in spite of the fact that they place their hands on the improper portion of the ball or take an idiosyncratic hop before taking their shot. Similarly, a player may execute proper form on a high-difficulty shot (e.g., long 3-point shot from the top of the court) that nevertheless misses. With this comparison, a player's process (i.e. their form) can be determined instead of their outcome (i.e., make or miss). As will be appreciated, good form can be more predictive of future success in a particular drill than good outcomes-a player with good form who just misses high-difficulty shots is more likely to progress than a player with inconsistent and wild form but who got lucky on a few shots.

Real time feedback is provided 1408. For example, as the player takes shots in the work out, the basketball training system can provide the user with feedback that the player can incorporate while performing the workout. In one example, a player taking the low-probability 3-point shots can take a shot that ends up as a miss. For this shot, the process 1400 can determine that the user's form is good in spite of missing the shot. In 1408, the basketball training system can play a message through a speaker such as "Good form! You'll get it soon." Similarly, if the player then takes another shot with poor form, the real time feedback can tell the user what part of their form was off "Keep your eyes on the hoop next time" can be played if, for example, it is determined that the head angle was out of compliance on that shot.

In some cases, this feedback and other feedback described in this document can be provided in a visual format that compares the recorded form to an ideal or exemplar form. In one instance, a shot with form representative of a player's performance in a drill can be presented as a video contemporaneous with the video of the exemplar. In one case, the player form can be overlaid in the video with partial transparency over video of a professional or expert player taking the same kind of shot. In one case, the player's video can be shown next to the video of the expert.

Generated information is output on a display 1410. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be played by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 1412. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 15:
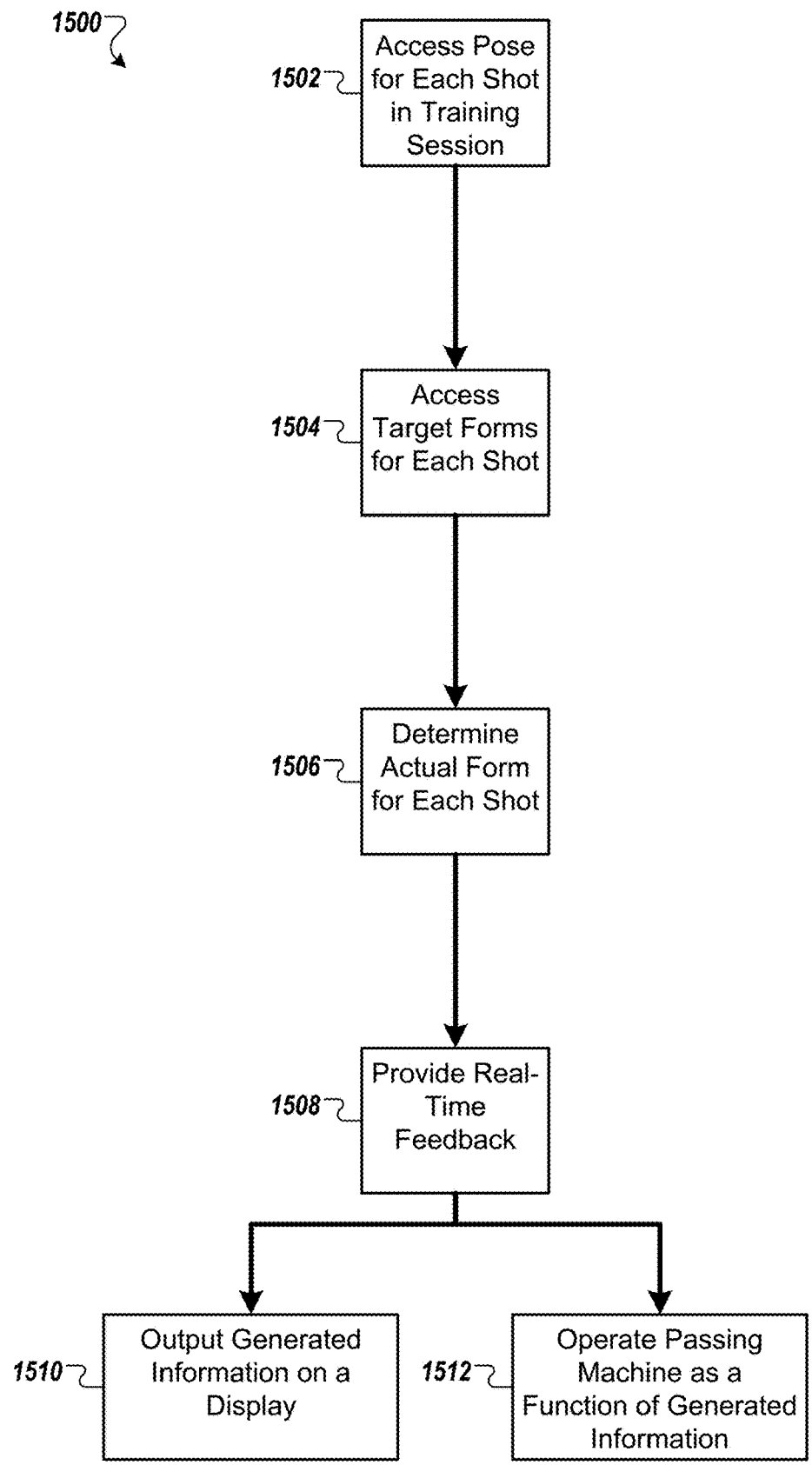
FIG. 15 is a flowchart of an example process for providing real-time feedback to the user of a basketball training system.

FIG. 15 is a flowchart of an example process 1500 for providing real-time feedback to the user of a basketball training system. Where the process 1400 is performed for each shot in a workout, the process 1500 can be used in addition to or in the alternative to provide feedback about the workout (or drill, etc.) as a whole up to that point. Thus, a player may learn that while a few shots in a stretch are out of form, most shots in the workout show good form.

Pose information for each shot in a training session is accessed 1502. For example, all shots in a completed workout, or all shots up to now in an ongoing workout, can be identified and the index for each such shot is found. Then, pose and/or video information for each index is found so that pose data for each shot can be found.

For each shot, target form data is accessed 1504. For example, each type of shot found in 1502 can be classified and a target form looked up in a library of target forms.

Actual form for each shot is determined 1506. For example, the pose for each shot can be compared against the corresponding ideal form or form classifier to determine how close to ideal each of the shots are.

Real time feedback is provided 1508. For example, an aggregate of form deviation can be provided to a player or trainer while a workout is ongoing or after the workout. In one example, a workout may include a player taking shots at the baseline, then running to take 3 point shots. In the time allocated for the player to run to the new shot location, aggregate workout feedback can be provided. For example, the speaker can play output stating "Remember to keep your eyes on the hoop" if this is a common error for the player or "Great consistency!" if the user is showing good shot-to-shot form. Similarly, a log of the workout can be stored by the basketball training system, along with one or more feedback labels or data, and the player or trainer can access that feedback at a later time.

Generated information is output on a display 1510. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 1512. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 16:
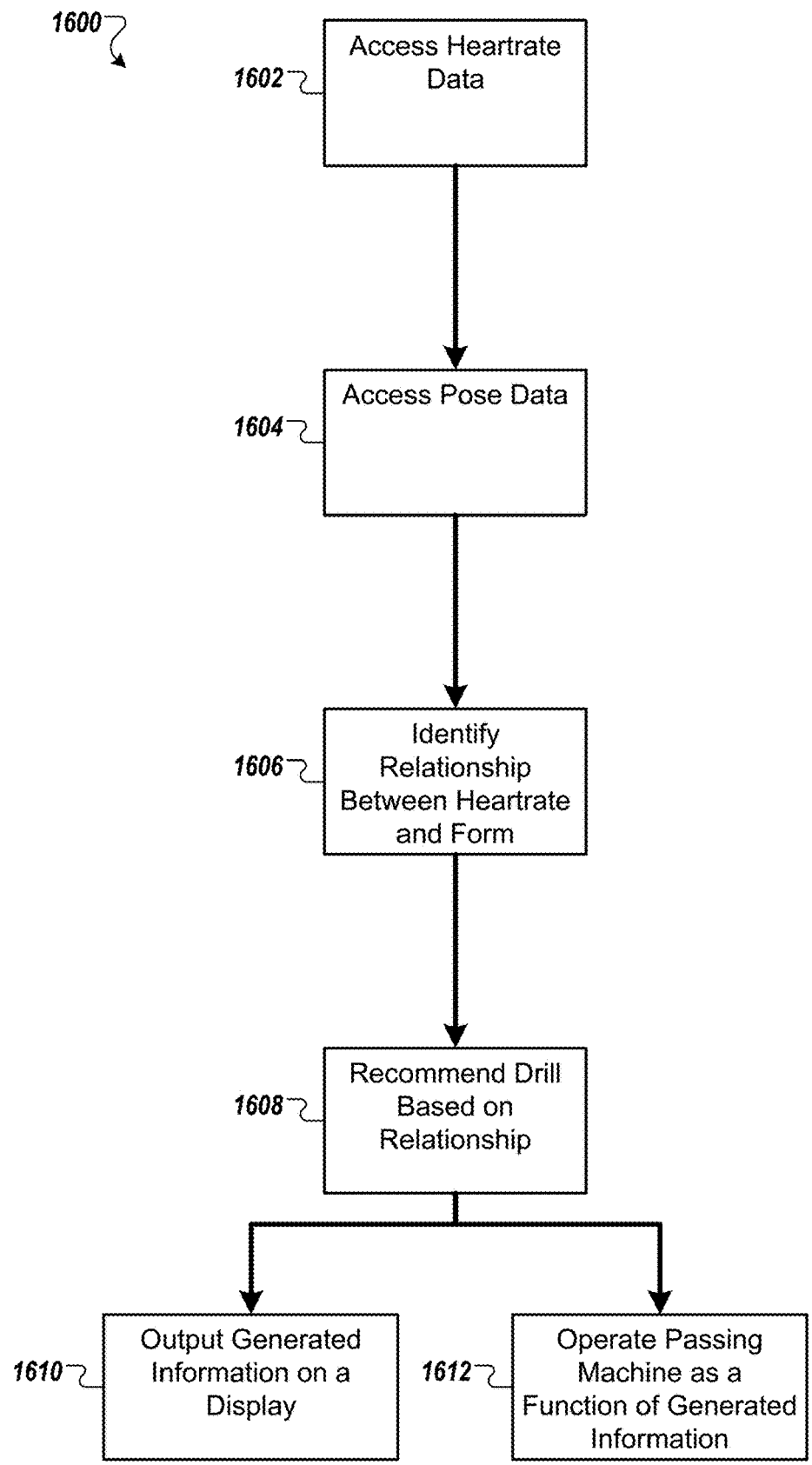
FIG. 16 is a flowchart of an example process for recommending drills to the user of a basketball training system based on heartrate and form.

FIG. 16 is a flowchart of an example process 1600 for recommending drills to the user of a basketball training system based on heartrate and form. In some cases, the player may be using one or more biometric sensors that provide physiological measures to the basketball training system. The basketball training system can then generate correlations between various physiological measures and form data. In this example, heartrate is being used as the physiological measure, but it will be understood that other measures may be used including, but not limited to, blood-oxygen saturation, perspiration level, hydration level, breath rate, % of maximum oxygen volume in respiration (VO2max), blood pressure, etc.

Heartrate data for a workout is accessed 1602 and pose data is accessed 1604. For example, for an ongoing or historic and recorded workout, heartrate data can be indexed for each shot similar to as described for video and pose data for each shot. For each shot, a time-window of pose data (e.g., joint angles) and heartrate data (e.g., average value for the time window or other format) is accessed and grouped.

Relationships between heartrate and form is identified 1606. For example, the basketball training system can score the form of each shot as described elsewhere. This can provide the basketball training system with a table having at least two columns: heartrate and form quality. One or more mathematical relationships can be found. For example, a mathematical equation can be found to define the relationship (e.g., by performing a linear regression). In one example, heartrate values can be bucketed into groups such as "at rest" "moderately elevated" and "greatly elevated" (other systems such as Rated Physical Exertion (RPE) may be used) and form quality for each bucket found.

With these relationships, the basketball training system recommends 1608 one or more drills. For example, it may be found that most players form degrades at a given rate defined by slope value in a linear equation. For a player with a steeper slope, indicating worse degradation of form, the basketball training system may determine that this particular player is struggling when winded-their form is fine when they are fresh but when they get worn out their form falls apart. For this player, the basketball training session can recommend a drill that involves calisthenics (e.g., burpees or sprints) before taking shots so that the user has more opportunities to practice while in that winded condition.

A different player with different performance profiles can be given different drills. For example, consider a highly-trained athlete with little basketball experience (e.g., a collegiate football player or wrestler trying to walk on to a basketball team). This athlete, while at a detriment to basketball-specific skills, may be an expert at performance while winded (i.e., have good general physical preparedness (GPP)). The basketball training system may determine that their performance slow is much shallower than their peers. Heuristics in the basketball training system can record the understanding of trainers that such a player needs to focus on specific skill development, and that such development happens best when in a low state of physiological arousal (i.e., low heartrate, typical breathing). For this player, the basketball training system may determine to recommend drills that are not only without calisthenics, but that also provide more-than-typical amounts of time for the player to move from shot-location to shot-location so that they do not feel the need to run between shots.

In this way, two players with very different performance responses to heartrate can be provided with appropriate and different drill recommendations based on rules logic accessed and analyzed by computing systems based on input recorded by the computing systems.

Generated information is output on a display 1610. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 1612. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 17:
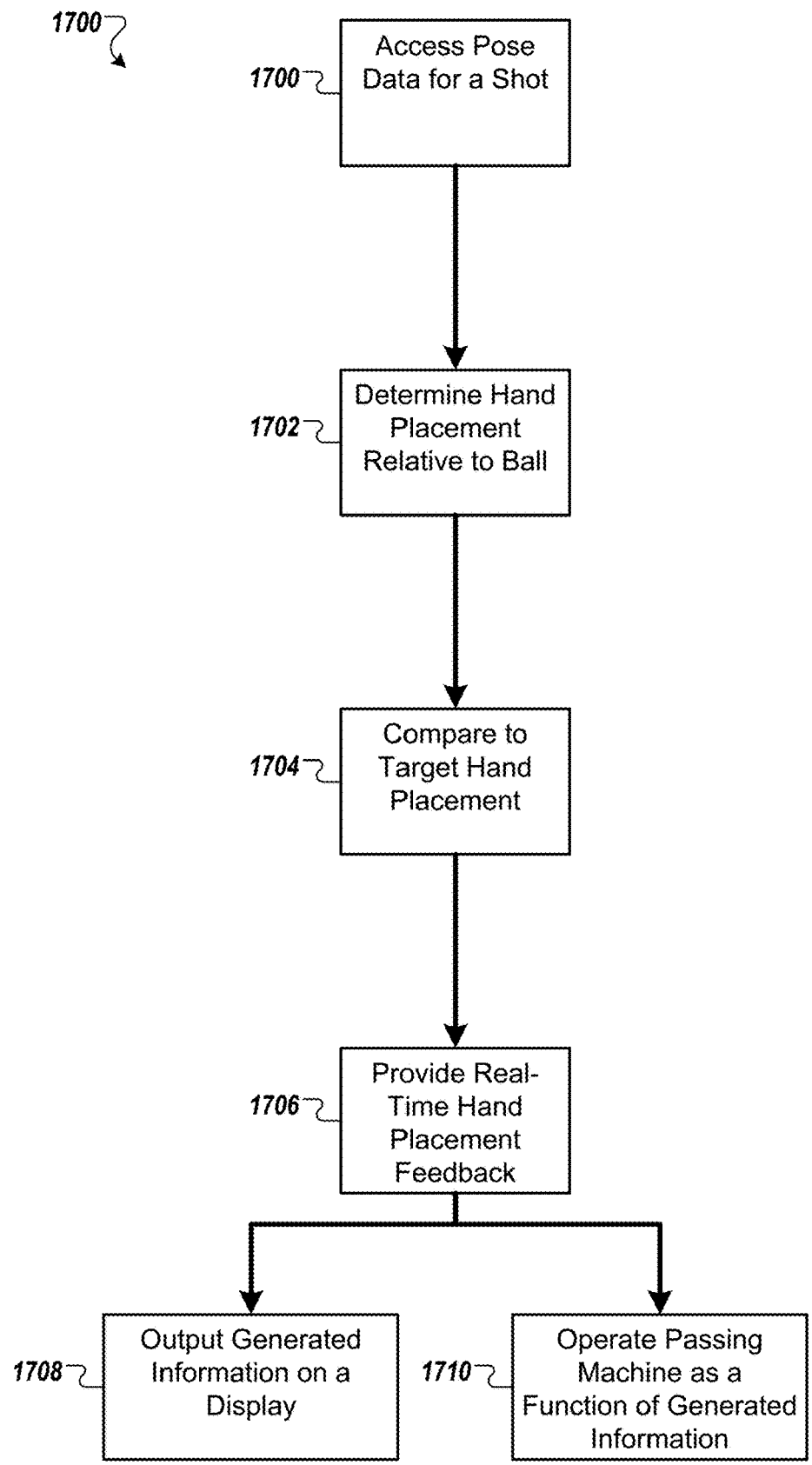
FIG. 17 is a flowchart of an example process for providing real-time hand placement feedback to the user of a basketball training system.

FIG. 17 is a flowchart of an example process 1700 for providing real-time hand placement feedback to the user of a basketball training system. As will be understood, the hand is—or should be—the last part of the player's body to contact the ball when it is shot. As such, many trainers believe that proper hand placement is critical to good form. The process 1700 performs automatic analysis of a player's hand placement when taking shots and can provide real time feedback to the player so that they can develop good habits-and stop bad form before it forms a bad habit.

Pose data for each shot in a workout is accessed 1700. As described elsewhere, this analysis can include analyzing a single shot or all shots in a workout so far. Hand placement of the player relative to the ball is determined 1702. For example, using the pose information, one or more joint angles of the hand, wrist, arm, etc. are examined to determine how and where the player is contacting the ball when shots are taken. One or more hand-placement metrics may be derived for the process 1700, or the raw pose join-angle values may be used.

The actual hand placement is compared to a target hand placement 1704. For example, for each shot, an "ideal" or "exemplary" hand placement metric can be found in a library of such hand placement metrics. Based on the kind of shot taken (e.g., free-throw, lay up) and the location on the court, a shot's hand placement may be identified. Then, the player's actual hand placement is compared to this ideal hand placement, and deviations are found.

Generated information is output on a display 1708. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 1710. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 18:
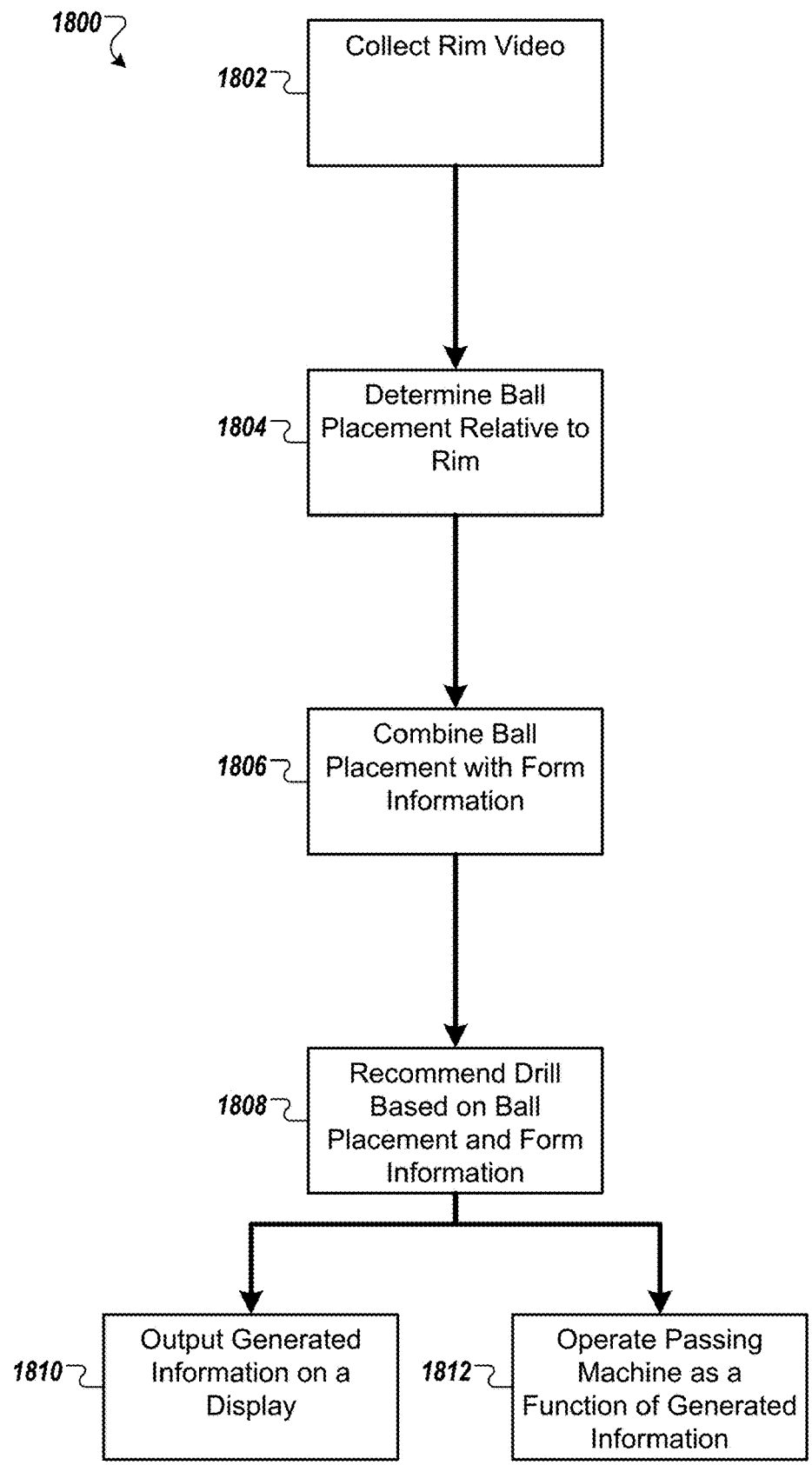
FIG. 18 is a flowchart of an example process for recommending drills to the user of a basketball training system based on ball placement in a shot and on form information.

FIG. 18 is a flowchart of an example process 1800 for recommending drills to the user of a basketball training system based on ball placement in a shot and on form information. In some cases, the basketball training system may be equipped with a rim-sensor that is able to observe where, relative to the rim, a made shot passes. Since the rim of a hoop is larger than the ball, the ball can pass through the hoop and be counted as "made" when passing through an area away from the center of the hoop. This information is useful because, in many cases, most shots should be aimed to pass through the center of the hoop. However, some shot types (e.g., layups) may be better targeted in other areas (e.g., near the back of the hoop). When a player makes a shot, this is generally considered a successful outcome. However, room for improvement can still exist for a player that is not consistent, or that is consistently making shots off-center. As such, this kind of technology can collect shot metrics from events that are too fast for a human to consistently observe and feedback can be provided that is different in quality than the kind of feedback a human trainer unaided with technology can provide.

In this example, the sensor data for the rim is video. This may be video otherwise analyzed to identify pose and form information for the player, or may be a different feed. However, in some cases the video feed may only collect rim information, and different video feeds may be used for the pose and form information. In still other examples, the sensors used to collect the rim information may include data other than video such as LIDAR data.

Rim video is collected 1802. For example, as a workout is underway, the video sensor can collect video of the rim area that will capture made shots as they pass through the hoop. This collection may be used as the only or primary source of data used by the basketball training system to determine if the shot is made or missed, but in some cases other sensors may be used additionally or instead.

The ball placement relative to the rim is determined 1804. For example, analysis of frames can be performed by the basketball training system to determine where the ball is when it passes through the rim of the hoop. In some cases, this can include identifying outlines of various objects in the video, associating the outlines with the various elements of a basketball environment (e.g., hoop, net, ball, player), and reconstructing a path of the ball through the rim.

Ball placement information is combined with form information 1806. For example, using the techniques described in this document, form information for each shot in a workout can be created and indexed. Similarly, the ball-path information of 1804 can be indexed so that each shot has an associated form data-object and also an associated ball-path data object. Analysis of the ball-path data can be performed identify features or properties of the ball path. In one example, a "distance from center" calculation can be performed to find how far a particular ball path is from the center of the rim. In another example, a "distance from ideal" calculation can be performed to find how far a particular ball path is from an ideal location in the hoop, which may or may not be the center of the hoop.

With this information, the basketball training system can draw correlations between form and ball placement. For example, the basketball training system may determine that a particular type of form breakdown (e.g., insufficient elevation) is correlated with made shots that nevertheless are consistently left of center. In another example for another player, the system may determine that similar form breakdown is not correlated with any such inaccuracies in ball placement.

Drills are recommended based on ball placement 1808. For example, the basketball training system may store a library of drills, with each drill having associated metadata indicating which kind of form and ball placement problems the drills help with. For example, a drill to move forward and back in a straight line up and down the court may be used for players with good form but inconsistent ball placement. Another drill may call for a player to take shots until they make five shots with both good form and ball placement in the center of the rim. Based on the form and ball placement information available, a matching drill is found. This drill is communicated to the player, who may then choose to add the drill to a workout.

Generated information is output on a display 1808. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 1810. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 19:
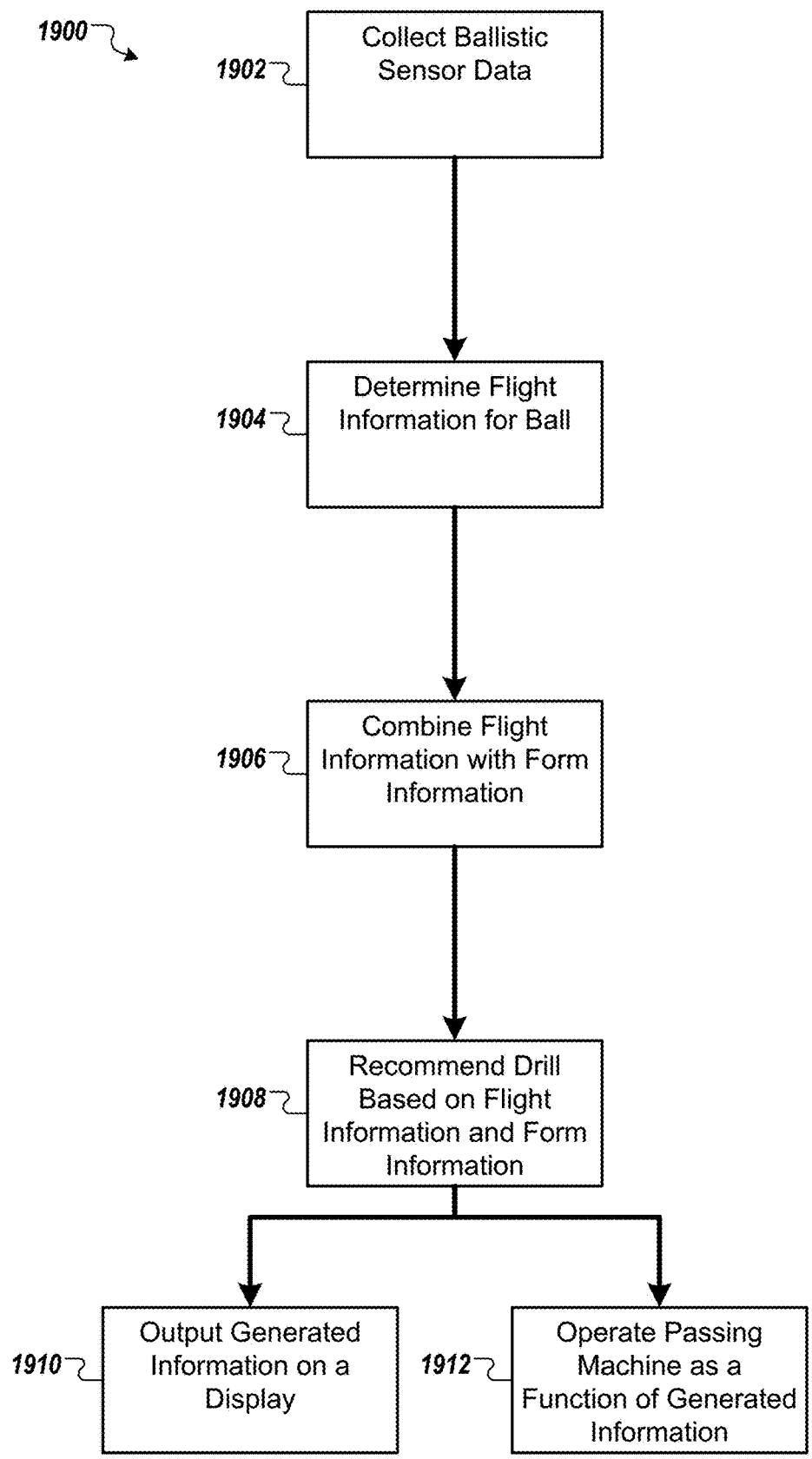
FIG. 19 is a flowchart of an example process for recommending drills to the user of the basketball training system based on flight information and form information.

FIG. 19 is a flowchart of an example process 1900 for recommending drills to the user of the basketball training system based on flight information and form information. In some cases, the basketball training system may be equipped with a flight-sensor that is able to observe where shot, made or missed, travels. When the player shoots the ball, it follows a ballistic path that can be sensed by one or more sensors such as an inertial sensor in the ball, one or more video or other contactless sensors, etc. Similarly, one or more sensors worn by the player may be used to determine the flight of the ball.

When a player makes a shot, this is generally considered a successful outcome. However, room for improvement can still exist for a player that is not consistent, or that is consistently making shots off-center, with poor arc, etc. As such, this kind of technology can collect shot metrics from events that are too fast for a human to consistently observe and feedback can be provided that is different in quality than the kind of feedback a human trainer unaided with technology can provide.

In this example, the sensor data for the ballistic path is video. This may be video otherwise analyzed to identify pose and form information for the player, or may be a different feed. However, in some cases the video feed may only collect ballistic information, and different video feeds may be used for the pose and form information. In still other examples, the sensors used to collect the rim information may include data other than video such as LIDAR data.

Ballistic sensor data collected 1902. For example, as a workout is underway, the video sensor can collect video of the ball travel-path area that will capture made and missed shots as they pass through the hoop (made shots) or do not pass through the hoop (missed shots). This collection may be used as the only or primary source of data used by the basketball training system to determine if the shot is made or missed, but in some cases other sensors may be used additionally or instead.

The ball flight path information is determined 1904. For example, analysis of frames can be performed by the basketball training system to determine where the ball is when it leaves the hands of the players and is shot toward the hoop. In some cases, this can include identifying outlines of various objects in the video, associating the outlines with the various elements of a basketball environment (e.g., hoop, net, ball, player), and reconstructing a path of the ball through the ballistic trajectory.

Ball flight information is combined with form information 1906. For example, using the techniques described in this document, form information for each shot in a workout can be created and indexed. Similarly, the ball-path information of 1604 can be indexed so that each shot has an associated form data-object and also an associated ball-path data object. Analysis of the ball-path data can be performed identify features or properties of the ball path. In one example, "arc" and "spin" calculation can be performed to find how much a particular ball path arcs and how much the ball spins while traveling along that arc. In another example, a "distance from ideal" calculation can be performed to find how far a particular ball path is from an ideal arc for a shot from a particular location on the court and of a particular kind of shot (e.g., free throw vs field goal). In some embodiments, each ball passed by the basketball training machine can have an associated form data object independent of whether ball flight information is available.

With this information, the basketball training system can draw correlations between form and ball path. For example, the basketball training system may determine that a particular type of form breakdown (e.g., insufficient elevation) is correlated with made shots that nevertheless are consistently flat and lacking spin. In another example for another player, the system may determine that similar form breakdown is not correlated with any such inaccuracies in travel path.

Drills are recommended based on flight path information 1908. For example, the basketball training system may store a library of drills, with each drill having associated metadata indicating which kind of form and path problems the drills help with. For example, a drill to take two high jumps before taking a field goal shot may be used to prime the player to jump higher when taking field goal shots. Another drill may call for a player to take shots until they make five shots with both good form and ball arc. Based on the form and path, a matching drill is found. This drill is communicated to the player, who may then choose to add the drill to a workout.

Generated information is output on a display 1908. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 1910. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 20:
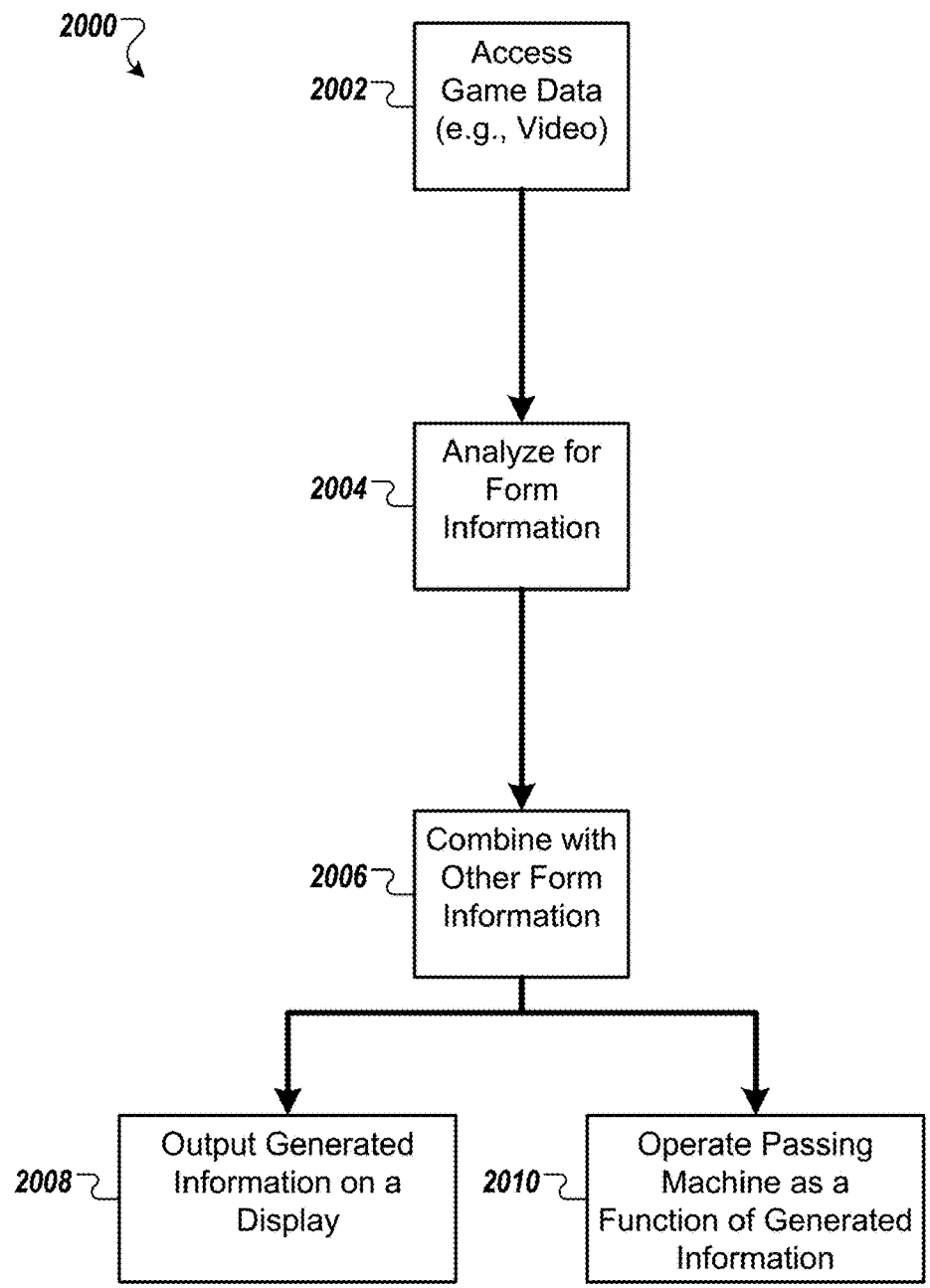
FIG. 20 is a flowchart of an example process for combining form information from game data with form information from training data.

FIG. 20 is a flowchart of an example process 2000 for combining form information from game data with form information from training data. For example, some players may demonstrate good form in an empty, quiet home-court gym, but may struggle when playing on the road, in front of a crowd, or in other game conditions. Conversely, some players may struggle in 'meaningless' practice sessions but thrive under the competitive environment of a game. For these and other players whose practice and game performance diverge, the basketball training program can analyze game footage to generate similar pose, form, ball path, rim placement, or other metrics as those collected during workouts to identify differences in player performance. With this information, the basketball training system is able to recommend drills based on the performance that really matters—in a game. Therefore, processes of the basketball training system described in this document can incorporate this kind of process 2000 in some, any, or all of the drill recommendations or other operations discussed.

Game data is accessed 2002. In some cases, this game data includes video recordings of basketball game. Such video can include professionally recorded video for television broadcast or streaming to fans, can include video recorded by a trainer or teammate for purposes other than video analytics, and can include video recorded specifically for video analytics.

The video is analyzed for form information 2004. For example, using similar or different processes to those used for video captured by the basketball training system in a workout, the pose of the player can be identified from the game video. As will be appreciated, the perspective, lighting, resolution, bit-rate, and other properties of the game video may be identical or divergent from other video discussed, and therefore the same or different computer vision techniques may be required to determine pose information. However, the same pose information (i.e., same pose rig of joints and limbs) may be used, with the same range of joint angles. Similarly, this pose information can be used in the same way to generate form information for the game. In this way, a true one-to-one comparison of poses, and therefore form, can be made between practice and game performance. Pose and form information for the player can be stored and indexed by game, and may be similarly tokenized into each shot taken (or other athletic event) in the game similar to how it is tokenized for each shot taken (or other athletic event) in workouts.

Form information from a game is combined with other form information 2006. For example, the game data may be treated the same as data from workouts and used in the overall assessment of a player. In some examples, game data is contrasted with workout data to identify where a player's game performance diverges from practice performance. One or more rules in a rules engine can be used to determine drill recommendations to recommend to a player based on this divergence. For example, a player that performs well in practice but poorly in game environments may be recommended more drills that involve a trainer or partner acting as a defender to provide the player with more experience overcoming a defender as part of taking a shot, which can be expected to translate into improved game performance. In another example, a player that plays well in a game but poorly in practice may result in a recommendation from the rules engine for drills with more variety, novelty, and game-play elements. For example, the trainer designing the rules may determine that players like this are bored and tune-out the practice workouts. To combat this inclination, the trainer can record drills that tap into competitive personalities (e.g., two players competing for longer streaks of made shots at various points on the court), quest for novelty (e.g., randomizing some parameters of the drill such as number of shots at each location) or game-play instincts (e.g., drills requiring streaks of consecutive makes or shots with good form before the player can advance, coupled with auditory feedback about their performance).

Similarly, the impact of training on game play can be observed with this information, and reports can be generated or drills recommended. For example, a player may exhibit a skill deficiency in game based on video analysis or trainer assessment. The basketball training system may recommend a drill designed to improve this deficiency, and the player may include this drill in their workouts in the off season. Then, next season, game data can be analyzed to determine if this skill has improved. Because practice workouts are by their nature different than games, some players may respond to some drills differently. This type of analysis can allow the basketball training system to monitor in-game performance for actual in-game improvements, and modify drill recommendations for a player (or a population) based on in-game improvements instead of, or in addition to, improvement in the drill itself which may or may not have full carryover to game performance.

Generated information is output on a display 1910. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 1912. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 21:
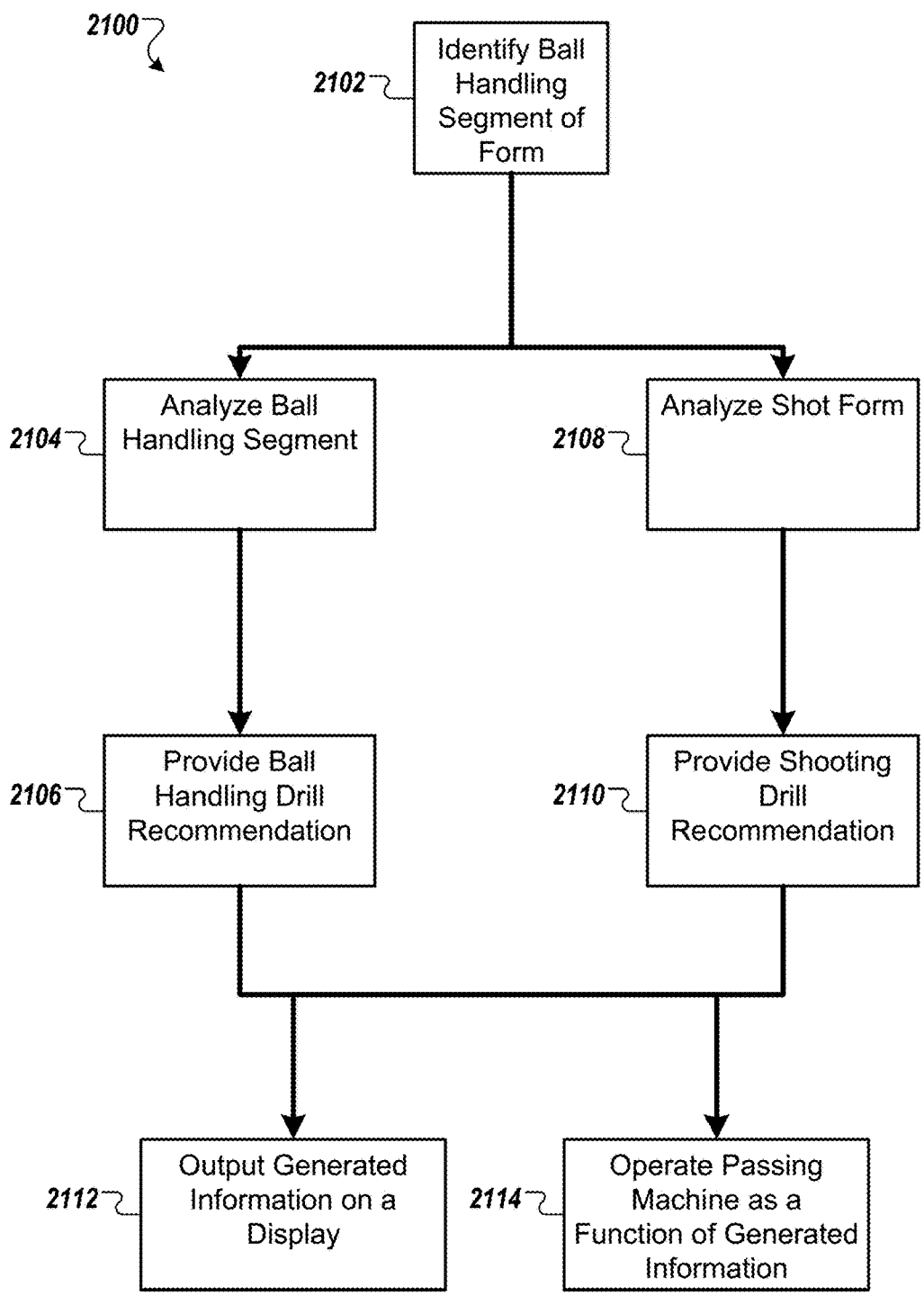
FIG. 21 is a flowchart of an example process for recommending ball handling drills and also shooting drills to the user of a basketball training system.

FIG. 21 is a flowchart of an example process 2100 for recommending ball handling drills and also shooting drills to the user of a basketball training system. In addition to shooting form described elsewhere in this document, the basketball training system can also determine form for other athletic activities including other basketball and non-basketball activities. One such activity is ball handling-dribbling, passing, receiving passes, etc. The basketball training system is capable of analyzing pose information while a player is performing ball handing activities and providing ball-handling drill recommendations.

As described elsewhere, pose and form information is collected and indexed for each shot taken in a workout. Some of these drills call for ball handling for each shot. This can include catching the ball passed by a ball passing machine, and/or may include instructions to dribble the ball, move while dribbling, pass the ball, etc. As such, some portions of the pose and form information will capture the ball handling before or separate from the player taking a shot.

Ball handling segments of form are identified from the form data 2102. For example, the pose or form data may be provided to a classifier that is configured to identify frames in which a player's pose or form indicates a ball-handling activity and to identify frame sin which a player's pose or form indicates a shooting activity. These portions within each shot's data can be indexed according to the activity identified by the classifier.

Concurrently, ball handling can be analyzed and used for recommendations of drills to be included in a workout, and shooting can be analyzed and used for recommendations in a workout. In some cases, both analyses can be used for a single drill that includes both ball handling and shooting elements. In some cases, each element can be used for individual drills for only ball handling or only shooting.

Ball handling segments are analyzed 2104. For example, pose information can be categorized into form information, and that form information can be given one or more metrics. These metrics can be used to identify how well or poorly the ball handling fits with parameters of good ball handling as defined by, for example, a library of exemplar handling forms. Once analyzed, a recommendation for a ball handling drill can be provided 2106.

Similarly, shot form segments are analyzed 2108. For example, pose information can be categorized into form information, and that form information can be given one or more metrics. These metrics can be used to identify how well or poorly the shooting form fits with parameters of good shooting as defined by, for example, a library of exemplar shooting forms. Once analyzed, a recommendation for a shooting drill can be provided 2110.

Generated information is output on a display 2112. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 2114. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 22:
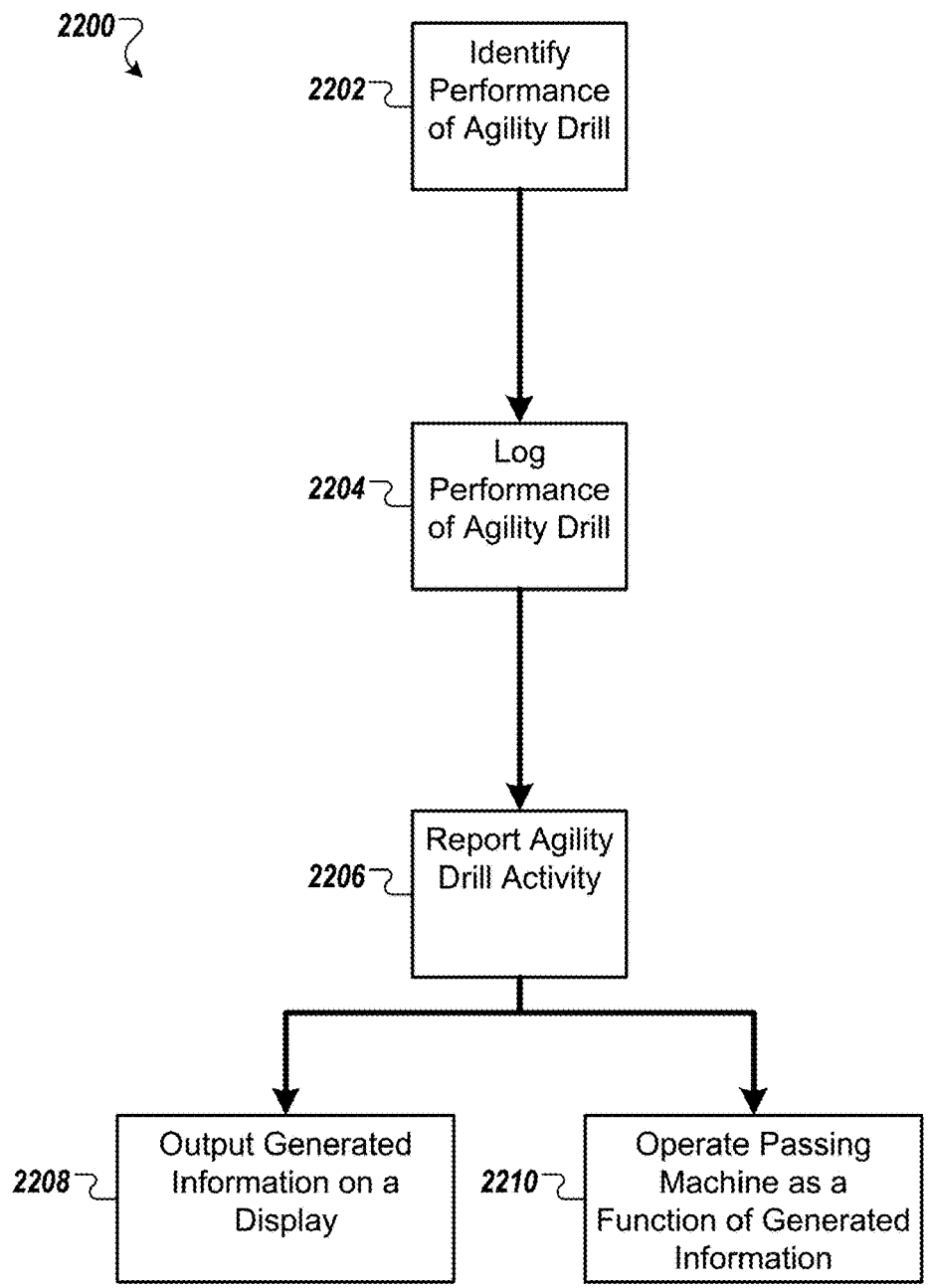
FIG. 22 is a flowchart of an example process for reporting on compliance with an agility drill plan.

FIG. 22 is a flowchart of an example process 2200 for reporting on compliance with an agility drill plan. In some cases, a player may use a basketball training system when executing agility (e.g., cone shuttles or line drills) or GPP drills (e.g., High Intensity Interval Training (HIIT) drills or sprints). The basketball training system can provide workouts that have one or more of these drills, either as part of a basketball-skills workout or without basketball-skills components. For example, a drill in a workout can use audio output to cue the athlete to begin a drill, rest within a drill, or transition to another drill. In addition, the vision sensors of basketball training systems can collect pose information to quantify the completion of the drills. One use of this quantification is for athlete accountability-knowing that they have a recording that they will be creating and looking back on-alone or with their trainer—can help some athletes commit to and execute the workouts that they might want to otherwise avoid. One use of this quantification is for measuring improvements in endurance, speed, or other traits. For example, player may spend a an off-season in a training cycle with two weekly workouts that include a cone shuttle drill where they run figure-8's in sets of ten. In each session, the time taken to perform the ten figure-8's can be recorded to show how the time improves over the months of the training cycle.

Performance of an agility drill is identified 2202. For example, the basketball training system can begin a workout with a HIIT drill. An appropriate audio prompt (e.g., "Burpees, every minute on the minute, ready . . . Begin!") can be provided to the player. As the player performs the burpees, execution of every burpee is tracked by way of the vision system described in this document. For example, as a burpee involves a jump at the end, the pose of the player can be tracked until a jump is performed and finished. As will be understood, other exercises involve other movements, and different types of tracking can be used. Continued audio feedback can be provided through the agility drill (e.g., a beep when the player should begin rest and working sessions).

Performance of the agility drill is logged 2204. For example, as the player performs the drill, real-time feedback can be provided. This may take the form, for example, of a count-down of time in the drill, a count of the number of repetitions performed, etc. In addition or in the alternative, the tracking data can be stored to disk for aggregation and analysis.

A report of the activity drill is generated 2206. For example, the player or the trainer may receive a message (e.g., a notification from the mobile application of the basketball training system, a file accessible upon request, or an email) about the performance of this drill. This may include an accountability report, indicating the player compliance with a schedule of drills. This may include a progress report that shows improvements- or decrements—in the player's level of performance (and thus agility or endurance).

Generated information is output on a display 2208. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 2210. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 23:
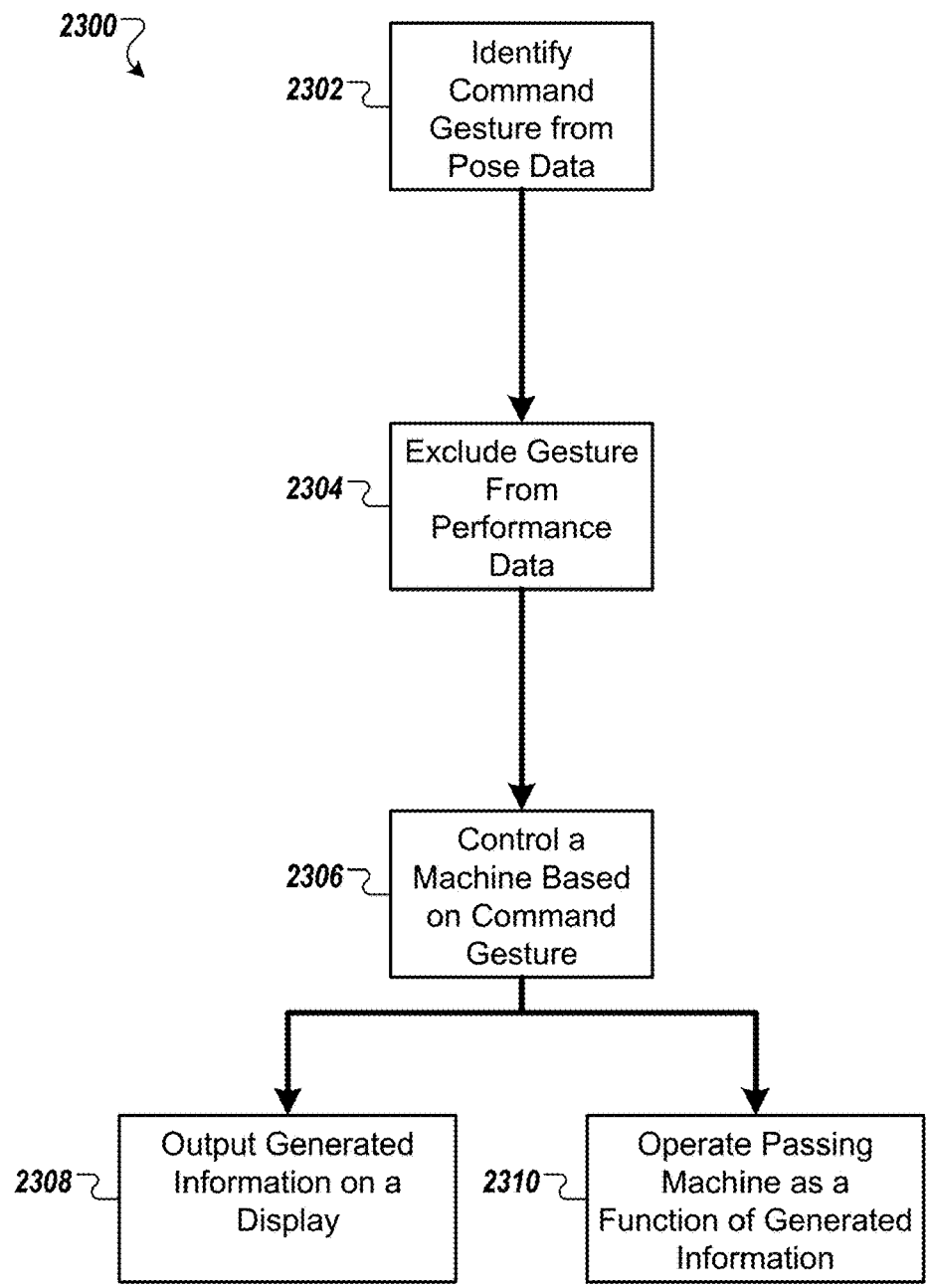
FIG. 23 is a flowchart of an example process for controlling a ball passing machine based on gesture data.

FIG. 23 is a flowchart of an example process 2300 for controlling a ball passing machine based on gesture data. For example, players using the basketball training system will often be performing drills that require them to be out of arm's reach of the ball passing machine. In these situation, and in situations when the player is close, the vision system may use pose data of the player to identify specific gestures that, when detected, prompt the ball delivery machine to perform an action. For example, a setting in the basketball training system may be set to start a drill upon detection of a gesture by the player. In this example, the gesture will be a clap, but other gestured and other actions (pausing a drill, advancing to the next drill) are possible.

A command gesture is identified from pose data 2302. For example, a player's pose is tracked with the vision system as described in this document. Command gestured can be stored in computer memory as defined by a collection of joint angle and changes to joint angles. For example, a clapping gesture may be defined based on shoulder, elbow, wrist, and finger angles or movement. When the player's pose data matches the gesture stored in memory, a gesture-listener may identify this match and launch a procedure based on the gesture's identification.

The gesture is excluded from performance data 2304 used for analysis of a player. For example, the index and collection of pose and form data used for analysis can be segregated data containing measures of body movement identified as a command gesture. In this way, a player performing the clap-which is not considered good form—is not punished for performing a clap to start or pause a drill.

A machine is controlled based on the command gesture 2306. For example, if the basketball training system determines that a player claps, this clap is identified as a command gesture. Then, the machine may execute a command indicated by the command gesture due to a data structure in memory that maps commands to machine instructions. In this case, in response to detecting the clap gesture, the ball passing machine can pass the ball to the player.

Generated information is output on a display 2308. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 2310. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 24:
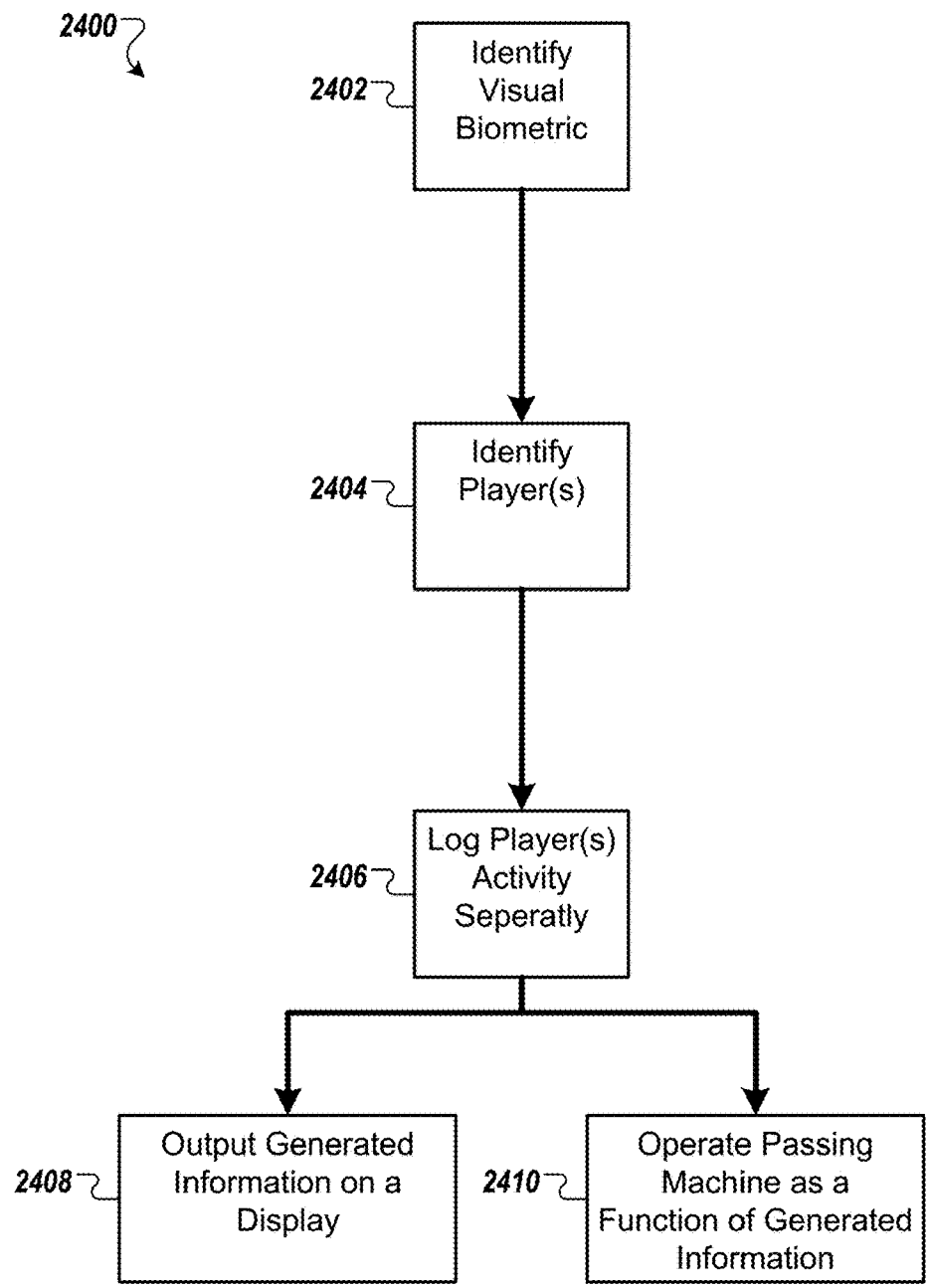
FIG. 24 is a flowchart of an example process for tracking individual players when two or more players are using a basketball training system.

FIG. 24 is a flowchart of an example process 2400 for tracking individual players when two or more players are using a basketball training system. For example, a drill may involve two players acting together or against each other. In one example, a player is designated as a passer and instructed to pass a ball to a shooter. In one example, a player is designated as on offense and another player is designated on defense, and the offensive player is attempting to make a shot while being defended by the defensive player. In one example, two players are independently executing the same or different drills at the same time, but without interacting with each other. In each of these cases, the computer visions system may identify the two players and track them separately.

Visual biometrics are identified 2402 and players are identified 2404. In some cases, this can involve identifying players based on analysis of their face—the shape and contours of the player faces can be compared to a library of recorded player face data for a match. In some cases, this can involve identifying a visual marker on the player like a jersey number of wristband with a unique glyph printed on it. Computer vision can identify the number or glyph and compare to a library of recorded numbers or glyphs. In some cases, this can involve identifying idiosyncratic movements like gate analysis that analyzes movements like walking and compares the analysis to a library of analyzed gates.

Then, players activities are logged separately 2406. For example, pose and form data for each frame of a video can be assigned to a player identified and not to another player. In this way, activities of each player can be disentangled for accurate analysis.

Generated information is output on a display 2408. For example, the information collected, analyzed, generated, and stored in this process can be displayed on a display device. This can include visual display by way of a screen, audio display by way of a speaker, haptic display by way of a tactile element such a worn device withse a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 2410. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

Figure 25:
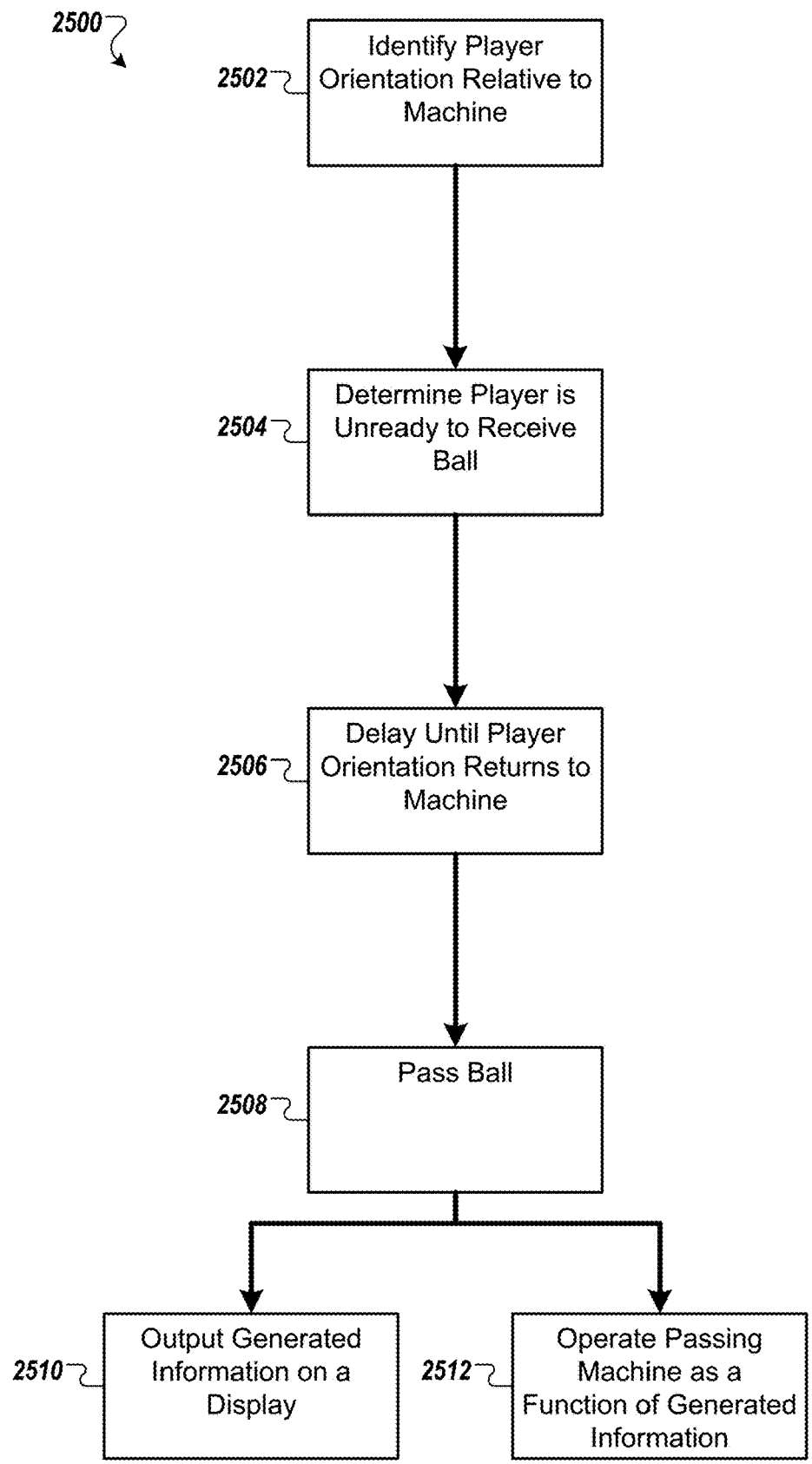
FIG. 25 is a flowchart of an example process for passing a ball with a ball passing machine to a player only when the player is ready.

FIG. 25 is a flowchart of an example process 2500 for passing a ball with a ball passing machine to a player only when the player is ready. For example, the basketball training system can use the pose and form information being collected to determine if a player is in a ready state to begin a drill or receive a pass. For example, a player facing the machine (or the direction specified by the drill) can be identified as ready, while a player with their head turned away can be marked as not ready because they are not looking in the direction from which the ball will be passed.

Player orientation relative to the machine is identified 2502. For example, joint angles of the pose can be examined to determine head orientation, torso orientation, etc. relative to the passing machine. If the player is facing away from the machine, the player can be determined to be unready to receive the ball 2504. This may occur, for example, if the player is talking with their trainer or moving to pick up a water bottle, among other situations. The machine can delay until the player orientation returns back to the machine 2506. When the player does turn back, the machine can pass the ball to the player. Additionally and/or alternatively, the player orientation can signify readiness of the player to receive the ball. For example, a determination that the player is facing the machine can signify that the player is ready to receive the ball.

Generated information is output on a display 2510. For example, the information collected, analyzed, generated, and stored in this process can be displayed on a display device. This can include visual display by way of a screen, audio display by way of a speaker, haptic display by way of a tactile element such a worn device with a vibration element, etc. In some cases, the display is performed without specific user input in response to specific user input requesting the display. For example, a short "Beep-beep" may be displayed by a speaker when a process is completed and data is successfully used. In some cases, the display is performed in response to specific user input requesting the display. For example, the user may tap on a GUI element such as a button to bring up the information on the display. This display may be performed by, for example, the basketball passing machine, a user's mobile phone device, a laptop or desktop device, or other device with hardware for such outputting.

The passing machine or other machine is operated as a function of the generated information 2512. For example, on a subsequent or future drill or exercise, the basketball passing machine can perform or modify a drill based on the information generated. This can include supplying one or more recommended drills to a player or trainer to select or it can include operating without specific user input. For example, small changes to a drill's parameters (e.g., delay between ball passes, number of repetitions of a drill) may be automatically made based on this information to adjust the drill to information about the player developed with this information.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A computer-implemented method comprising:
   obtaining, by a ball delivery machine, sensor data for a player that is performing a workout;
   obtaining, by the ball delivery machine, pose data for the player based at least on the sensor data;
   obtaining, by the ball delivery machine, performance data for the player based at least on the pose data, comprising estimating a skill level of the player based at least on the pose data; and
   controlling, by the ball delivery machine, one or more actions of one or more motors or actuators of the ball delivery machine based at least on the performance data for the player.

2. The method of claim 1, wherein the sensor data comprises image or video data that is generated by a camera of the ball delivery machine.

3. The method of claim 1, wherein the sensor data comprises depth data that is generated by a depth sensor of the ball delivery machine.

4. The method of claim 1, wherein the sensor data comprises LIDAR data that is generated by a LIDAR sensor of the ball delivery machine.

5. The method of claim 1, wherein obtaining the pose data for the player based at least on the sensor data comprises determining one or more joint angles for the player based at least on the sensor data.

6. The method of claim 1, wherein controlling the one or more actions of the one or more motors or actuators of the ball delivery machine based at least on the performance data for the player comprises controlling one or more actions of a tilt motor, pivot motor, launch drive motor, ball speed adjustment actuator, or tilt actuator.

7. The method of claim 1, wherein obtaining the sensor data for the player that is performing the workout comprises generating, by one or more sensors of the ball delivery machine that detect electromagnetic energy that is outside of a visible spectrum, the sensor data.

8. The method of claim 1, comprising:
   obtaining, by the ball delivery machine, biometric data of the player based at least on the sensor data,
   wherein the performance data for the player is further based on the biometric data.

9. The method of claim 1, comprising:
   obtaining, by the ball delivery machine, visual marker data of the player based at least on the sensor data,
   wherein the performance data for the player is further based on the visual marker data.

10. The method of claim 1, comprising:
    obtaining, by the ball delivery machine, gait analysis data of the player based at least on the sensor data,
    wherein the performance data for the player is further based on the gait analysis data.

11. The method of claim 1, comprising:
    obtaining, by the ball delivery machine, optical character recognition data associated with the player based at least on the sensor data,
    wherein the performance data for the player is further based on the optical character recognition data.

12. The method of claim 1, comprising:
    obtaining, by the ball delivery machine, individual sensor outputs for the player from two or more different types of sensors,
    wherein obtaining the sensor data for the player that is performing the workout comprises combining the individual sensor outputs to generate the sensor data.

13. The method of claim 1, comprising:
    generating, by the ball delivery machine, an adjustment to the workout based at least on the performance data,
    wherein controlling one or more actions of the one or more motors or actuators of the ball delivery machine comprises controlling the one or more motors or actuators to implement the adjustment to the workout.

14. The method of claim 1, wherein obtaining the sensor data for the player that is performing the workout comprises obtaining the sensor data from one or more sensors that are mounted on a rim of a goal.

15. The method of claim 1, comprising indexing the sensor data, the pose data, or the performance data in a queryable data source.

16. The method of claim 1, wherein obtaining the performance data for the player based at least on the pose data comprises obtaining, by the ball delivery machine, hand placement analysis data based at least on the pose data.

17. The method of claim 1, wherein the sensor data, the pose data and the performance data are obtained by the ball delivery machine without accessing a network connection.

18. One or more non-transitory computer-readable media that store instructions which, when executed by one or more computer processors, cause the one or more computer processors to perform operations comprising:

obtaining, by a ball delivery machine, sensor data for a player that is performing a workout;

obtaining, by the ball delivery machine, pose data for the player based at least on the sensor data;

obtaining, by the ball delivery machine, performance data for the player based at least on the pose data, comprising estimating a skill level of the player based at least on the pose data; and controlling, by the ball delivery machine, one or more actions of one or more motors or actuators of the ball delivery machine based at least on the performance data for the player.

19. A ball delivery machine comprising:

one or more computer processors; and one or more non-transitory computer-readable media that store instructions which, when executed by the one or more computer processors, cause the one or more computer processors to perform operations comprising:

obtaining sensor data for a player that is performing a workout;

obtaining pose data for the player based at least on the sensor data;

obtaining performance data for the player based at least on the pose data, comprising estimating a skill level of the player based at least on the pose data; and controlling one or more actions of one or more motors or actuators of the ball delivery machine based at least on the performance data for the player.

20. The ball delivery machine of claim 19, wherein controlling the one or more actions of the one or more motors or actuators of the ball delivery machine based at least on the performance data for the player comprises controlling one or more actions of a tilt motor, pivot motor, launch drive motor, ball speed adjustment actuator, or tilt actuator.

21. The ball delivery machine of claim 19, wherein obtaining the sensor data for the player that is performing the workout comprises generating, by one or more sensors of the ball delivery machine that detect electromagnetic energy that is outside of a visible spectrum, the sensor data.

22. The ball delivery machine of claim 19, wherein the operations comprise obtaining optical character recognition data associated with the player based at least on the sensor data, wherein the performance data for the player is further based on the optical character recognition data.

23. The ball delivery machine of claim 19, wherein the operations comprise obtaining individual sensor outputs for the player from two or more different types of sensors, wherein obtaining the sensor data for the player that is performing the workout comprises combining the individual sensor outputs to generate the sensor data.

24. The ball delivery machine of claim 19, wherein the operations comprise indexing the sensor data, the pose data, or the performance data in a queryable data source.

* * * * *